(12) United States Patent
Patterson et al.

(10) Patent No.: US 8,869,033 B2
(45) Date of Patent: *Oct. 21, 2014

(54) PROVIDING CONTACT INFORMATION VIA A COMPUTER NETWORK

(75) Inventors: Thomas P. Patterson, Allen, TX (US);
Erin R. Baker, Oak Lawn, IL (US);
Robert L. Wright, Jr., Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 849 days.

This patent is subject to a terminal disclaimer.

(21) Appl. No.: 13/013,529

(22) Filed: Jan. 25, 2011

(65) Prior Publication Data

US 2012/0192074 A1    Jul. 26, 2012

(51) Int. Cl.
*G06F 3/048* (2013.01)
*G06Q 10/00* (2012.01)

(52) U.S. Cl.
CPC ............... *G06Q 10/00* (2013.01); *G06F 3/048* (2013.01)
USPC .................................. 715/734; 705/26; 705/1

(58) Field of Classification Search
None
See application file for complete search history.

(56) References Cited

U.S. PATENT DOCUMENTS

| | | | |
|---|---|---|---|
| 6,389,028 B1* | 5/2002 | Bondarenko et al. | 370/401 |
| 2005/0039214 A1* | 2/2005 | Lorenz et al. | 725/105 |
| 2007/0135110 A1* | 6/2007 | Athale et al. | 455/418 |
| 2007/0198368 A1* | 8/2007 | Kannan et al. | 705/26 |
| 2007/0233291 A1* | 10/2007 | Herde et al. | 700/91 |
| 2009/0055208 A1* | 2/2009 | Kaiser | 705/1 |
| 2010/0050123 A1* | 2/2010 | Sherrard et al. | 715/836 |
| 2010/0325216 A1* | 12/2010 | Singh et al. | 709/206 |

* cited by examiner

*Primary Examiner* — Matt Kim
*Assistant Examiner* — Tuan S Nguyen
(74) *Attorney, Agent, or Firm* — Moore and Van Allen, PLLC; Michael A. Springs; Sreenivas Vedantam

(57) ABSTRACT

Embodiments of the invention provide for systems, devices, apparatus, methods, and computer program products for providing contact information via a computer network in response to activating an activatable indicium on a user interface. The activatable indicium integrates and provides the contact information for multiple channels of an entity along with statistical information for multiple contact options associated with each channel, and thus enables a user to contact an agent associated with the entity in a faster, more efficient, and better informed manner.

63 Claims, 33 Drawing Sheets

PROVIDING CONTACT INFORMATION VIA A COMPUTER NETWORK

FIELD

In general, embodiments of the invention relate to methods, apparatus, and computer program products for providing contact information via a computer network, and more specifically, for providing contact information for multiple channels of an entity along with statistical information associated with each channel.

BACKGROUND

Any entity, organization or the like that has a presence on the Internet may provide a contact page that enables users to initiate contact with the entity, organization or the like. Usually, a link to the contact page may be provided on the entity's website homepage. In most cases, the contact link may be tucked away at one of the four corners of the webpage and users usually need to scroll downwards, upwards, or sideways in order to find the contact link. Additionally, this contact link might be provided on other pages of the website so that the user does not always have to return to the homepage in order to find a link to the contact page. Although users who are familiar with a particular webpage usually know where to find the contact link, finding the contact link may, in many instances, be an arduous task for first-time users of a webpage. On mobile platforms, the contact link might not be provided at all on the entity's mobile homepage because space on a mobile interface is limited. Therefore, users may have to navigate through several mobile webpages before they find the contact link. Finding a contact link at an electronic kiosk or an automated teller machine (ATM) may be even more difficult than finding a contact link on a personal computer or mobile platform. This is because people may visit electronic kiosks or banking ATM centers occasionally and may do so for specific purposes. Therefore, users, especially those who are not computer savvy, might not be able to find the contact link in such an unfamiliar environment especially when time is of the essence as there might be a queue of impatient people who are waiting to use the electronic kiosk or ATM banking center. Moreover, an entity that hosts webpages, mobile webpages, electronic kiosk/ATM applications, etc. might not present a contact link in a consistent manner across all these interfaces. Therefore, a user who has previously accessed the contact link on a webpage might not be able to transfer that knowledge to finding the same contact link on the related mobile webpage. As such, finding the contact link may not be easy even when moving from an entity's web interface to the same entity's mobile interface.

When a user reaches a contact page via a contact link, the user may be provided with a list of several phone-numbers, email addresses, mailing addresses, etc. associated with several different divisions, lines of business, tenants or the like, referred to herein as channels of the entity. When so many phone numbers, email addresses, and mailing addresses are presented to a user, it may be difficult for a user to sift through this information to find the desired contact information. The contact page may also list the hours of operation for any listed phone numbers. Some entities may even provide a chat feature to chat with agents of the entity. While some entities may provide several contact phone numbers or email addresses, other entities may provide a single contact number or a single contact email address. When a user calls that single contact number, the user may be redirected to the appropriate channel and an appropriate agent within that channel only after answering several questions that are usually posed by an automated telephone operating system. On most occasions, users may dial the contact number and then just press a '0' in order to talk to an operator so that they do not have to navigate through this long winding and cumbersome redirect process. Recently, as some entities have removed the option of contacting an operator, users may have no choice but to navigate through the long winding automated redirect process before they can reach a human agent.

People usually would like to receive answers to their questions as soon as possible. Entities, organizations and the like, too, would prefer to provide answers as soon as possible. Even a minor delay in providing an answer may mean a lost business opportunity or a current customer who is left dissatisfied. After all, the most successful entities are those that are most responsive to their customers. Thus, entities would like to eliminate or lessen the waiting time associated with establishing contact with a customer.

Contact systems within an entity's call center may also suffer from several inefficiencies. In current call center systems, when an internal agent receives a call from a customer regarding an issue that the agent is incapable of resolving, the agent may determine the type of specialist who may be able to resolve the issue. Then the agent may place a phone call to a specialist agent from a list of phone numbers at the agent's disposal. If the specialist agent does not answer the agent's call, the agent may dial an alternate specialist agent's phone number to determine whether he or she is available to assist. Alternatively, the agent may attempt to contact the specialist agent through other communication options, such as a chat session or the like. Here, too, the agent may wait for a specialist agent's reply and if the specialist agent does not reply, the agent may ping an alternate specialist agent to determine whether he or she is available to assist. Therefore, a customer may be kept waiting until the agent finds an available specialist agent who is best equipped to answer the customer's question and then receives an answer from that specialist agent. The agent may then communicate this answer to the customer. In many instances it may be extremely cumbersome for an agent to initiate contact with a specialist agent, and even a minor delay could leave a customer dissatisfied. Therefore, it is usually a meticulous task for an agent to find the right specialist agent because the agent has to contact several specialist agents in a linear fashion in order to find an available specialist agent.

For all these reasons and others, there is a need for an improved and user-friendly process and system for a customer to initiate contact with the most appropriate channel within an entity, organization or the like. There is also a need for an improved and user-friendly process and system for an internal agent within an entity, organization or the like to initiate contact with other internal agents.

BRIEF SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing apparatuses (e.g., a system, computer program product, and/or other device), methods, or a combination of the foregoing for providing contact information via a computer network in response to activating an activatable indicium on a user interface.

The activatable indicium, which may be a company logo, company name or the like, is not initially readily identifiable as an entry point for accessing the contact information. However, over time and continual use, the user recognizes that the presentation of the indicium, regardless of the platform, provides for an entry point for accessing contact information. Since the activatable indicium, for example, a company logo or company name, is presented on most, if not all, interface platforms and pages within an interface, the invention herein described eliminates the need for a user to navigate through several interface pages before finding the desired contact information.

The activatable indicium integrates and provides the contact information for multiple channels of an entity along with statistical information for multiple contact options associated with each channel, and thus enables a user to contact an agent associated with an entity in a faster, more efficient, and better informed manner.

A method for providing a user with a contact to an entity defines some embodiments of the invention. The method includes presenting, via a computing device processor, a contact entry point on an interface page. The method additionally includes receiving, via a computing device processor, a first input that selects the contact entry point. The method additionally includes, in response to receiving the first input, presenting on the interface page, via a computing device processor, one or more channels associated with the entity. The method additionally includes receiving, via a computing device processor, a second input that selects one of the one or more channels. The method additionally includes, in response to receiving the second input, presenting, via a computing device processor, one or more contact options on the interface page, wherein the one or more contact options are associated with the selected channel. The method additionally includes receiving, via a computing device processor, a third input that selects one of the one or more contact options. The method additionally includes, in response to receiving the third input, providing, via a computing device processor, access to the selected contact option.

In specific embodiments, presenting the one or more contact options further comprises presenting, via the computing device processor, the one or more contact options, including one or more of a voice option, a telephone option, a text option, a chat option, a postal mail option, a network option, or an electronic mail option.

In specific embodiments, the method additionally includes presenting, via a computing device processor, an estimated waiting time for each of the one or more contact options, wherein the estimated waiting time is presented on the interface page in conjunction with the presentation of the one or more contact options.

In specific embodiments, the estimated waiting time is generated as a real-time estimate.

In other specific embodiments, the estimated waiting time is generated as a delayed estimate.

In specific embodiments, the method additionally includes automatically selecting, via a computing device processor, a contact option with a lowest estimated waiting time from the one or more contact options, in lieu of presenting the one or more contact options and receiving the third input.

In specific embodiments, the method additionally includes automatically selecting, via a computing device processor, a channel most related to information provided on the interface page from the one or more channels, in lieu of presenting the one or more channels and receiving the second input. The method additionally includes automatically selecting, via a computing device processor, a contact option with a lowest estimated waiting time from the one or more contact options, in lieu of presenting the one or more contact options and receiving the third input.

In specific embodiments, the method additionally includes presenting, via a computing device processor, a standardized preference index for each of the one or more contact options, wherein the standardized preference index is based on the estimated waiting time and a cost associated with the corresponding contact option.

In specific embodiments, the method additionally includes automatically selecting, via a computing device processor, a contact option with a highest standardized preference index from the one or more contact options, in lieu of presenting the one or more contact options and receiving the third input.

In specific embodiments, the method additionally includes automatically selecting, via a computing device processor, a channel most related to information provided on the interface page from the one or more channels, in lieu of presenting the one or more channels and receiving the second input. The method additionally includes automatically selecting, via a computing device processor, a contact option with a highest standardized preference index from the one or more contact options, in lieu of presenting the one or more contact options and receiving the third input.

In specific embodiments, presenting the one or more contact options further comprises presenting, via the computing device processor, the one or more contact options, wherein at least one of the contact options is presented as currently unavailable.

In specific embodiments, the method additionally includes, in response to receiving the third input, determining, via a computing device processor, whether at least one data integration event needs to be generated, wherein the at least one data integration event is related to user activity on the interface page prior to receiving the first input.

In specific embodiments, the method additionally includes, in response to determining that the at least one data integration event needs to be generated, generating, via a computing device processor, the at least one data integration event.

In specific embodiments, the method additionally includes, in response to determining that the at least one data integration event is generated, transmitting, via a computing device processor, the at least one data integration event.

In specific embodiments, the method additionally includes, in response to receiving the third input, determining, via a computing device processor, whether additional user input is needed. The method additionally includes, in response to determining the additional user input is needed, presenting, via a computing device processor, a request for the additional user input.

In specific embodiments, providing access to the selected contact option further comprises presenting, via a computing device processor, contact information associated with the selected contact option.

In specific embodiments, providing access to the selected contact option further comprises prompting, via a computing device processor, an agent to contact the user via the selected contact option.

In specific embodiments, providing access to the selected contact option further comprises presenting, via a computing device processor, a prompt for the user to contact an agent via the selected contact option.

In specific embodiments, presenting one or more channels further comprises presenting, via the computing device processor, the one or more channels wherein each channel presented is related to information provided on the interface page.

In specific embodiments, presenting one or more channels further comprises presenting, via the computing device processor, an option for other channels, wherein the other channels are unrelated to information provided on the interface page.

In specific embodiments, the method additionally includes selecting, via a computing device processor, a channel most related to information provided on the interface page from the one or more channels, in lieu of presenting the one or more channels and receiving the second input.

An apparatus for providing a user with a contact to an entity defines further embodiments of the invention. The apparatus includes a computing platform including at least one processor and a memory. The apparatus also includes a module, or more than one module, stored in the memory, executable by the processor, and configured to execute the various components of the methods described above in the various embodiments.

A computer program product for providing a user with a contact to an entity further embodiments of the invention. The computer program product includes a non-transitory computer-readable medium including a set of codes for causing a computer to execute the various components of the methods described above in the various embodiments.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
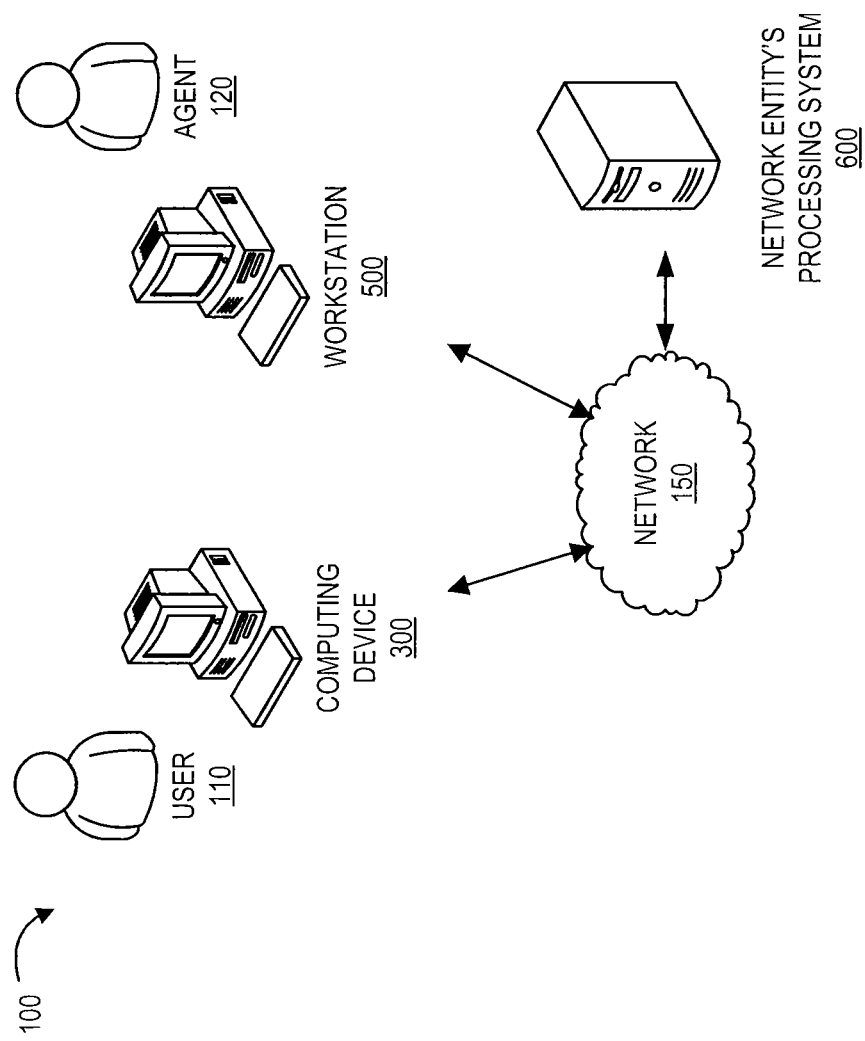
Figure 2:
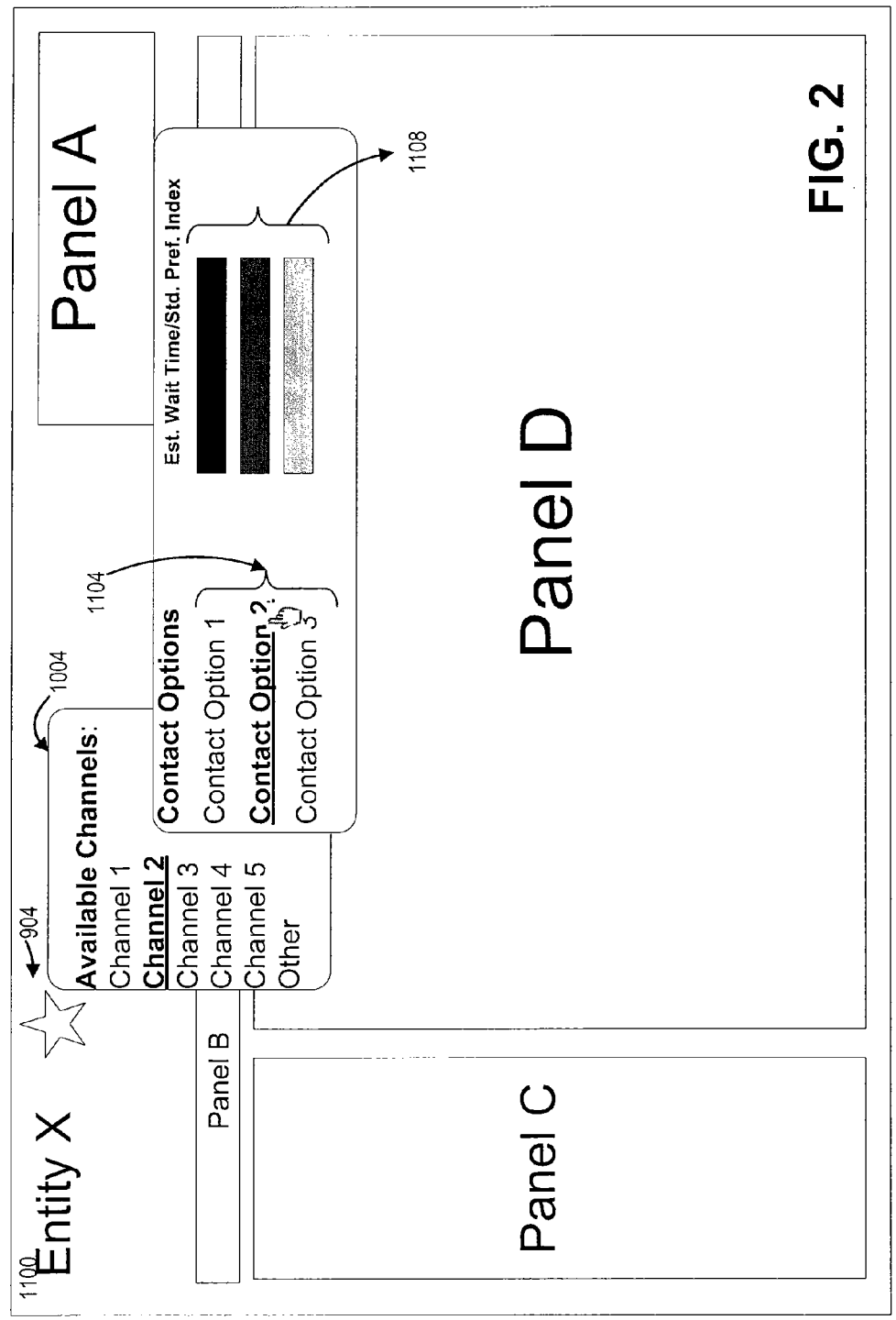
Figure 3:
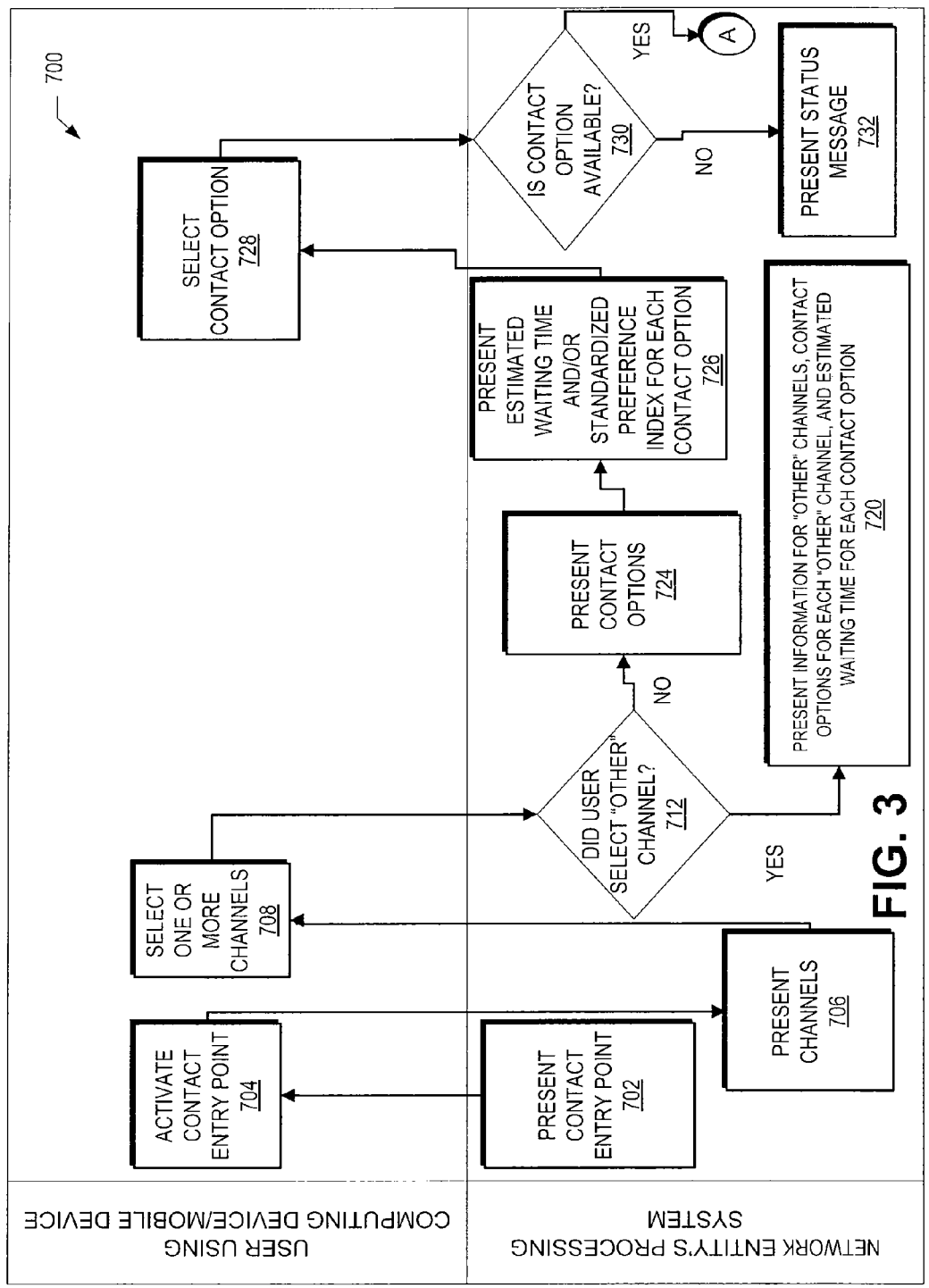
Figure 4:
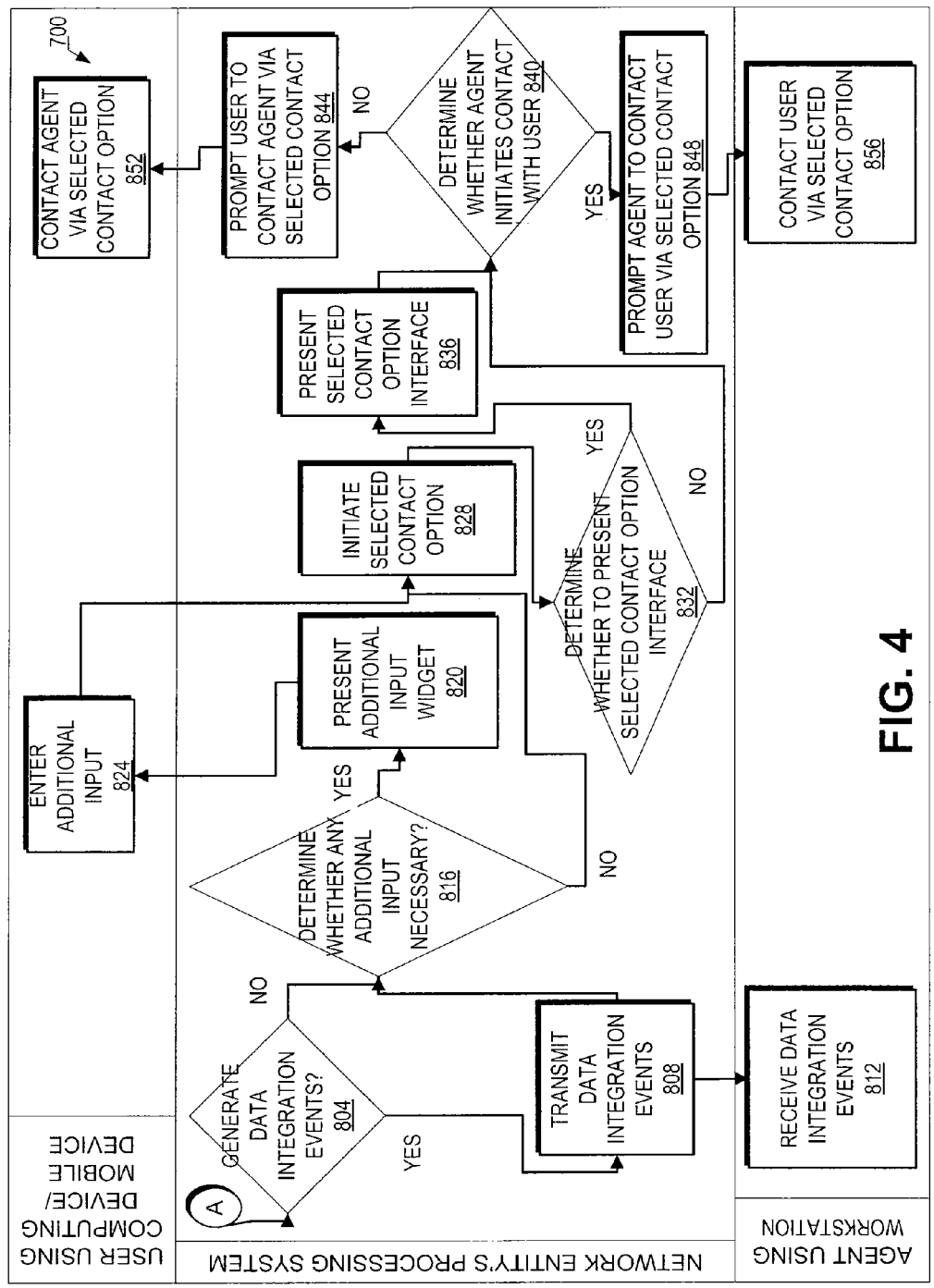
Figure 17:
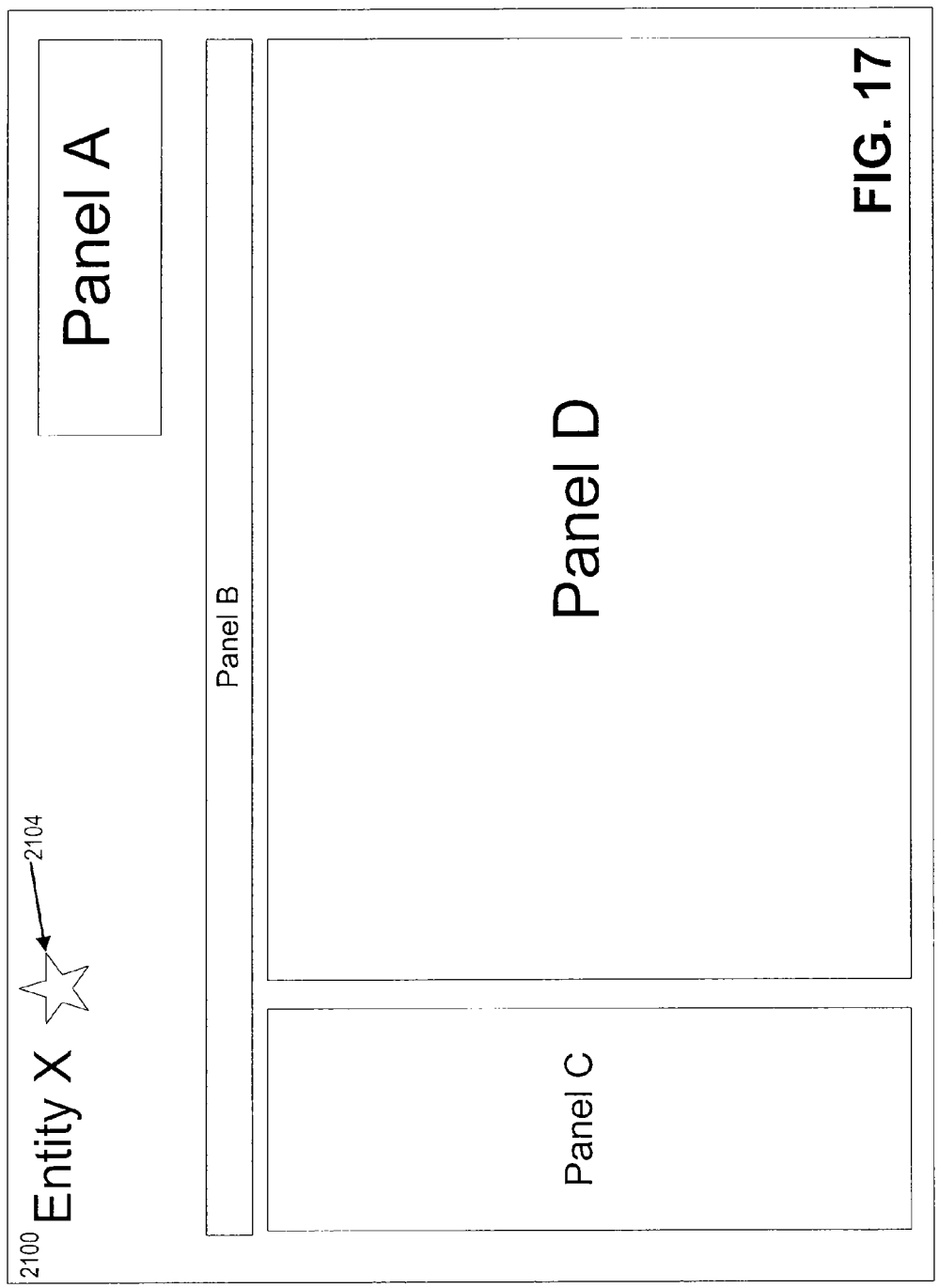
Figure 18:
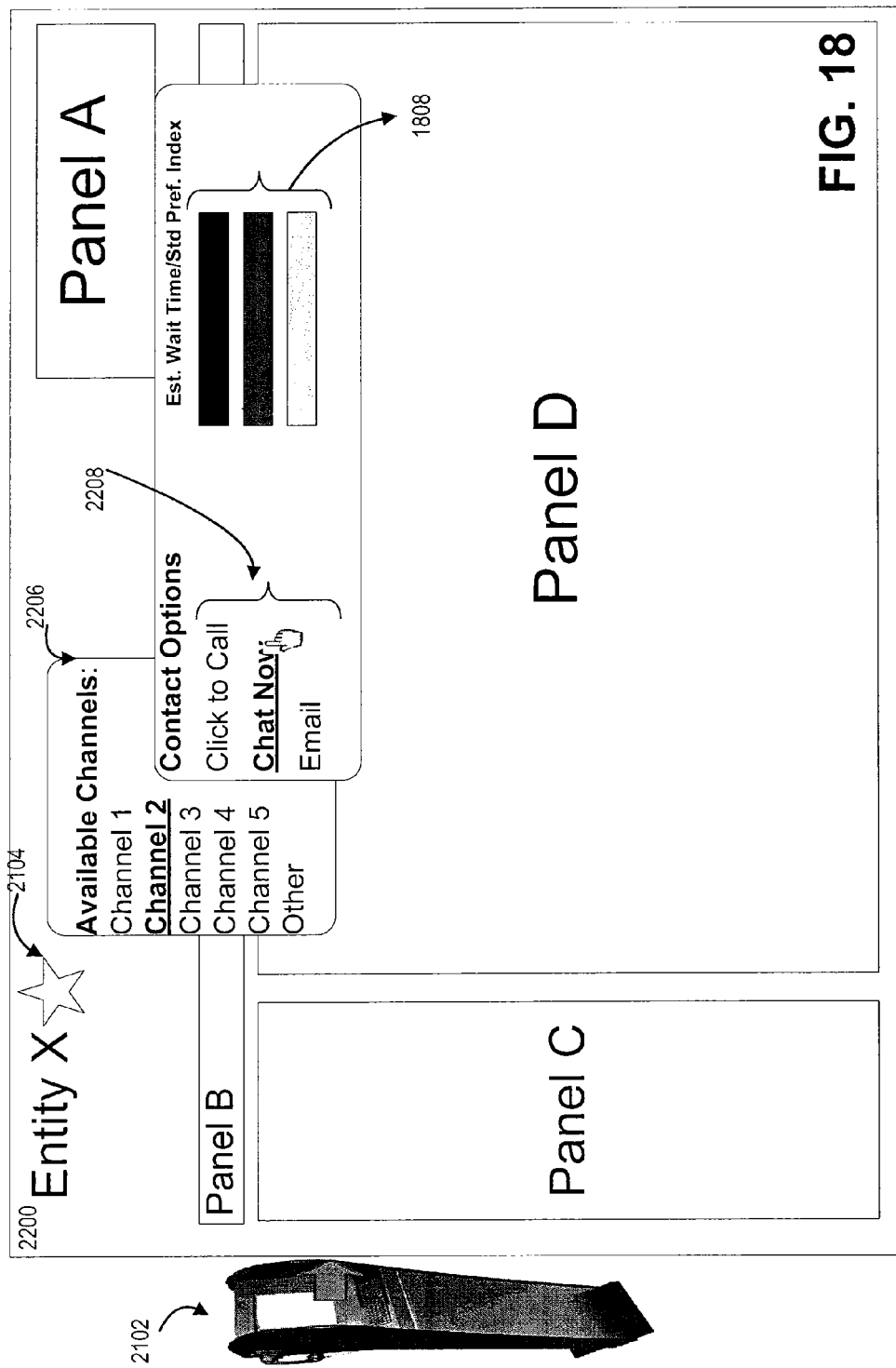
Figure 19:
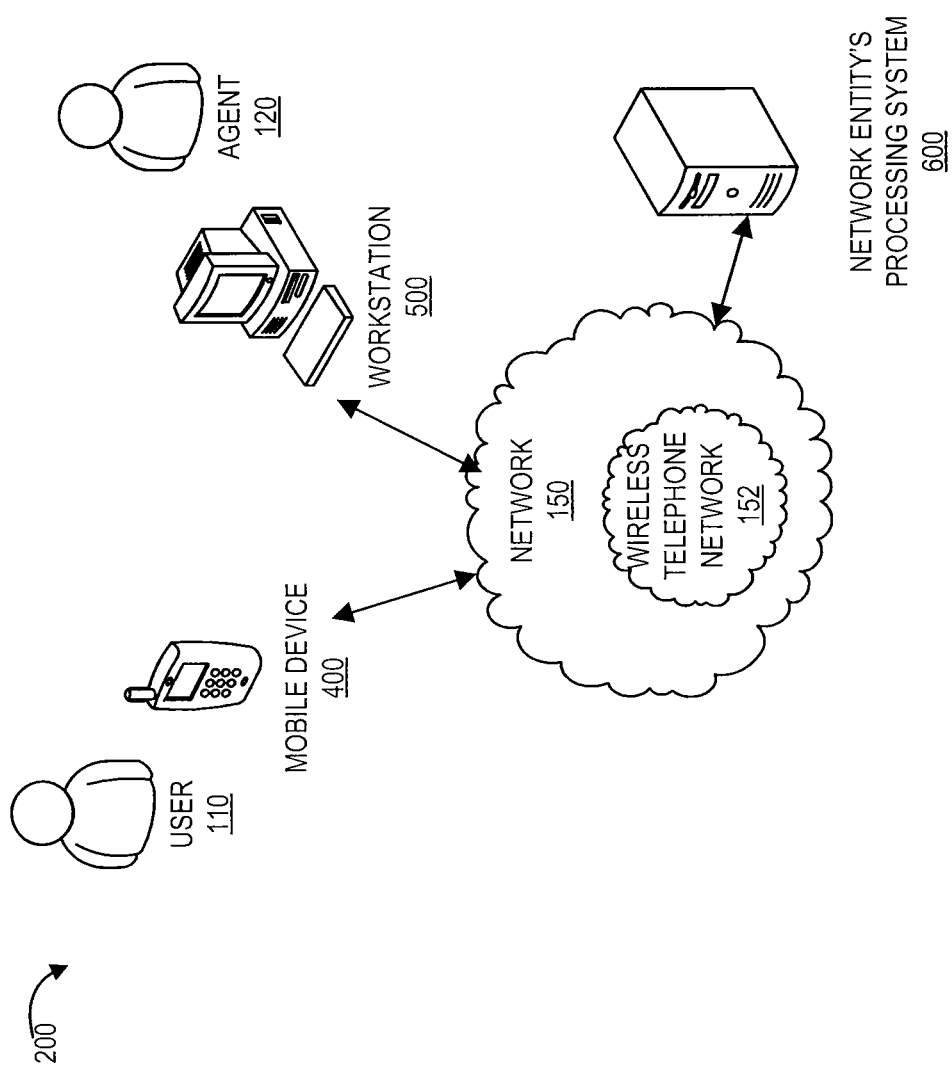
Figure 20:
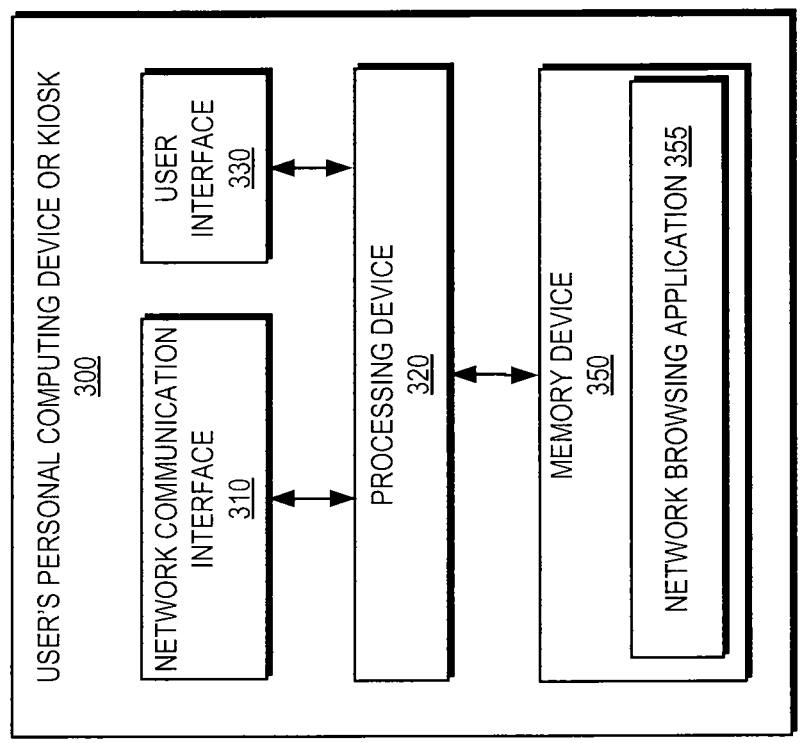
Figure 21:
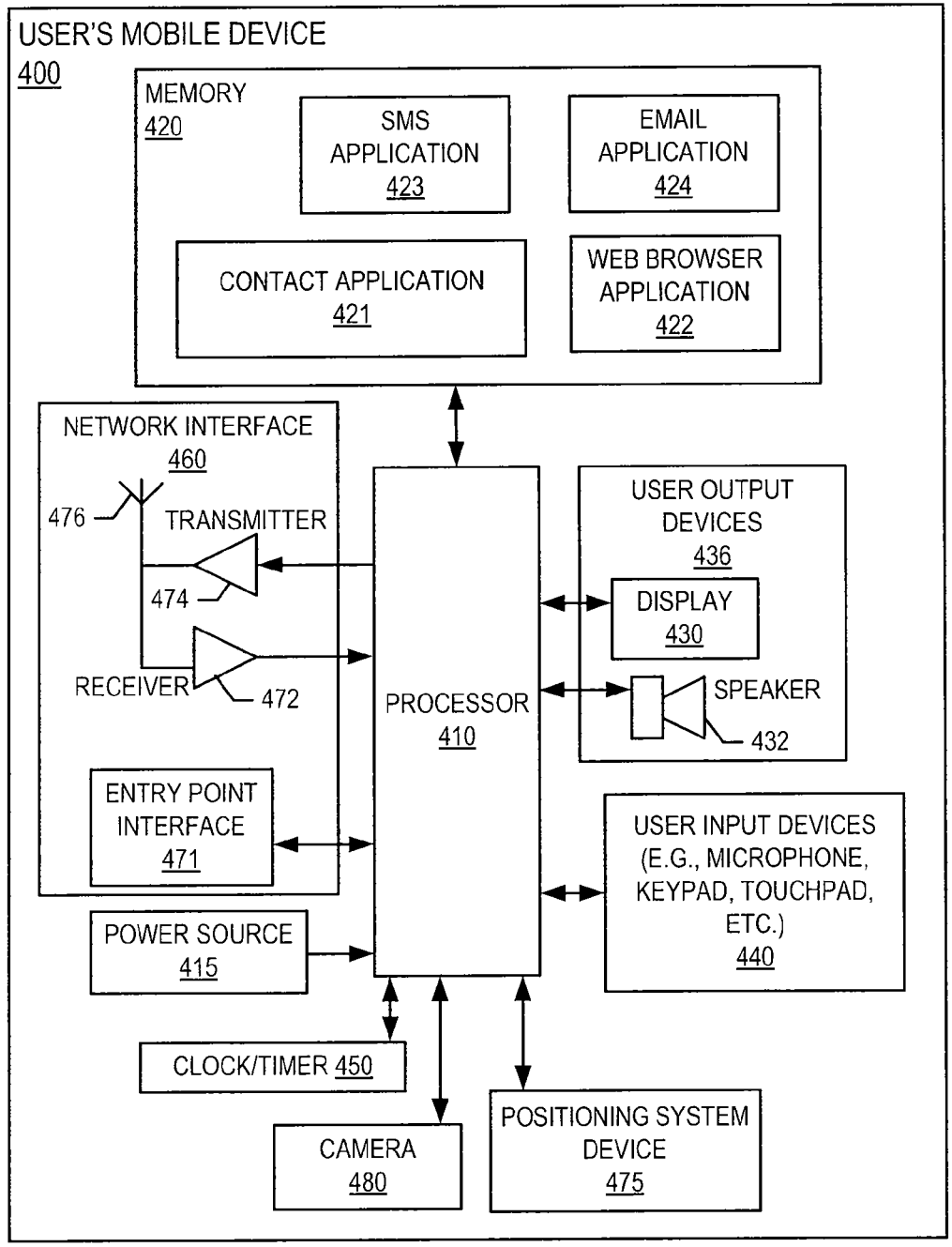
Figure 22:
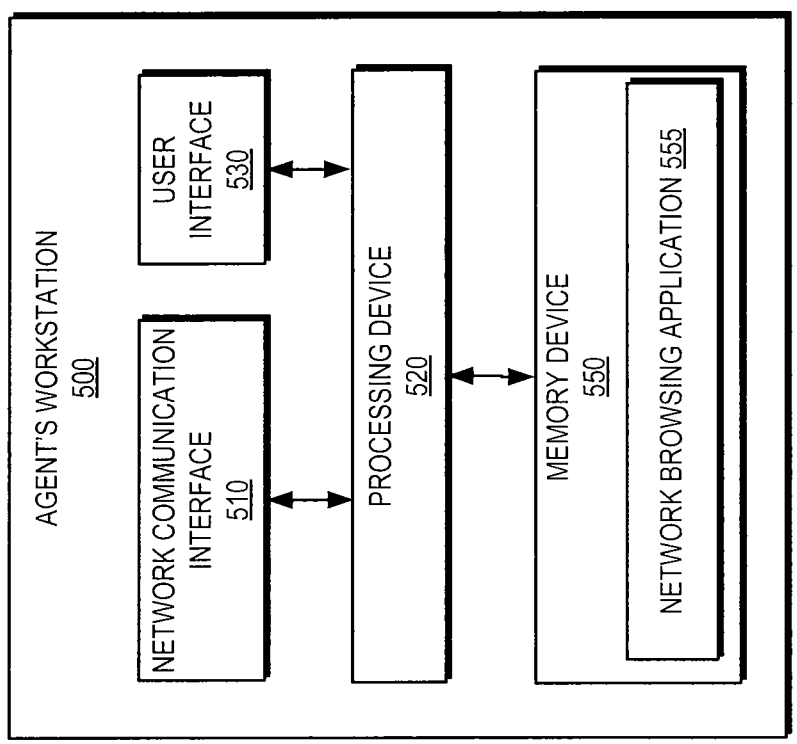
Figure 23:
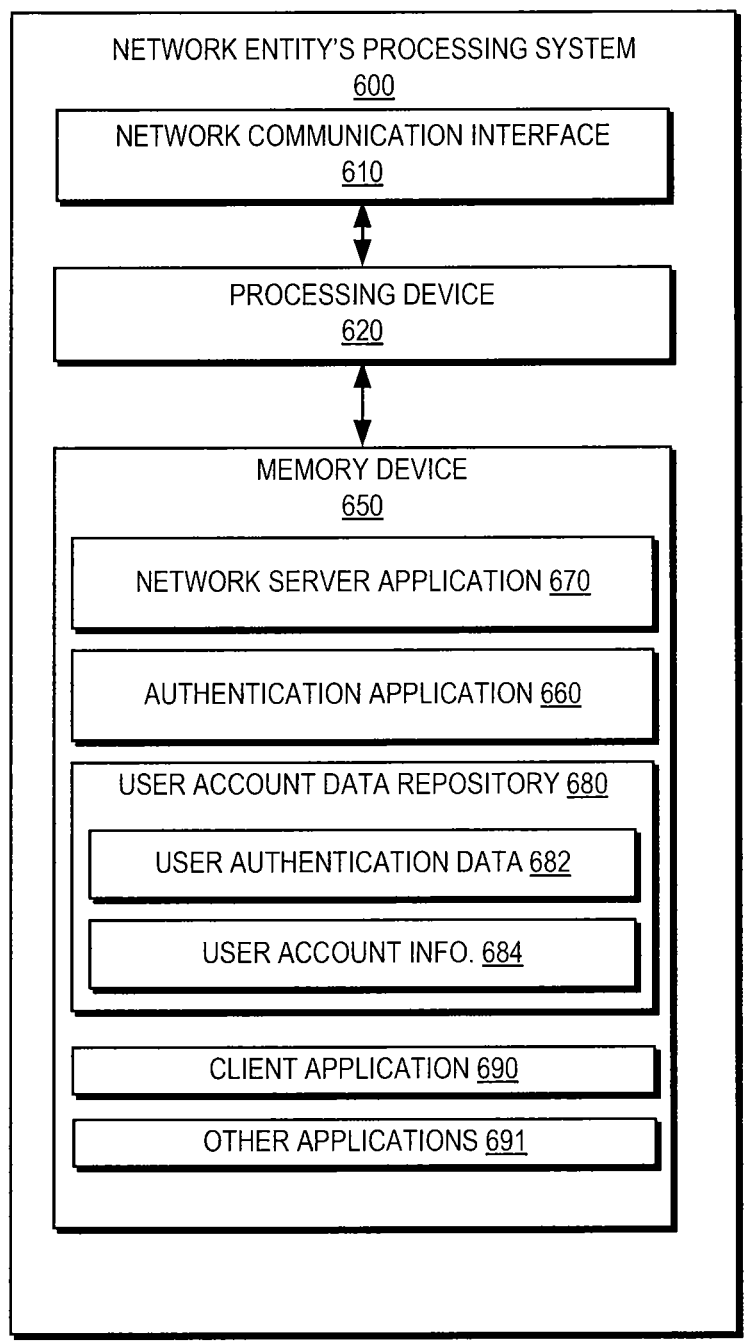
Figure 24:
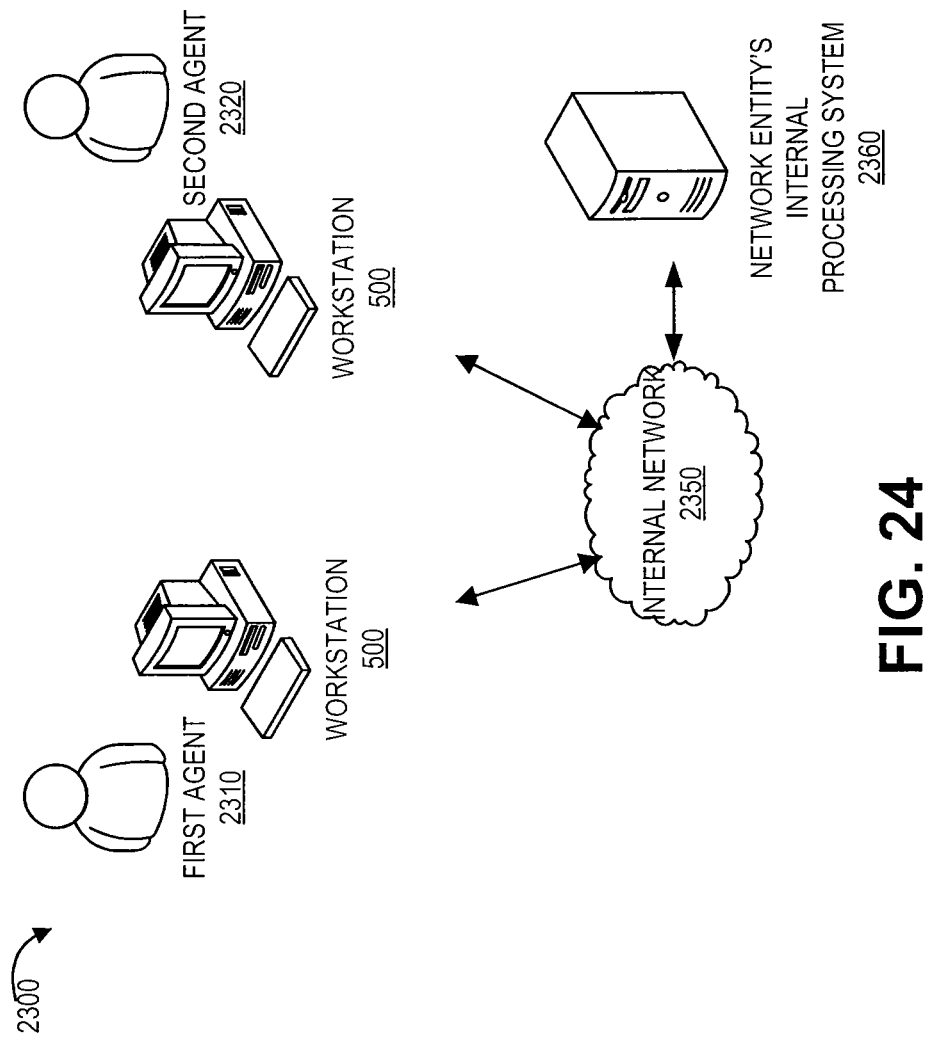
Figure 25:
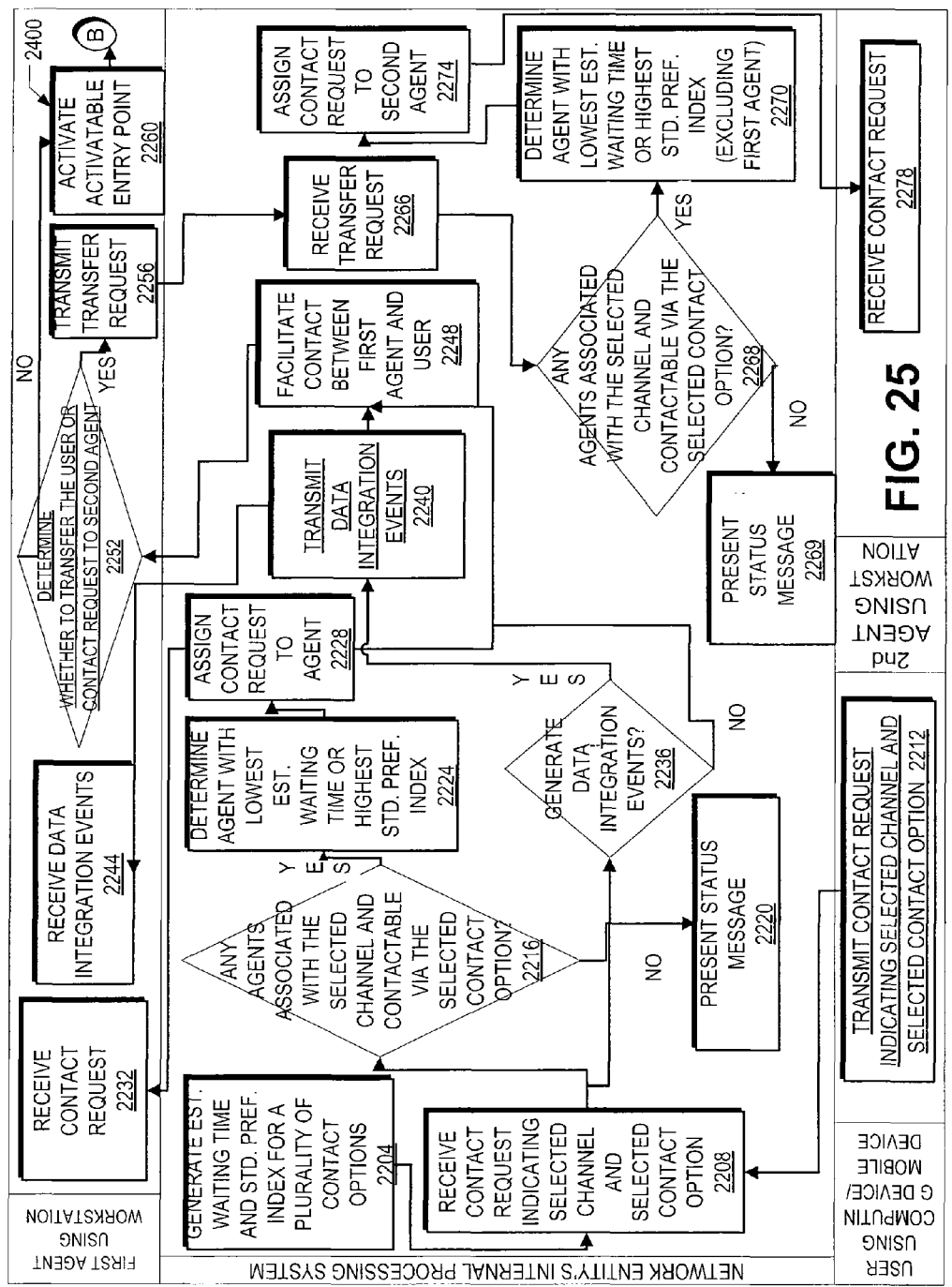
Figure 26:
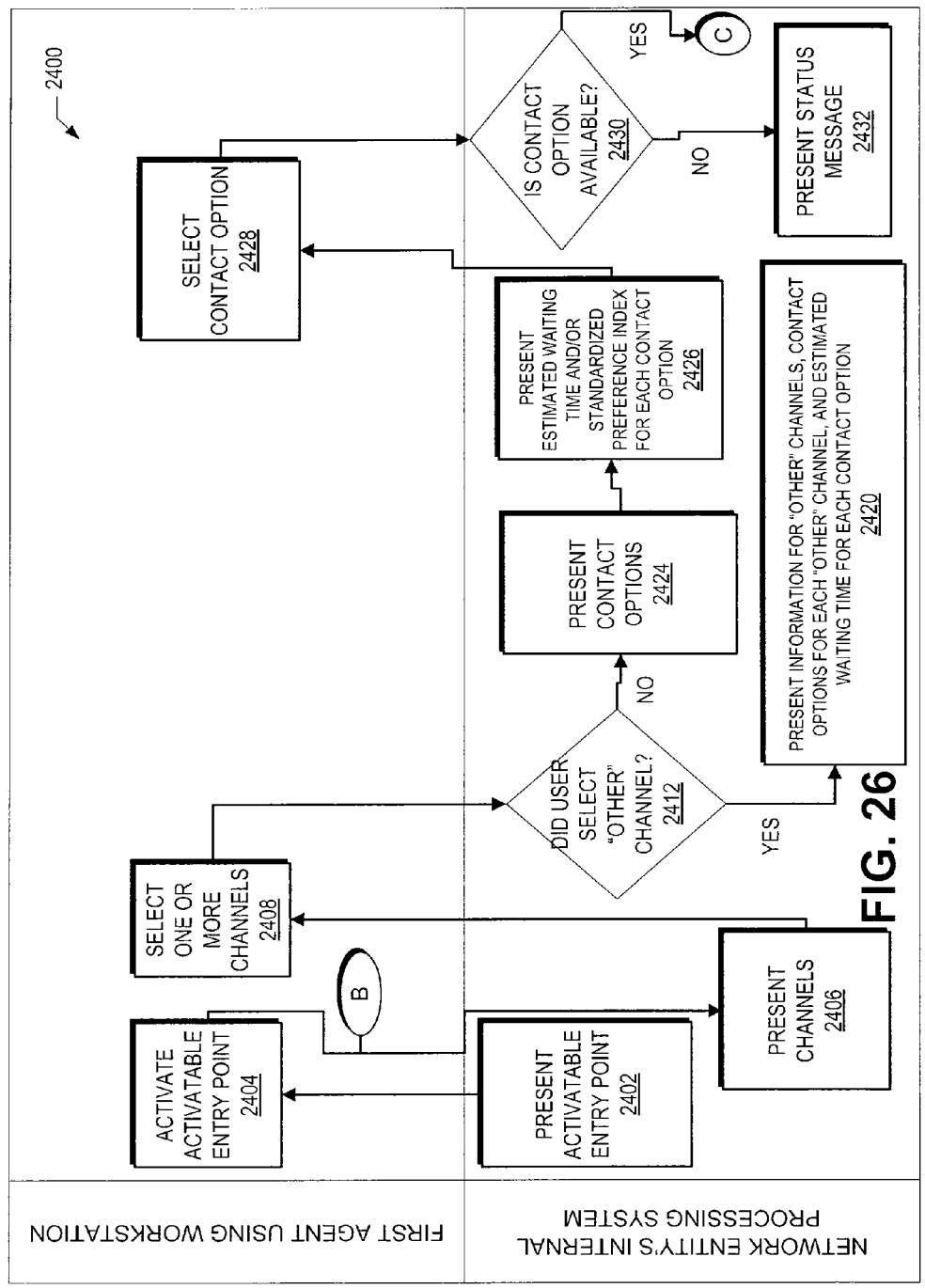
Figure 27:
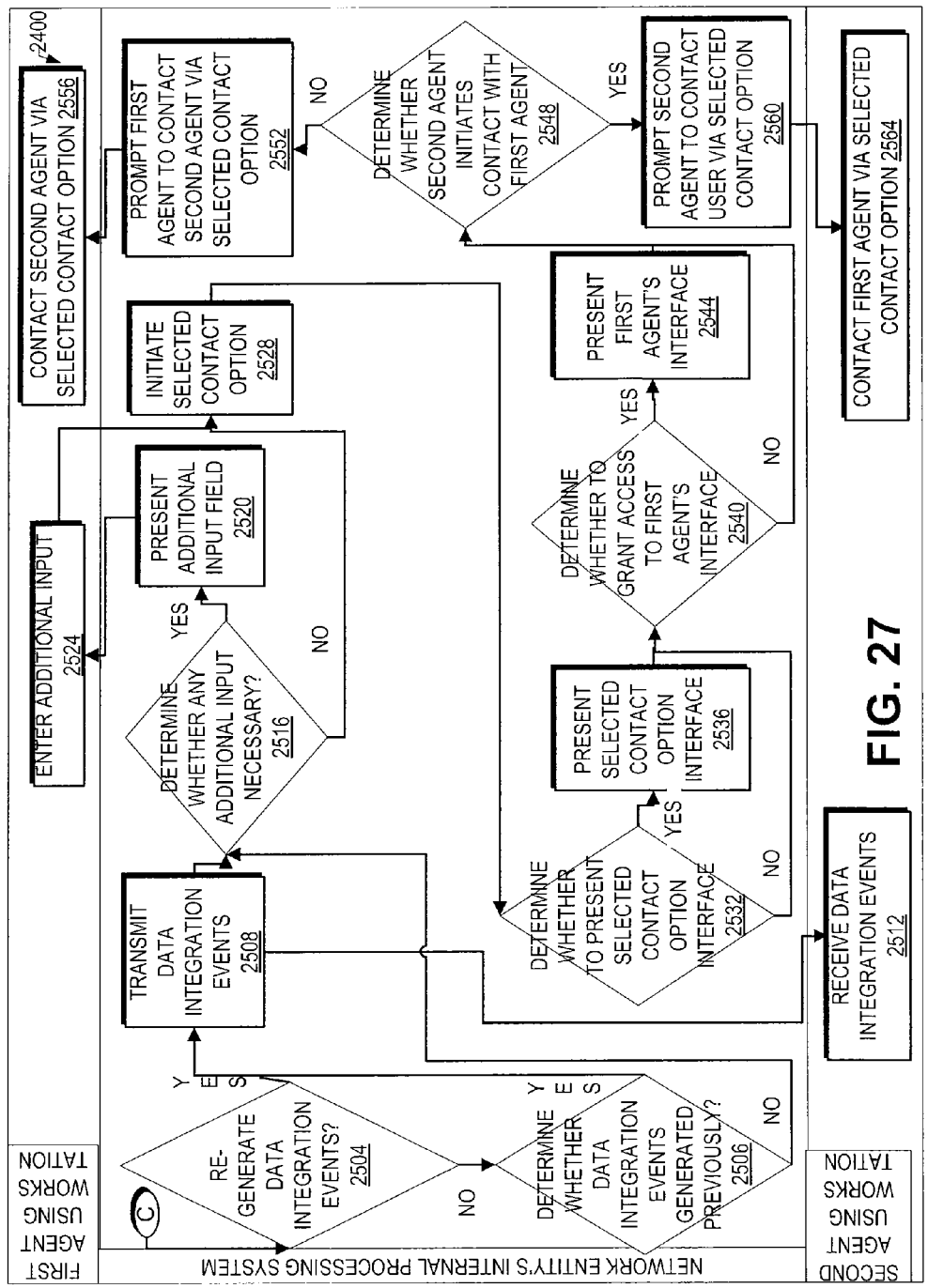

Having thus described embodiments of the invention in general terms, reference will now be made the accompanying drawings, wherein:

FIG. 1 provides a block diagram illustrating a computer network environment, in accordance with an embodiment of the invention;

FIG. 2 provides an illustration of an activatable indicium for accessing contact information, in accordance with an embodiment of the invention;

FIGS. 3 and 4 provide flow charts illustrating a process for the user to contact an agent associated with an entity, in accordance with embodiments of the invention;

FIGS. 5-10 provide illustrations of a graphical user interface used during the process described in FIGS. 3 and 4 where the user uses a computing device, in accordance with embodiments of the invention;

FIGS. 11-16 provide illustrations of a graphical user interface used during the process described in FIGS. 3 and 4 where the user uses a mobile computing device, in accordance with embodiments of the invention;

FIGS. 17-18 provide illustrations of a graphical user interface used during the process described in FIGS. 3 and 4 where the user uses an electronic kiosk, in accordance with embodiments of the invention;

FIG. 19 provides a block diagram illustrating a mobile computing network environment, in accordance with an embodiment of the invention;

FIG. 20 provides a block diagram illustrating the user's computing device of FIG. 1, in accordance with an embodiment of the invention;

FIG. 21 provides a block diagram illustrating the user's mobile computing device of FIG. 19, in accordance with an embodiment of the invention;

FIG. 22 provides a block diagram illustrating the agent's workstation of FIG. 1, 19, or 24, in accordance with an embodiment of the invention;

FIG. 23 provides a block diagram illustrating the network entity's processing system of FIG. 1, 19, or 24, in accordance with an embodiment of the invention;

FIG. 24 provides a block diagram illustrating a contact management system and environment, in accordance with an embodiment of the invention;

FIGS. 25, 26 and 27 provide flow charts illustrating a process for handling or managing a contact request, in accordance with embodiments of the invention; and FIGS. 28-33 provide illustrations of a graphical user interface used during the process described in FIGS. 25, 26 and 27 where the first agent uses a workstation, in accordance with embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with embodiments of the invention, the terms "online business," "network entity," "online entity," or "entity" may include any entity, organization, or the like that can be contacted by any contact option, regardless of whether the entity has a presence on the Internet.

In accordance with embodiments of the invention, the term "module" with respect to a system may refer to a hardware component of the system, a software component of the system, or a component of the system that comprises both hardware and software.

First embodiments of the invention provide for systems, devices, apparatuses, methods, and computer program products for providing and handling the activation of an activatable indicium that is configured as an entry point for accessing contact information.

Single Identifiable Entry Point System and Environment

FIG. 1 provides a block diagram illustrating a computer network environment 100 configured for providing contact information for an entity or initiating contact with an agent associated with an entity, in accordance with an embodiment of the invention. As illustrated in FIG. 1, the computer network environment 100 may include a computing device 300 operable by a user 110 and a workstation 500 operable by an agent 120 associated with an entity, organization, or the like. The computing device 300 and the workstation 500 may be in electronic communication via a network 150, which may be the Internet, an intranet or the like. Additionally, the computer network environment 100 may include the entity's processing system 600, hereinafter referred to as the network entity's processing system 600, configured to enable the user 110 to access, via the network 150, the entity's contact information or to facilitate contact, via the network 150, between the user 110 and the agent 120.

The computing device 300, the workstation 500, and the network entity's processing system 600 are described in further detail in a subsequent section.

In order to enable the user 110 to access the entity's contact information or initiate contact with the agent 120, the network entity's processing system 600 may initiate the presentation of an activatable indicium on the user's interface. The activatable indicium may be any kind of indicium including a character, a picture, a logo, text, or the like, or any combination thereof. For example, the activatable indicium may be an entity's logo, an entity's name or the like.

By activating the activatable indicium, the user 110 may access the entity's contact information or initiate contact with the agent 120. Thus, the activatable indicium may serve as an activatable entry point to access the entity's contact information or to initiate contact with the agent 120.

In one embodiment, the activatable indicium 904, shown in the user interface of FIG. 2, may be presented in a consistent manner across a plurality of electronic interfaces and computing platforms so that the user 110 may, over time, identify the activatable indicium as an entry point for accessing contact information for an entity. For instance, in an embodiment where the activatable indicium is an entity's logo, the entity's logo may be presented on the entity's website interface, a mobile application interface associated with the entity, a kiosk interface associated with the entity, etc. Over a period of time, the user 110 may learn to appreciate that the entity's logo is an entry point for accessing contact information or initiating contact with the agent 120 in order to serve the user 110 by responding to the user's questions or concerns. Therefore, the activatable indicium 904 may embody or may enable customer service due to an association of the entity's logo with customer service that the user 110 builds over time.

Also, the activatable indicium 904 may eliminate silos between the channels of an entity and the contact options that are available to contact these channels. The channels of an entity may represent the multiple departments, tenants, lines of business, or the like into which the entity is divided. In addition, statistical information may be presented that indicates to the user 110 the fastest or most preferred option of contacting each channel. Therefore, the user 110 may no longer need to navigate through a series of interface pages in order to determine which channel is the appropriate channel to contact and which contact option is the fastest or most preferred option for contacting that channel.

FIG. 2 is a user interface 1100 configured to display an activatable indicium 904, which is configured as an entry point for accessing contact information, in accordance with embodiments of the present invention. As shown in FIG. 2, the activatable indicium is a logo that may integrate the contact information for multiple channels of an entity along with statistical information, e.g., estimated waiting time, for multiple contact options associated with each channel into a single user-friendly panel. The user-friendly nature of the activatable entry point may make it possible even for less technological-savvy people to access the desired contact information in a fast and efficient manner. As shown in FIG. 2, in one embodiment, a user may activate the logo by mouse-over input, touch screen input, a button input, a mouse click input, a keyboard input, a voice command input, or the like. In one embodiment, when the user activates the activatable indicium, the network entity's processing system 600 may generate and present activatable channel links 1004 to a plurality of available channels associated with the entity. In one embodiment, these channels may represent the various departments, tenants, lines of operation, lines of business, or the like into which an entity is divided.

In one embodiment, when the user selects or otherwise activates one of the activatable channel links 1004, the network entity's processing 600 may generate and present activatable contact option links 1104 to a plurality of contact options associated with the selected channel. In addition, as shown in FIG. 2, the network entity's processing 600 may generate and present the estimated waiting time 1108 associated with each contact option so that the user may easily understand via a visual display how the estimated waiting time for a contact option compares with the estimated waiting times for other contact options. The user may select an activatable link to a contact option in order to initiate contact with the agent 120 via the selected contact option.

Thus, the activatable indicium may enable the user 110 to access contact information of the entity or initiate contact with the agent 120 in a faster, more efficient, and better informed manner.

Integrated Contact Process Flow Involving a User and an Agent

FIGS. 3 and 4 provide flow charts illustrating a process 700 for facilitating contact between a user using a computing device 300 or a mobile device 400 and an agent using a workstation 500, in accordance with an embodiment of the invention. FIGS. 3 and 4 illustrate the flow charts in terms of "swim lanes" associated with entities which may perform the operations in each respective swim lane. The entities illustrated in the exemplary Figures are (1) a network entity's processing system, (2) a user using a computing device, and (3) an agent using a workstation. However, it should be noted that other entities could also be involved and some embodiments of the invention may not be limited to the entities illustrated in FIGS. 3 and 4. Additionally, it should be understood that, in other embodiments of the invention, the entities need not be required to perform the actions illustrated in each respective swim lane. For example, some of the process steps described herein may be performed by the first entity (or other entities) even though the element may be illustrated as in the swim lane of the second entity. Similarly, in some embodiments, some of the process steps may be performed by the second entity (or other entities) even though the element may be illustrated as in the swim lane of the first entity.

The process begins at block 702 of FIG. 3 where a network entity's processing system 600 may present an activatable indicium configured as an entry point for accessing contact information via a computing device processor.

The process then moves to block 704 of FIG. 3 where the user 110 using a computing device 300 or mobile device 400 may activate the activatable indicium. In one embodiment, a user may activate the activatable indicium on the first interface page by mouse-over, touch, button, click, keyboard input, voice command, or the like. As stated earlier, the type of input that activates the activatable indicium is not limited to this list.

The process then moves to block 706 of FIG. 3 where in one embodiment, when a user activates the activatable indicium, the network entity's processing system 600 may generate and present to the user activatable links to a plurality of channels associated with the contact information-providing entity. In one embodiment, these channels may represent the various departments, tenants, lines of operation, lines of business, or the like into which an entity is divided. For instance, if the entity is a financial institution, a first channel may be "Personal Banking Accounts" and a second channel may be "Mortgages" and so on.

In one embodiment, the network entity's processing system 600 may only generate and present activatable links to a plurality of channels that are related to the other information presented on the interface page. For instance, if the user is on a page related to "Personal Banking Accounts" at the instant when the activatable indicium is activated, then the network entity's processing system 600 may present activatable links to channels such as "Current Account" and "New Account," and may not present activatable links to channels such as "Mortgages" and "Credit Cards." The network entity's processing system 600 may also generate and present an "Other" option among the activatable links to a plurality of channels so that the user may access channels not related to the interface page on which or at the instant when the activated indicium is activated.

In one embodiment, the network entity's processing system 600 may generate and present activatable links to a plurality of channels regardless of whether they are related to the interface page on which or at the instant when the activatable indicium is activated.

In one embodiment, the network entity's processing system 600 may generate and present activatable links to a plurality of channels with which the user, or a particular computing device in the possession of the user, or even a particular computing location, e.g., Internet Protocol (IP) address, has previously established contact. In one embodiment, the network entity's processing system 600 may generate and present activatable links to a plurality of channels with which the user has most recently established contact within a predefined period of time, e.g., the plurality of channels with which the user established contact in the preceding three months or the like. In one embodiment, the network entity's processing system 600 may generate and present activatable links to a plurality of channels with which a user has established contact most often. Therefore, in some embodiments, the network entity's processing system 600 may store the contact history associated with the user, or a particular computing device, or even a particular computing location, e.g., IP address. Thus, in some embodiments, a learning method may drive the network entity's processing system 600 so that the network entity's processing system 600 learns a user's contact habits and customizes the channels that it generates and presents to the user.

In one embodiment, the network entity's processing system 600 may require two levels of input in order to activate the activatable indicium. When the user inputs the first level of input, the network entity's processing system 600 may acknowledge this first level of input by magnifying the pictorial representation of the activatable indicium. Alternatively, the network entity's processing system 600 may present a highlighted box around the activatable indicium or some other means of acknowledging the first level of input. When the user inputs the second level of input, the network entity's processing system 600 may present activatable channel links to the plurality of channels. There is an advantage to prompting the user for two levels of input. Sometimes, the user may accidently activate the activatable indicium by accidently hovering over or clicking the activatable indicium. In such a situation, the network entity's processing system may generate and present activatable links to a plurality of channels in a panel that obstructs the user's view of the interface page. In order to prevent such a situation, the network entity's processing system 600 may require two levels of input in order to activate the activatable indicium.

The process then moves to block 708 of FIG. 3 where in one embodiment, the user may select an activatable link to a channel from the plurality of channels presented in block 706 of FIG. 3. In another embodiment, a user may select multiple activatable links to channels. The user may select an activatable link to a channel using previously-described input such as mouse-over, touch, button, click, keyboard input, or the like.

The process then moves to block 712 of FIG. 3 where the network entity's processing system 600 may determine whether the user selected an undefined activatable channel link, such as an activatable channel link unrelated to the interface page on which the activatable indicium is displayed. In one embodiment, the user may select the activatable link to the plurality of channels unrelated to the interface page by selecting the "Other" option from the list of activatable links to channels presented to the user in block 706 of FIG. 3.

If, at block 712 of FIG. 3, the network entity's processing system 600 determines that the user selected the activatable link to the plurality of channels unrelated to the interface page on which or at the instant when the activatable indicium is activated, i.e., the "Other" option, then the process moves to block 720 of FIG. 3. Here, the network entity's processing system 600 may generate and present activatable links to a plurality of channels unrelated to the interface page on which or at the instant when the activatable indicium is activated. In one embodiment, the activatable links to the unrelated channels may be presented on a new interface page to which the user is redirected. In another embodiment, the activatable links to the unrelated channels may be presented as a pop-up or call-out panel on the same interface page on which or at the instant when the activatable indicium is activated.

If, at block 712, the network entity's processing system 600 determines that the user selected an activatable link to a channel other than an undefined, i.e., "other", channel, the process moves to block 724.

Subsequently, at block 724 of FIG. 3, the network entity's processing system 600 may generate and present activatable links to a plurality of contact options associated with the selected channel. Possible contact options may include voice, phone, text, chat, mail, web, email, or the like. The possible contact options may not be limited to this list and may include any option by which the user may initiate contact with the network entity, regardless of whether contact is established with a human agent or a computer (or an Internet application) at the network entity.

In one embodiment, the network entity's processing system 600 may present only those contact options that are configured for the type of computing platform and the type of electronic interface on which the activatable indicium is activated. Furthermore, in another embodiment, the network entity's processing system 600 may present only those contact options that are currently available to initiate contact with the selected channel.

In one embodiment, the network entity's processing system 600 may generate and present activatable links to a plurality of contact options that a user, or a particular computing device, or even a particular computing location, e.g., IP address, has previously used. In one embodiment, the network entity's processing system 600 may generate and present activatable links to a plurality of contact options previously used by the user within a predefined period of time, e.g., the plurality of contact options that the user has used in the preceding three months or the like. In one embodiment, the network entity's processing system 600 may generate and present activatable links to a plurality of contact options that the user has used most frequently. Therefore, in some embodiments, the network entity's processing system 600 may store the contact option history associated with the user, or a particular computing device, or even a particular computing location, e.g., IP address. Therefore, in some embodiments, a learning method may drive the network entity's processing system 600 so that the network entity's processing system 600 learns the user's contact option habits and customizes the contact options that it generates and presents to the user.

In one embodiment, the network entity's processing system 600 may only generate and present activatable links for those contact options that are configured for the computing platform and the electronic interface on which the activatable indicium is activated. For example, in an embodiment where the computing platform is a computing device such as personal computer, the network entity's processing system 600 may not present a contact option to initiate contact via text message. As a further example, on a computing device, the network entity's processing system 600 may not present an automated call-in option if the computing device is not equipped with the capability to place phone calls directly from the user's computing device. However, on a computing device, the network entity's processing system 600 may still present a call-back option whereby the network entity's processing system 600 may present an input widget into which the user may enter a phone number that an agent associated the entity may call to initiate contact with the user. In one embodiment where the computing platform is an electronic kiosk, the network entity's processing system 600 may present a call-back option if there is a phone incorporated into the electronic kiosk. If the user chooses the call-back option on an electronic kiosk, the user may receive a call at the electronic kiosk's phone from an agent associated with the entity. The network entity's processing system 600 may also present a mail-in contact option, wherein selecting the mail-in option would present a mailing address to which the user's question or concern may be directed.

The process then moves to block 726 of FIG. 3 where the network entity's processing system 600 may generate and present an estimated waiting time for each of the plurality of contact options associated with the selected channel. The estimated waiting time may represent the time that would elapse before establishing contact with the selected channel. In one embodiment, the estimated waiting time may represent the time that would elapse before establishing contact with a human agent at or associated with the selected channel. In another embodiment, the estimated waiting time may represent the time that would elapse before establishing contact with a computer agent at or associated with the selected channel.

In one embodiment, the estimated waiting time may be generated by a manually controlled administrative function. In such an embodiment, a managing agent or other personnel at an entity may manually input an estimated waiting time for one or more contact options into the network entity's processing system 600. In such an embodiment, the managing agent or personnel may also manually adjust or control the estimated waiting time based, at least in part, on one or more factors considered by the managing agent or personnel. Such factors may include the number of users attempting to establish contact with agents at an entity, the number and capacity of agents at the entity to respond to these contact attempts, or the like. The variety of factors may include other factors that have not been described here.

In one embodiment, the network entity's processing system 600 may periodically re-generate and re-present an estimated waiting time for each of the plurality of contact options associated with the selected channel. In one embodiment, the estimated waiting time may be generated in real-time using real-time data.

In another embodiment, this estimated waiting time may be generated using a statistical algorithm as a delayed estimate using historical data. In one embodiment, the user may choose the interval of historical data or other parameters for generating the estimated waiting time. In another embodiment, network entity's processing system 600 may automatically choose a pre-determined interval of historical data or other parameters for generating the estimated waiting time.

In one embodiment, the network entity's processing system 600 may visually present the estimated waiting time for each of the plurality of contact options to the user so that the user may easily understand how the estimated waiting time for a contact option compares with the estimated waiting times for other contact options. The visual presentation may be in the form of a bar graph. In one embodiment, the network entity's processing system 600 may choose a baseline contact option that is associated with the minimum estimated waiting time, and then may generate a pictorial presentation (e.g., a bar graph that is not shaded) for the baseline contact option. The network entity's processing system 600 may subsequently generate the visual presentations of the remaining contact options according to an algorithm that compares the estimated waiting time of the baseline contact option with the estimated waiting times for the remaining contact options. In one embodiment, the bar graph of a contact option that has an estimated waiting time that is fifty percent greater than the estimated waiting time of the baseline contact option may be shaded fifty percent darker or otherwise configured to represent a fifty percent increase when compared to the bar graph for the baseline contact option.

The network entity's processing system 600 at block 726 may generate and present in place of, or in addition to, the estimated waiting time for each of the plurality of contact options associated with the selected channel, a standardized preference index for each of the plurality of contact options associated with the selected channel. In this embodiment, the network entity's processing system 600 may generate a preference index for each of the plurality of contact options based on at least one parameter. The parameters may include, but are not limited to, the estimated waiting time, the cost incurred by the entity and/or the user, the manpower, the technological resources, and the like associated with the plurality of contact options. In one embodiment, the cost parameter may be the cost associated with the agent having to initiate contact with the user, or it may be cost associated with the user having to initiate contact with the agent. In one embodiment, the process for generating the preference index may be based on a predetermined algorithm.

Subsequently, the network entity's processing system 600 may take the contact option that generates the best preference index and standardize the other contact options' preference indexes so that a user may easily compare how less favorable the other contact options' preference indexes are compared to the contact option with the best preference index. In one embodiment, the standardizing process may be based on a predetermined algorithm.

The network entity's processing system 600 may present, either pictorially or non-pictorially, the standardized preference index for each of the plurality of contact options. In one embodiment, the network entity's processing system 600 may choose a baseline contact option that is associated with the highest standardized preference index, and then generate a visual presentation (e.g., a bar graph) for the baseline contact option. The network entity's processing system 600 may subsequently generate the visual presentations for the remaining contact options according to an algorithm that compares the standardized preference index of the baseline contact option with the standardized preference indexes of the remaining contact options. In one embodiment, the bar graph of a contact option that has a standardized preference index that is fifty percent lesser than the standardized preference index of the baseline contact option may be shaded fifty percent darker or otherwise configured to represent a fifty percent decrease when compared to the bar graph for the baseline contact option.

In one embodiment, the network entity's processing system 600 may periodically re-generate and re-present the standardized preference index for each of the plurality of contact options associated with the selected channel so that the user can view the updated standardized preference index information.

In one embodiment, the network entity's processing system 600 may present as unavailable or may not even present, at all, any contact option that has a preference index that is below a certain threshold index. The network entity's processing system 600 may present the unavailability of a particular contact option by visually presenting the activatable link to the unavailable contact option as unavailable. Alternatively, the network entity's processing system 600 may present the unavailability of a particular contact option by deactivating the activatable link to the unavailable contact option such that the deactivated link is viewable but not activatable.

The process then moves to block 728 of FIG. 3 where, in one embodiment, the user may select an activatable link to a contact option from the activatable links to a plurality of contact options presented to the user.

The process then moves to block 730 of FIG. 3 where the network entity's processing system 600 may determine whether the contact option selected by the user is available for establishing contact with the channel selected in block 708 of FIG. 3.

If the network entity's processing system 600 determines that the contact option selected by the user in block 728 is unavailable, then the process moves to block 732 of FIG. 3 where the network entity's processing system 600 may generate and present a status message for the unavailable contact option. In one embodiment, the network entity's processing system 600 may present in the status message the hours of operation for the unavailable contact option. The network entity's processing system 600 may present the hours of operation along with other information regarding the contact option. The network entity's processing system 600 may present the status message on the same interface page, either as a call-out panel on the same interface page or as a pop-up panel on the same interface page.

If the network entity's processing system 600 determines that the contact option selected by the user in block 728 of FIG. 3 is available, then the process moves to block 804 of FIG. 4 where the network entity's processing system 600 may determine whether at least one data integration event needs to be generated. A data integration event may represent activity associated with activating the activatable indicium. For instance, if a user was on an interface page for making a money transfer to another account, and activated the activatable indicium on that interface page, then the integration event may note that the user was on the money transfer interface page. In one embodiment, the integration event may note what the user was doing on an interface or within an application at the instant when or prior to the instant when the activatable indicium was activated. A network entity's processing system 600 may transmit a data integration event to the agent so that the agent may understand the user's reasons or motivation for contacting the channel.

In one embodiment, a data integration event may be a computer-telephone integration ("CTI") data integration event. In one embodiment, CTI may refer to the integration of data transmission and a plurality of multi-media contact options such as voice, text, chat, email, mail correspondence, or the like. In another embodiment, CTI may refer to the integration of a plurality of contact options with a computer system such as a computing device 300 or mobile device 400, or a processing system such as the network entity's processing system 600.

In one embodiment, the user may prevent the network entity's processing system 600 from transmitting a data integration event to the agent. In such an embodiment, the network entity's processing system 600 may present to the user an option of whether the user wants to permit the network entity's processing system 600 to transmit a data integration event to the agent.

In one embodiment, the network entity's processing system 600 may automatically transmit a data integration event when the user is authenticated into an account associated with the user. Alternatively, in another embodiment, the network entity's processing system 600 may not transmit a data integration event when a user is not authenticated into an account associated with the user.

If the network entity's processing system 600 determines at block 804 of FIG. 4 that a data integration event needs to be generated, then the process moves to block 808 of FIG. 4 where the network entity's processing system 600 may generate and transmit a data integration event to the agent at a workstation associated with the network entity. In one embodiment, the ability of the network entity's processing system 600 to generate and transmit a data integration event may be part of the back-end intelligence of the network entity's processing system 600 because the agent may more effectively understand the user's question or concern by analyzing the one or more data integration events.

The process moves to block 812 of FIG. 4 where the agent at a workstation may receive the data integration event transmitted from the network entity's processing system 600.

The process then moves to block 816 of FIG. 4 where the network entity's processing system 600 may determine whether the user needs to enter an additional input in order to initiate the selected contact option.

If the network entity's processing system 600 determines at block 816 of FIG. 4 that an additional input is necessary, then the process moves to block 820 of FIG. 4 where the network entity's processing system 600 may generate and present an input field or widget to the user. In one embodiment, this additional input field may be presented when the user chooses call-back as the selected contact option. If the user chooses call-back as the selected contact option, the network entity's processing system 600 may present a text input field or widget in which the user enters the phone number on which the user may be reached. The network entity's processing system 600 may also present a field or a widget in which the user enters the date and time at which the user would like to be contacted via the selected contact option. If the user chooses chat as the selected contact option, the network entity's processing system 600 may present a text input field in which the user enters a desired nickname to chat with an agent. This may be useful if the user is not authenticated into the network entity's processing system 600 and the user wishes to protect his or her privacy. In one embodiment, if the user chooses mail-back as the selected contact option, the network entity's processing system 600 may present text input widgets or fields where the user enters a question or concern and a mailing address so that the user can receive a response from the entity via postal mail.

If the network entity's processing system 600 presents an additional input widget at block 820 of FIG. 4, the user may enter the additional input at block 824 of FIG. 4.

The process moves to block 828 of FIG. 4 where the network entity's processing system 600 may initiate the selected contact option.

The process then moves to block 832 of FIG. 4 where the network entity's processing system 600 may determine whether to present an interface for the selected contact option.

If the network entity's processing system 600 determines at block 832 of FIG. 4 that an interface needs to be generated and presented for the selected contact option, then the process moves to block 836 of FIG. 4 where the network entity's processing system 600 may present the selected contact option's interface. In an embodiment, the network entity's processing system 600 may present an interface for chat or email.

In one embodiment where email is the selected contact option, the network entity's processing system 600 may initiate and present a local email application associated with the user's computing device where the entity recipient's email address has been prefilled so that the user may compose a message and email the entity.

In another embodiment where email is the selected contact option, the network entity's processing system 600 may present a remote email application interface as a pop-up window, a call-out panel, or a pop-up panel where the user is prompted to enter information such as the user's name, contact information, and question or concern. In this embodiment, the entity recipient's email address may be hidden from the user.

In an embodiment, the network entity's processing system 600 may also present an interface for voice, i.e., call-in, if a call is initiated from the user's computing device to the agent. The interface may present the name of the agent at the network entity, the time elapsed during the call, the quality of the voice connection, etc. In an embodiment, the network entity's processing system 600 may not present an interface if phone, i.e. call-back, is the selected contact option as the agent just calls the user using the phone number entered in block 824 of FIG. 4.

In an embodiment, the network entity's processing system 600 may not present an interface if mail-in or mail-back is the selected contact option. However, in another embodiment for the mail-in option, the network entity's processing system 600 may present the entity's mailing address at block 836 of FIG. 4, wherein the user's question or concern should be directed to the presented mailing address. In another embodiment where a user selects a mail-back option, the network entity's processing system 600 may present at block 836 of FIG. 4 a message indicating that the user's question or concern (entered in block 824 of FIG. 4) has been received, and that an answer will be mailed to the user in an estimated period of time.

The process then moves to block 840 of FIG. 4 where the network entity's processing system 600 may determine whether the agent should initiate contact with the user or whether the user should initiate contact with the agent.

If the network entity's processing system 600 determines at block 840 of FIG. 4 that the user should initiate contact with the agent, then the process moves to block 844 of FIG. 4 where the network entity's processing system 600 may prompt the user to initiate contact with the agent via the selected contact option.

The process then moves to block 852 of FIG. 4 where the user may initiate contact with the agent via the selected contact option.

If the network entity's processing system 600 determines at block 840 of FIG. 4 that the agent should initiate contact with the user, then the process moves to block 848 of FIG. 4 where the network entity's processing system 600 may prompt the agent to initiate contact with the user via the selected contact option.

The process then moves to block 856 of FIG. 4 where the agent may initiate contact with the user via the selected contact option.

Automated Embodiments of Integrated Contact Process Flow

As used herein, the act of selecting a channel refers to the act of selecting an activatable link to a channel. Also, the act of selecting a contact option refers to the act of selecting an activatable link to a contact option.

In one embodiment, the network entity's processing system 600 may be capable of supporting an automated contact process where the network entity's processing system 600 may allow the user to select a channel, and subsequently the network entity's processing system 600 may automatically select a contact option rather than allowing the user to select a contact option. In this embodiment, this process may jump from block 708 of FIG. 3 to block 804 of FIG. 4. In one embodiment, when the user selects a channel in block 708 of FIG. 3, the network entity's processing system 600 may generate, but may not present, a plurality of contact options associated with the channel. In one embodiment, the network entity's processing system 600 may only generate, but may not present, those contact options that are configured for a computing platform and an electronic interface on which the activatable indicium is activated. The network entity's processing system 600 may generate, but may not present, either an estimated waiting time or a standardized preference index according to the embodiments described earlier. Rather than presenting activatable links to these contact options as described in an earlier embodiment, the network entity's processing system 600 may automatically select a contact option from the plurality of contact options that the network entity's processing system 600 had generated earlier. In one embodiment the network entity's processing system 600 may automatically select a contact option with the lowest estimated waiting time. In another embodiment, the network entity's processing system 600 may automatically select a contact option with the highest standardized preference index. In such an embodiment, the user may not have to expend any time in choosing a desired contact option to initiate contact with an agent associated with the network entity.

In one embodiment, the network entity's processing system 600 may be capable of supporting an automated contact process where the network entity's processing system 600 may automatically select a channel, and subsequently the network entity's processing system 600 may allow the user to select a contact option. In this embodiment, the process in FIG. 3 may jump from block 704 of FIG. 3 to block 724 of FIG. 3. In such an embodiment, the network entity's processing system 600 may automatically select the channel that is most related to or most specifically related to the interface page on which or at the instant when the activatable indicium is activated. In such an embodiment, the user may not have to expend any time in choosing a desired channel that can answer a question or concern that the user may have.

In another embodiment, the network entity's processing system 600 may support a "one-click" contact process, where the network entity's processing system 600 may automatically select both a channel and a contact option to facilitate contact with the entity. In this embodiment, the process in FIG. 3 may jump from block 704 of FIG. 3 to block 804 of FIG. 4. In such an embodiment, the network entity's processing system 600 may automatically select the channel that is most related to or most specifically related to the interface page on which or at the instant when the activatable indicium is activated. Additionally, the network entity's processing system 600 may automatically select the contact option with the lowest estimated waiting time or the highest standardized preference index. In such an embodiment, the user may not have to expend any time in choosing a channel that can answer a question or concern that the user may have or a contact option to initiate contact with a channel of a network entity.

Additionally, in the automated embodiments described above, the network entity's processing system 600 may sometimes automatically initiate the selected contact option without determining whether additional input is required from the user.

Single Identifiable Entry Point Interface

Figure 5:
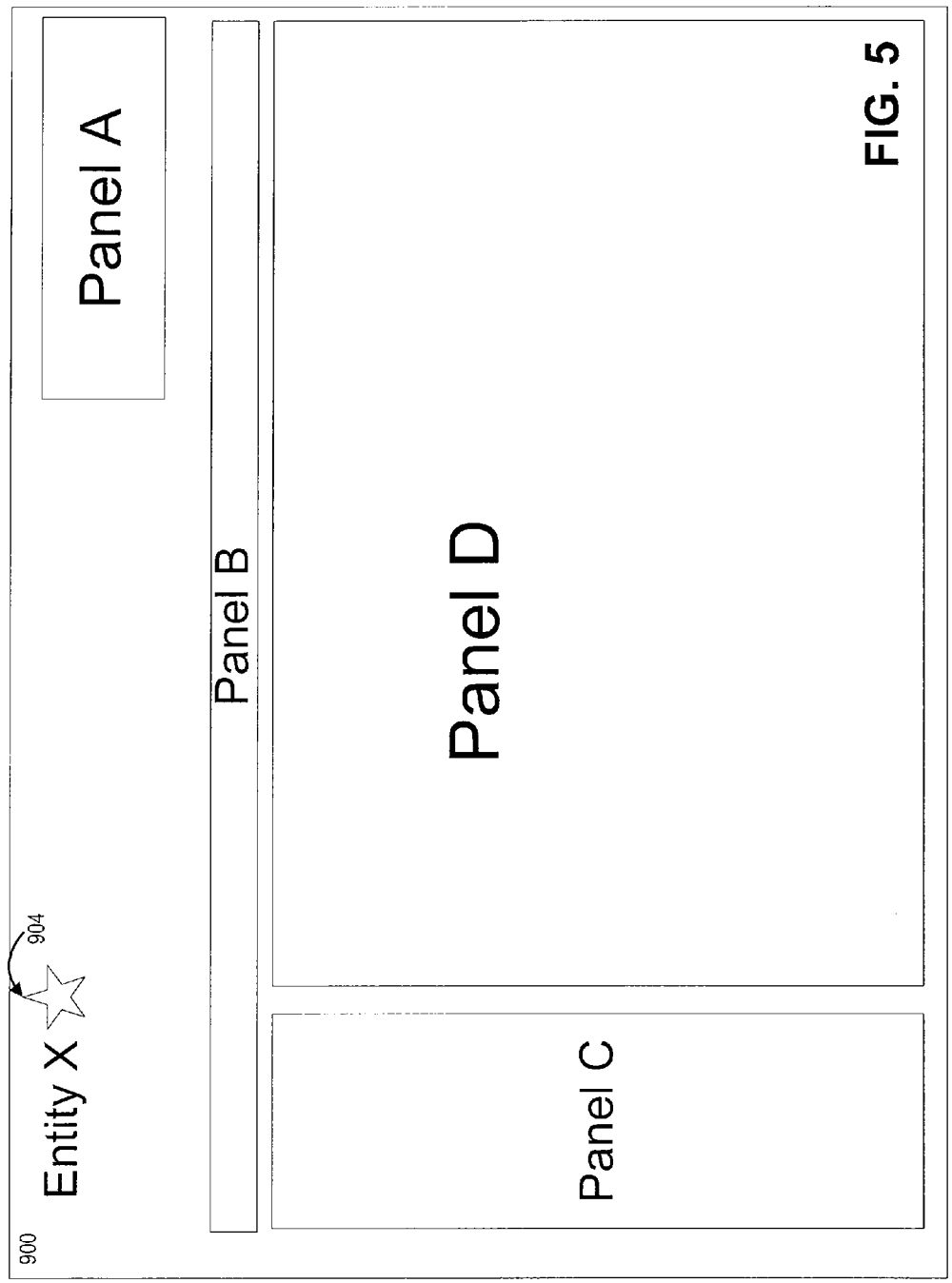

FIG. 5 displays a screenshot of a computing device interface 900 with an activatable indicium 904 configured as an entry point for accessing contact information, in accordance with embodiments of the present invention. FIG. 5 may represent a page on a computing device interface or any other interface. The interface page 900 may be a hosted, local, or remote interface page. The interface page 900 may be a page of a website interface, an emulated hosted internet application interface, a mobile interface, a local application interface, a website interface, a website address, or the like. As used in several instances below, the "first" interface page is the interface page on which or at the instant when the activatable indicium is activated.

In one embodiment, an application download server or the network entity's processing system 600 may permit a user to download an application such that when the application is installed, the activatable indicium may be presented on the taskbar of an interface.

In FIG. 5, "Entity X" may be the name of the network entity that hosts the interface page or it may also be the title of the interface page. Panels A, B, C, and D may represent the various other parts of the interface page. Some interface pages may have more panels, while some may have fewer panels.

The activatable indicium 904 may be presented anywhere on the interface page. Moreover, in some embodiments, there may be more than one instance of the activatable indicium 904 presented on the interface page.

Figure 6:
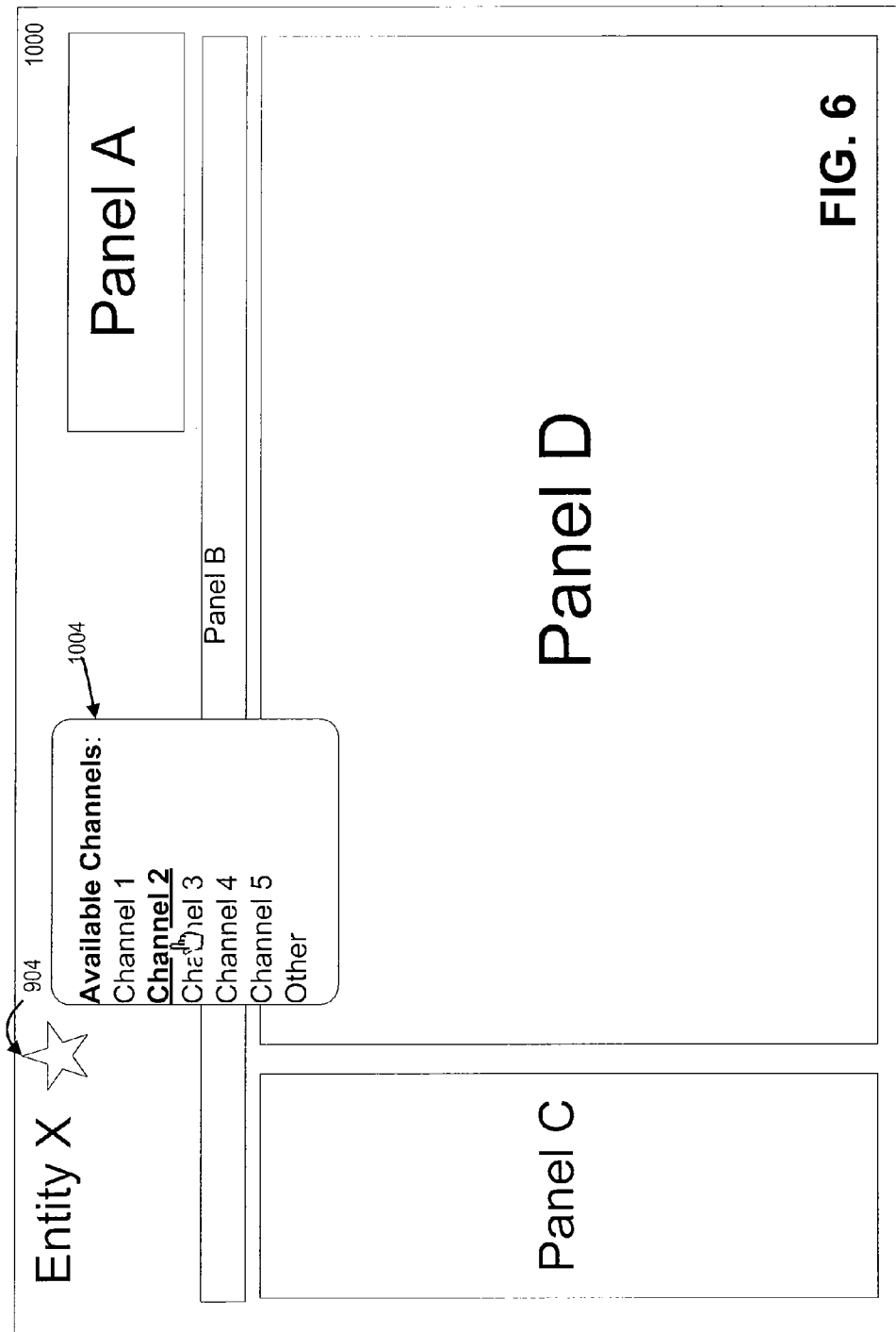

FIG. 6 displays a screenshot 1000 of one embodiment of the invention where after the user activates the activatable indicium, the network entity's processing system 600 may generate and present activatable channel links 1004 to the plurality of channels. The activatable links to channels 1004 may be presented in at least one call-out panel on the first interface page, without redirecting the user to a second interface page.

In one embodiment, the network entity's processing system 600 may require two levels of input to select a channel that is presented in the call-out panel: a first level of input and a second level of input. The first level of input may provide for the user pointing at or hovering on one of the activatable links to a channel, e.g., "Channel 2" as shown in FIG. 6. In essence, the first level of input may not involve the user completing a positive act. The second level of input may provide for the user actually selecting one of the channels by a positive act, e.g., clicking an activatable link to a particular channel. In an embodiment where the network entity's processing system 600 prompts for first and second inputs, the network entity's processing system 600 may highlight or project the activatable link to a channel in response to receiving the first level of input from the user. This phenomenon is visible in FIG. 6 where the network entity's processing system 600 changes the font associated with "Channel 2." In other embodiments, the network entity's processing system 600 may magnify the text associated with the activatable link for "Channel 2" or may present a box around "Channel 2" or the like. In this manner, the user may select the highlighted or projected activatable link associated with "Channel 2" by entering the second level of input, i.e., clicking the highlighted or projected activatable link. Prompting the user to enter two levels of input may prevent the user from inadvertently selecting another channel.

Figure 7:
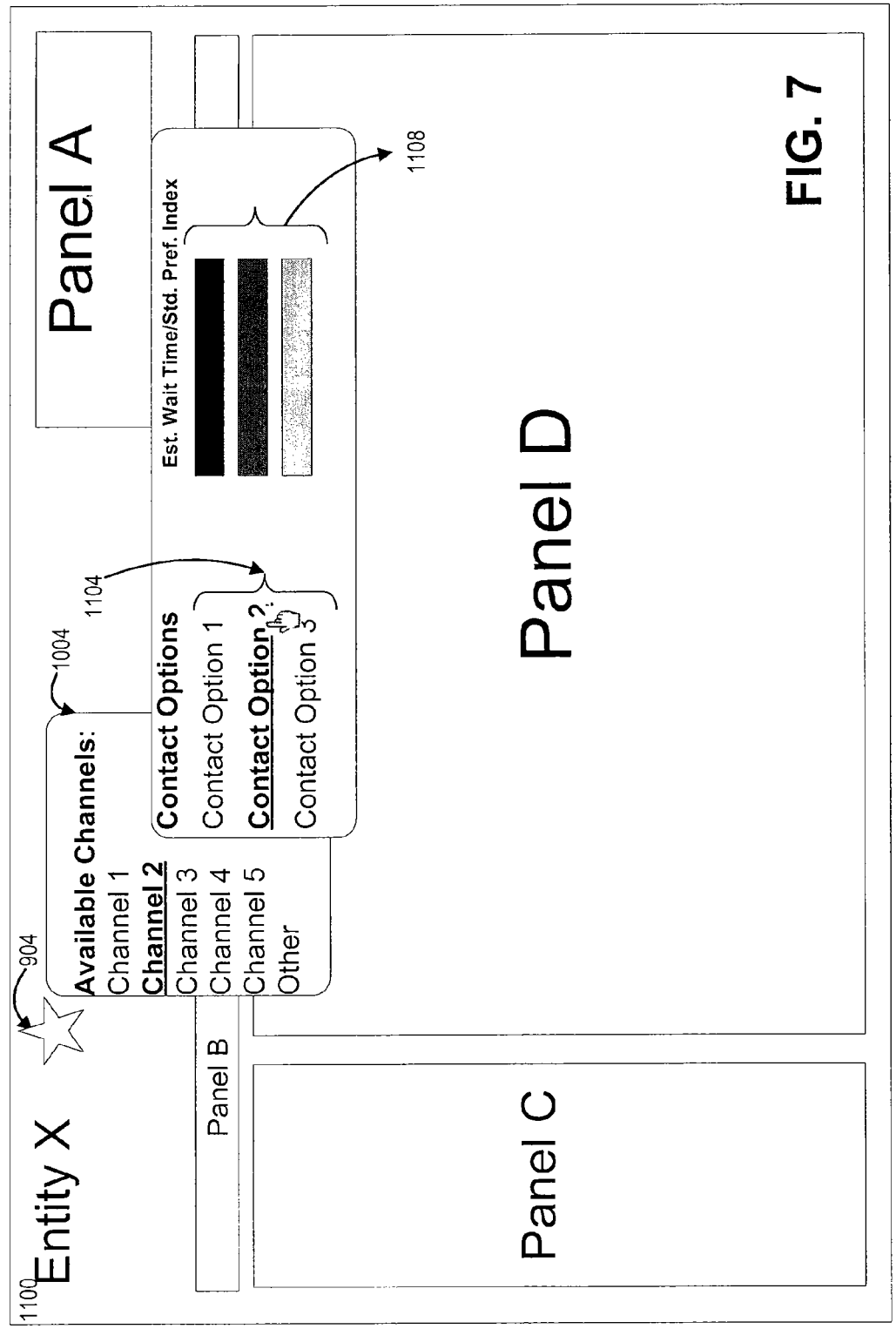
Figure 8:
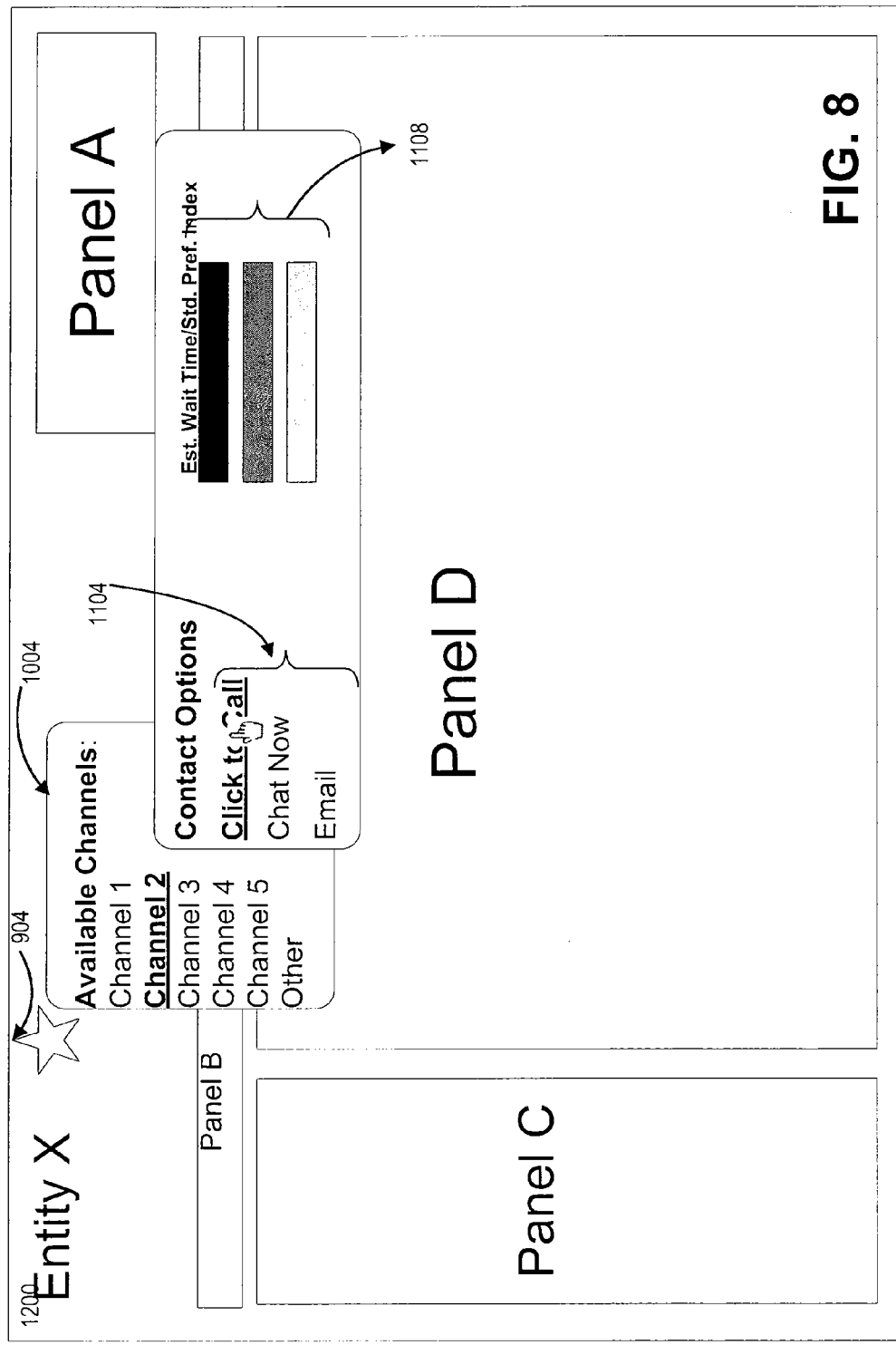

FIGS. 7 and 8 display screenshots 1100 and 1200 respectfully, of the invention where, after the user selects an activatable link to a channel, the network entity's processing system 600 generates and presents activatable links to a plurality of contact options associated with the selected channel. In this embodiment, the possible contact options may be presented in at least one call-out panel on the first interface page, without redirecting the user to a second interface page. In another embodiment, the possible contact options may be presented on another interface page to which the user is redirected or may be presented in a pop-out window or a pop-up panel.

FIGS. 7 and 8 also display the estimated waiting time 1108 associated with each contact option. In one embodiment, as shown in FIGS. 7 and 8, the degree to which the estimated waiting time bar graph is shaded may indicate the degree to which the corresponding contact option is unavailable. In other embodiments of the invention, other graphical representations may be used to illustrate the estimated waiting time. According to FIG. 8, "Email" may be the contact option with the best availability, i.e., the shortest estimated waiting time, and "Click to Call" may be the contact option with the worst availability, i.e., the longest estimated waiting time. In one embodiment, when the estimated waiting time bar graph is fully shaded for a particular contact option, the network entity's processing system 600 may indicate to the user that the contact option may be unavailable, i.e., that the user may not be able to access the corresponding contact option even if the user is willing to wait for a long time. In another embodiment, when the estimated waiting time bar graph is fully shaded, the network entity's processing system 600 may indicate to the user that the estimated waiting time is greater than a particular threshold of waiting time, e.g., greater than one hour. This might save the network entity's processing system 600 processing resources utilized in computing the exact duration of estimated waiting time. In still another embodiment, the network entity's processing system 600 may not present an estimated waiting time bar graph if a contact option is unavailable.

In one embodiment, the network entity's processing system 600 may present a separate legend, which may be color-coded so that the user may easily understand how the estimated waiting time for a contact option compares with the estimated waiting times of other contact options. For instance, in one embodiment, the legend shows that a green colored bar graph may be used to indicate an available contact option, a red colored bar graph may be used to indicate an unavailable contact option, and a bar graph that has a mixture of the two colors may be used to depict the degree to which a particular contact option is available or unavailable. Additionally, it is noted that any feasible graphical or visual representation may be used to illustrate estimated waiting times.

In one embodiment, as shown in FIGS. 7 and 8, the network entity's processing system 600 may present the estimated waiting time 1108 for each contact option in the same call-out panel as the activatable links to the contact options 1104. In another embodiment, the network entity's processing system 600 may present the estimated waiting times in a different call-out panel from the panel that displays the activatable links to the contact options. In still another embodiment, the network entity's processing system 600 may present the estimated waiting time for a contact option only after an activatable link to the contact option is selected.

In one embodiment where the estimated waiting time bar graphs are replaced with standardized preference index bar graphs 1108, the degree to which the standardized preference index bar graph is shaded may indicate the degree to which the corresponding contact option is preferred. Therefore, if in FIG. 8, the estimated waiting time bar graphs are replaced with standardized preference index bar graphs, "Email" may be the most preferred contact option, and "Click to Call" may be the least preferred contact option. As illustrated, "Click to Call" is fully shaded which may indicate that it may be unavailable at the instant when the screenshot was taken. In one embodiment, when the standardized preference index bar graph is completely shaded for a particular contact option, the network entity's processing system 600 may indicate to the user that the contact option may be unavailable, i.e., that the user may not be able to access the corresponding contact option even if the user is willing to wait for a long time or incur huge expenses in utilizing that particular contact option. In another embodiment, when the standardized preference index bar graph is completely shaded, the network entity's processing system 600 may indicate to the user that the standardized preference index may be below a minimum preference index threshold. In still another embodiment, the network entity's processing system 600 may not present a standardized preference index bar graph for a particular contact option if that particular contact option is unavailable.

In one embodiment where a standardized preference index is presented for each contact option, the network entity's processing system 600 may present a separate legend, which may be color-coded, so that the user can easily understand how the standardized preference index for a contact option compares with the standardized preference indexes of other contact options. For instance, in one embodiment, the legend shows that a green colored bar graph may be used to indicate the most preferred contact option, a red colored bar graph may be used to indicate the least preferred contact option, and a bar graph that has a mixture of the two colors may be used to depict the degree to which a particular contact option is preferred or not preferred.

In one embodiment, the ability of the network entity's processing system 600 to generate and present a standardized preference index for each of the plurality of contact options may be part of the back-end intelligence of the network entity's processing system 600 because the network entity's processing system 600 presents knowledge regarding the status of each contact option.

In one embodiment, the network entity's processing system 600 may present the standardized preference index for each contact option in the same call-out panel as the activatable links to the contact options. In another embodiment, the network entity's processing system 600 may present the standardized preference indexes in a different call-out panel from the panel that displays the activatable links to the contact options. In still another embodiment, the network entity's processing system 600 may present the standardized preference index for a contact option only after an activatable link to that contact option is selected. In still another embodiment, the network entity's processing system 600 may present an activatable link in the place of the standardized preference indexes. Selecting the activatable link may redirect the user to an interface page with the standardized preference index for each contact option.

In one embodiment, the network entity's processing system 600 may require two levels of input to select a contact option: a first level of input and a second level of input. The first level of input may consist of the user pointing at or hovering on one of the activatable links to a contact option, e.g., "Contact Option 2" or "Click to Call" as shown in FIG. 7 and FIG. 8, respectively. In essence, the first level of input may not involve the user completing a positive act. The second level of input may consist of the user actually selecting one of the contact options by a positive act, e.g., clicking an activatable link to a particular contact option. In an embodiment where the network entity's processing system 600 prompts for first and second inputs, the network entity's processing system 600 may highlight or project the activatable link to a contact option in response to receiving the first level of input from the user. This phenomenon may be visible in FIGS. 7 and 8 where the network entity's processing system 600 changes the font associated with "Contact Option 2" and "Click to Call," respectively. In other embodiments, the network entity's processing system 600 may magnify the text associated with the activatable links for "Contact Option 2" and "Click to Call" or may present a box around "Contact Option 2" and "Click to Call." In this manner, the user may select the highlighted or projected activatable links associated with "Contact Option 2" or "Click to Call" by entering the second level of input, i.e., clicking the highlighted or projected activatable links. Prompting the user to enter two levels of input may prevent the user from inadvertently selecting another contact option.

In one embodiment, the network entity's processing system 600 may also generate and present each of the available agents associated with the selected contact option and the selected channel. In such an embodiment, the user may select a specific agent from the presented plurality of available agents.

Figure 9:
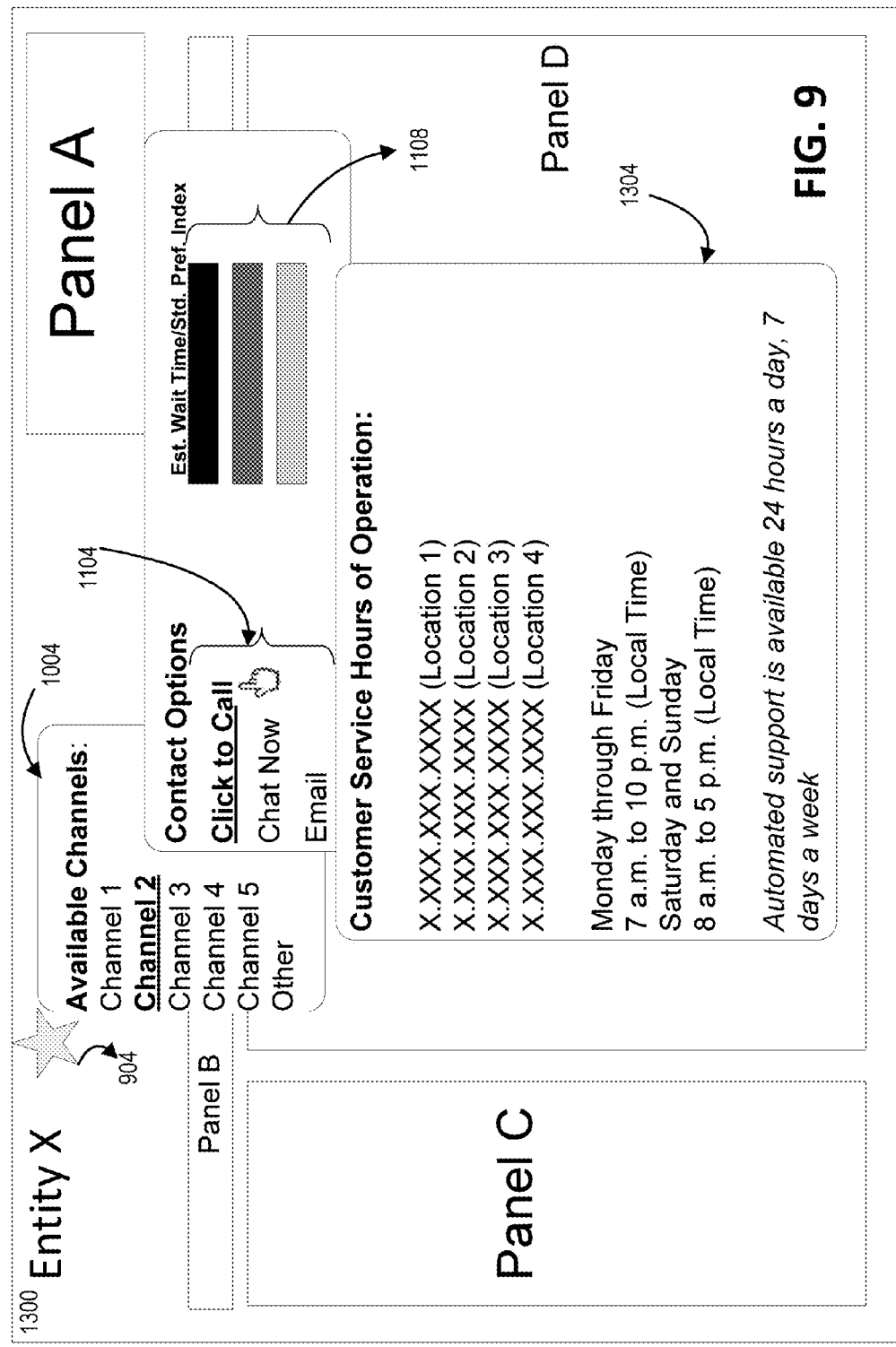

FIG. 9 displays a screenshot 1300 in which the user selected the "Click to Call" option on the first interface page, and since this contact option is unavailable, the network entity's processing system 600 may present a status message, which may include the hours of operation or the like, in a pop-up panel 1304. In one embodiment, the network entity's processing system 600 may present the status message as a pop-window on the interface. In still another embodiment, the network entity's processing system 600 may redirect the user to another interface page that presents the status message. If the selected contact option is no longer available for the selected channel, the network entity's processing system 600 may configure the status message to indicate that the selected channel is no longer available.

As shown in FIG. 9, in one embodiment, status message includes the phone numbers for the channel so that a user may contact the selected channel's interactive voice response ("IVR") functionality even though the channel is not available. In one embodiment, the IVR functionality associated with a channel may provide an automated attendant to interact with a user. In one embodiment where the entity is a financial institution, the automated attendant may be able to assist the user with functions such as checking the balance of the user's account, paying the balance on the user's account, or the like.

Figure 10:
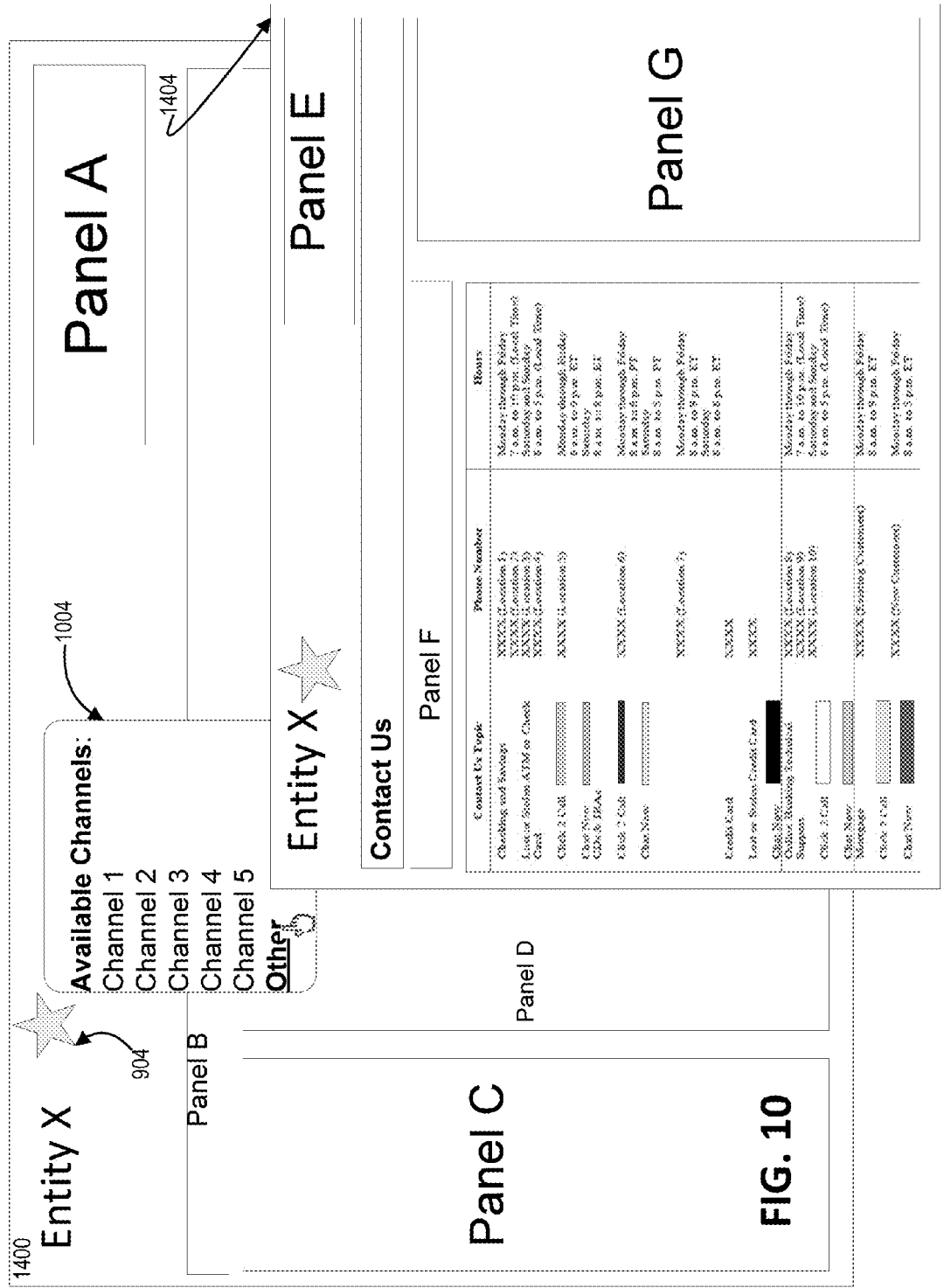

FIG. 10 displays a screenshot 1400 that results from the user selecting, on a computing device, the "Other" option from among the plurality of channels. Subsequently, the network entity's processing system 600 may generate and present activatable links to a plurality of channels including channels unrelated to the interface page, activatable links to a plurality contact options associated with each of the plurality of channels, information regarding each of the plurality of contact options, and estimated waiting times or standardized preference indexes associated with each of the plurality of contact options. In one embodiment, the network entity's processing system 600 may present on a second interface page to which the user is redirected, activatable links to the plurality of channels including channels unrelated to the first interface page along with the other related data. Alternatively, the network entity's processing system 600 may present all of this information in a call-out panel or pop-up panel on the first interface page, or in a separate pop-up window.

Figure 11:
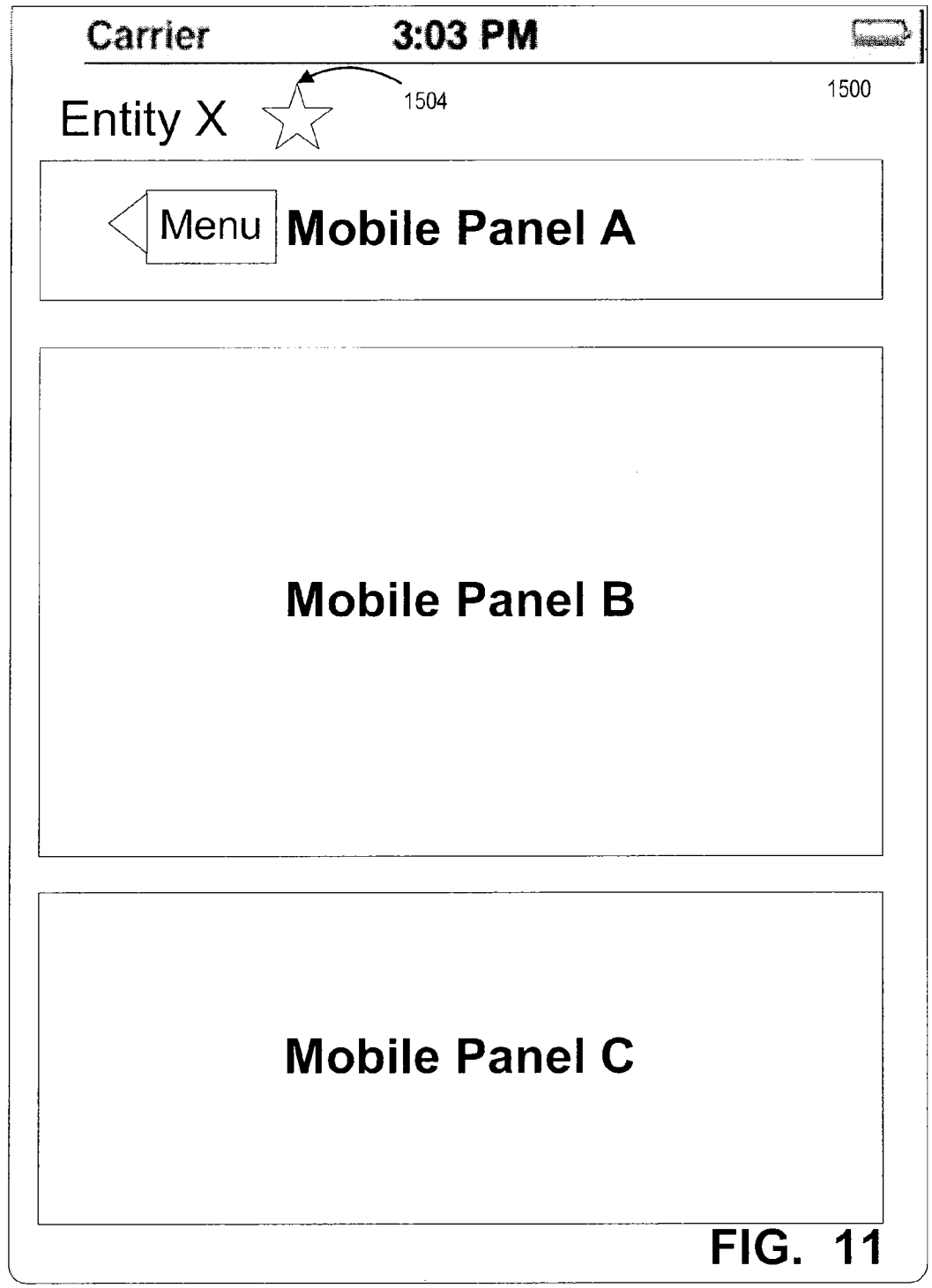

FIG. 11 displays a screenshot 1500 of a mobile interface page with an activatable indicium 1504, wherein the activatable indicium is presented according to the embodiments described above. In the illustrated example of FIG. 11 the activatable indicium 1504 takes the form of an entity's logo, while in other embodiments the activatable indicium may be identifiable as an entry point for accessing contact information for an entity (e.g., the word "contact" or phrase "contact us") or the activatable indicium may take a form that is not readily identifiable as an entry point for accessing the contact information until the activatable indicium is activated.

Figure 12:
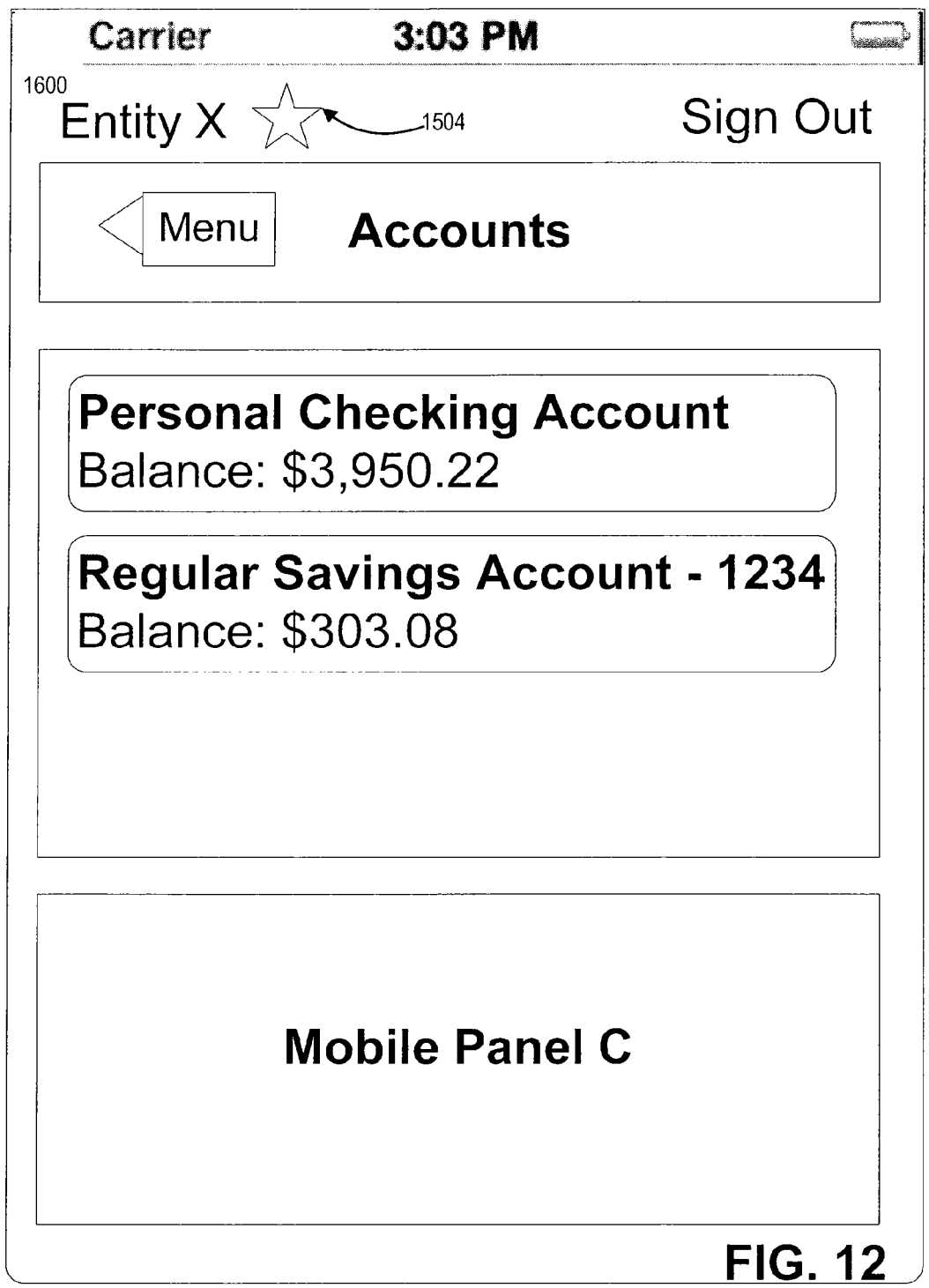

FIG. 12 displays a screenshot 1600 with an activatable indicium 1504, where the "Accounts" label and the "Menu" button occupy Mobile Panel A, while activatable links to a user's bank account occupy Mobile Panel B. Some mobile interface pages may have more panels, while some may have fewer panels. The mobile interface page may be a mobile webpage accessed through a mobile web browser, or the mobile interface page may be a mobile application's interface page.

In the embodiment shown in FIG. 12, the activatable indium 1504 may be presented on an interface page into which the user has been authenticated. However, in other embodiments, the activatable indicium may be presented on an interface page into which the user has not been authenticated.

Figure 13:
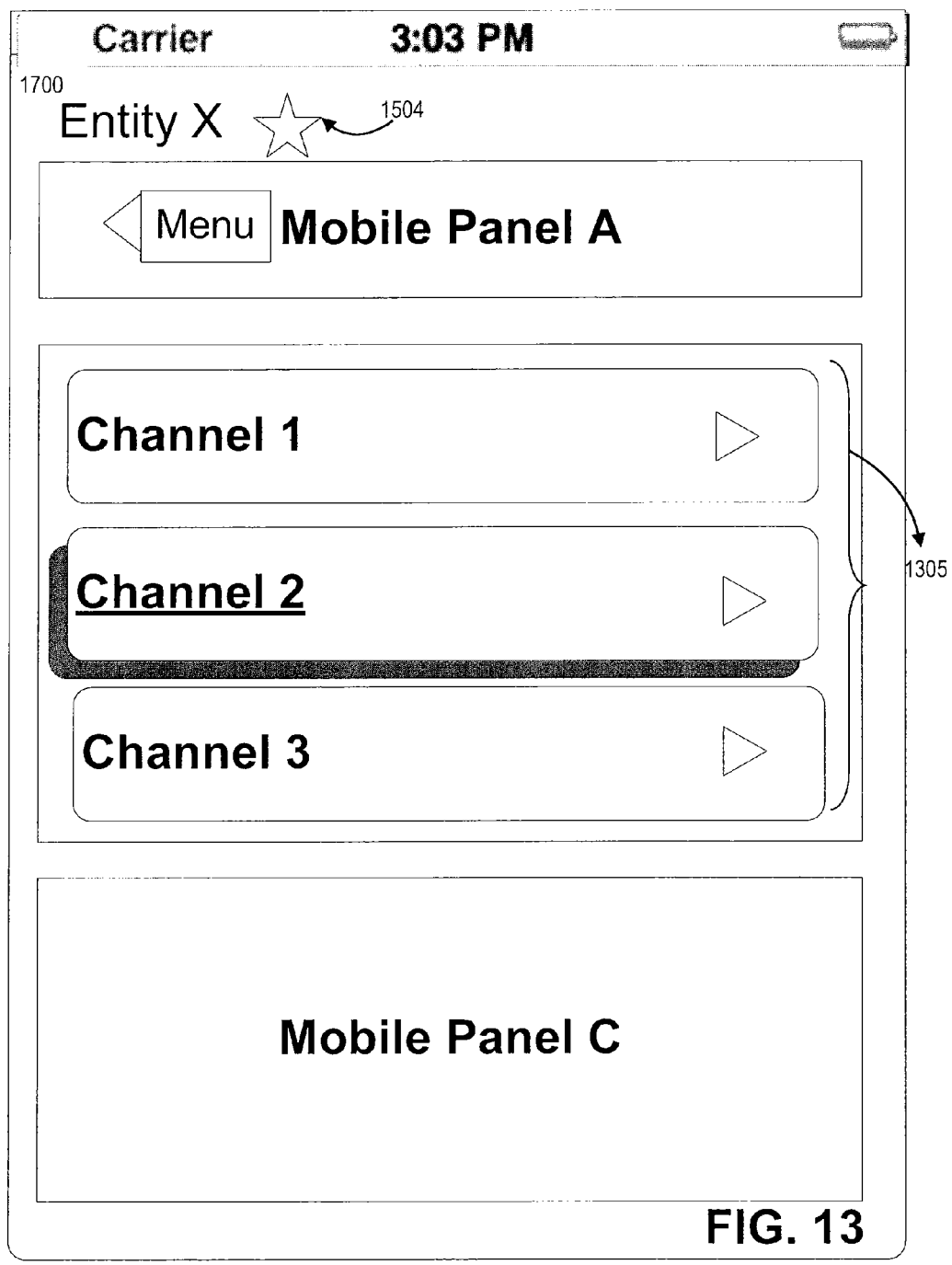
Figure 14:
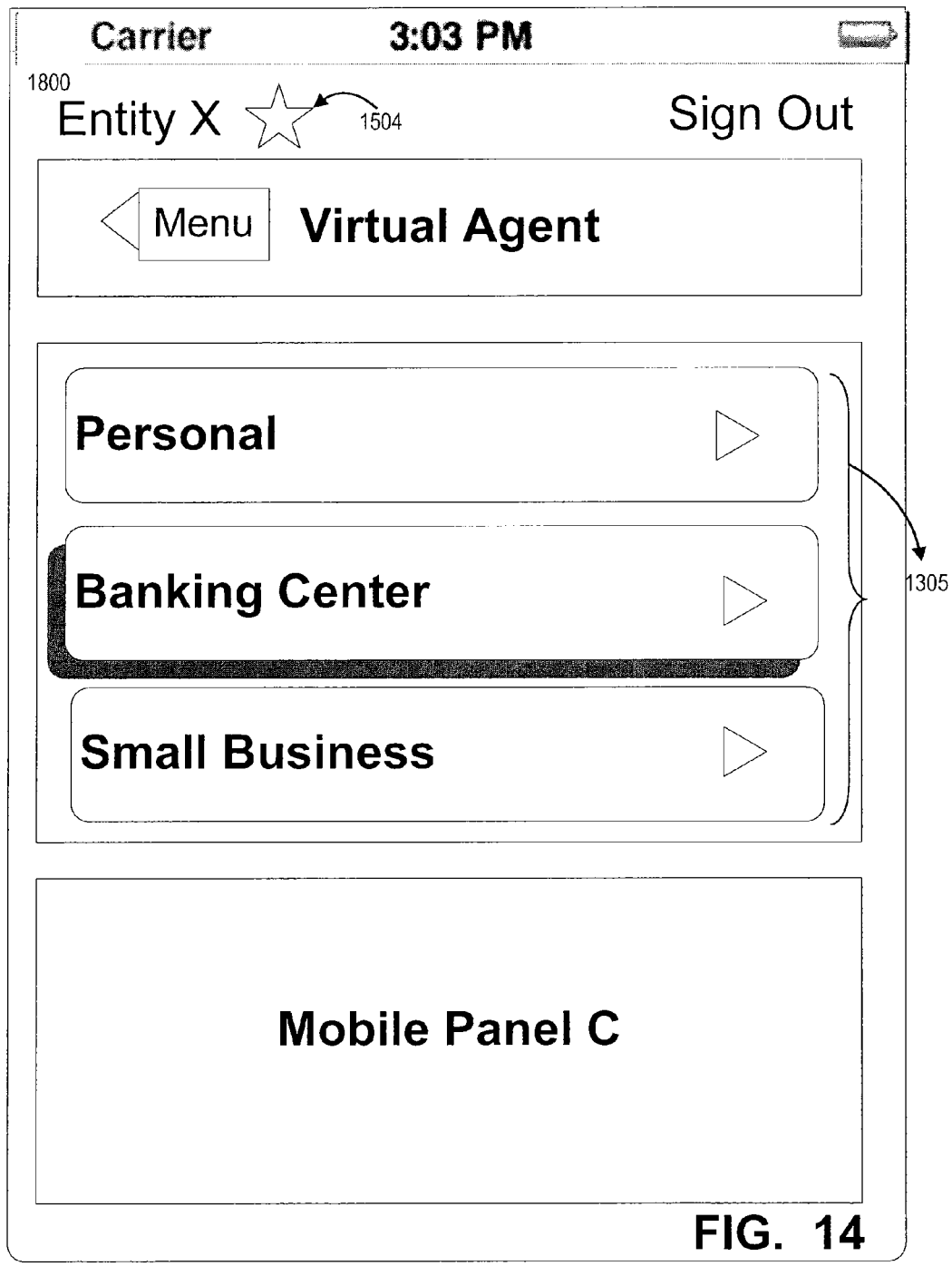

FIGS. 13 and 14 display screenshots 1700 and 1800, respectively, of an embodiment using a mobile platform and a mobile interface where after the user activates the activatable indicium 1504 located near the top of the mobile device 400 display, the network entity's processing system 600 may generate and present activatable links to the plurality of channels 1305 on a new mobile interface page. As can be seen in FIGS. 13 and 14, the activatable indicium 1504 may still be viewable on the new mobile interface page, so that the user may activate the activatable indicium 1504 without having to return to the first mobile interface page or any previous mobile interface pages.

In one embodiment using a mobile device, a first level of input, as described in the above embodiments, may provide for the user pointing at or hovering on one of the activatable links to a channel, e.g., "Channel 2" in FIG. 13 or "Banking Center" in FIG. 14. This phenomenon is visible on the mobile interface in FIGS. 13 and 14 where the network entity's processing system 600 may project the activatable links associated with "Channel 2" and "Banking Center," respectively. In an embodiment using a mobile device 400 with a touch screen, both the first input and second input, as described in above embodiments, may provide for the user touching the appropriate activatable link to a channel on the mobile interface. Therefore, in such an embodiment using a mobile device 400 with a touch screen, a user may have to twice touch an activatable link to a channel in order to select the channel.

Figure 15:
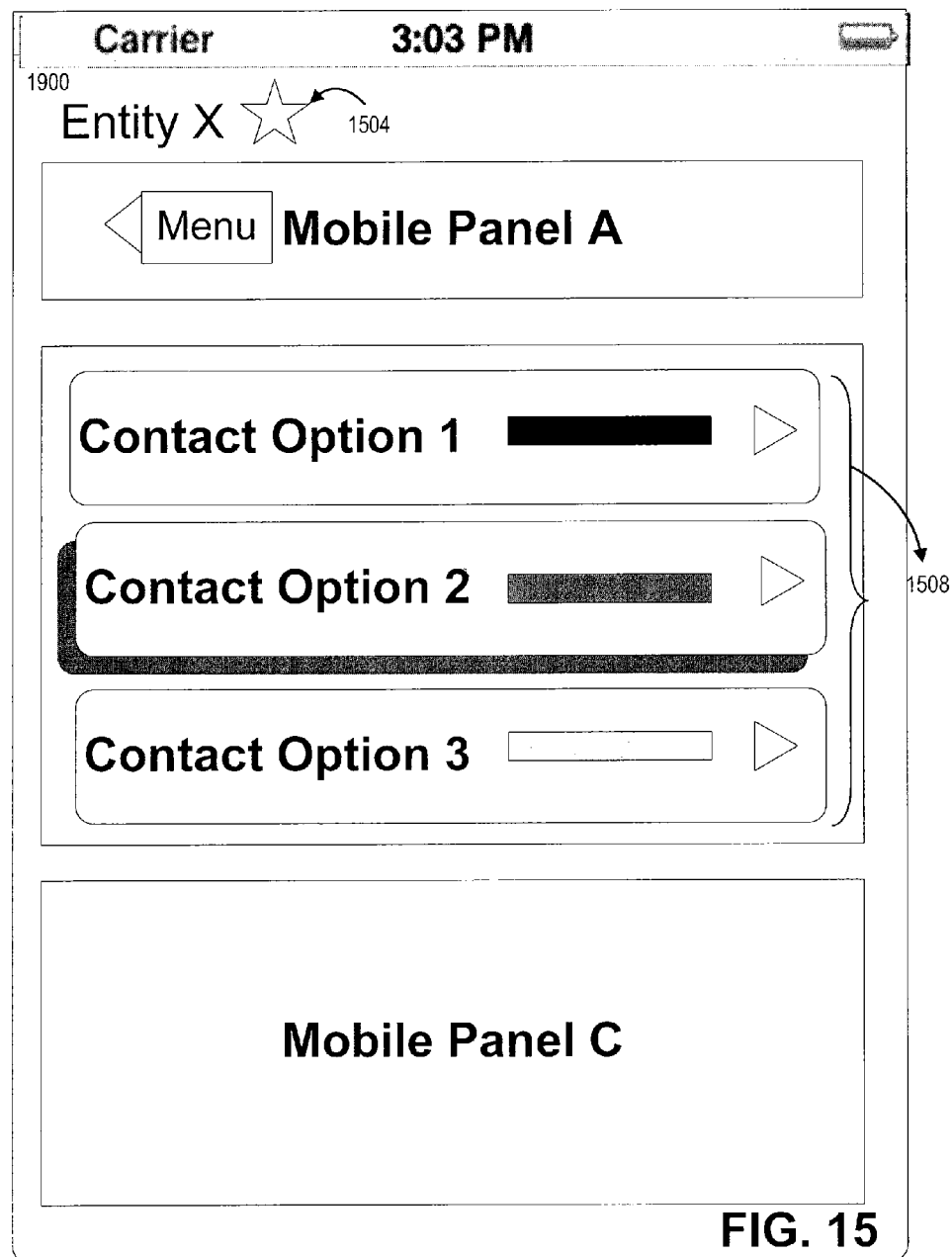
Figure 16:
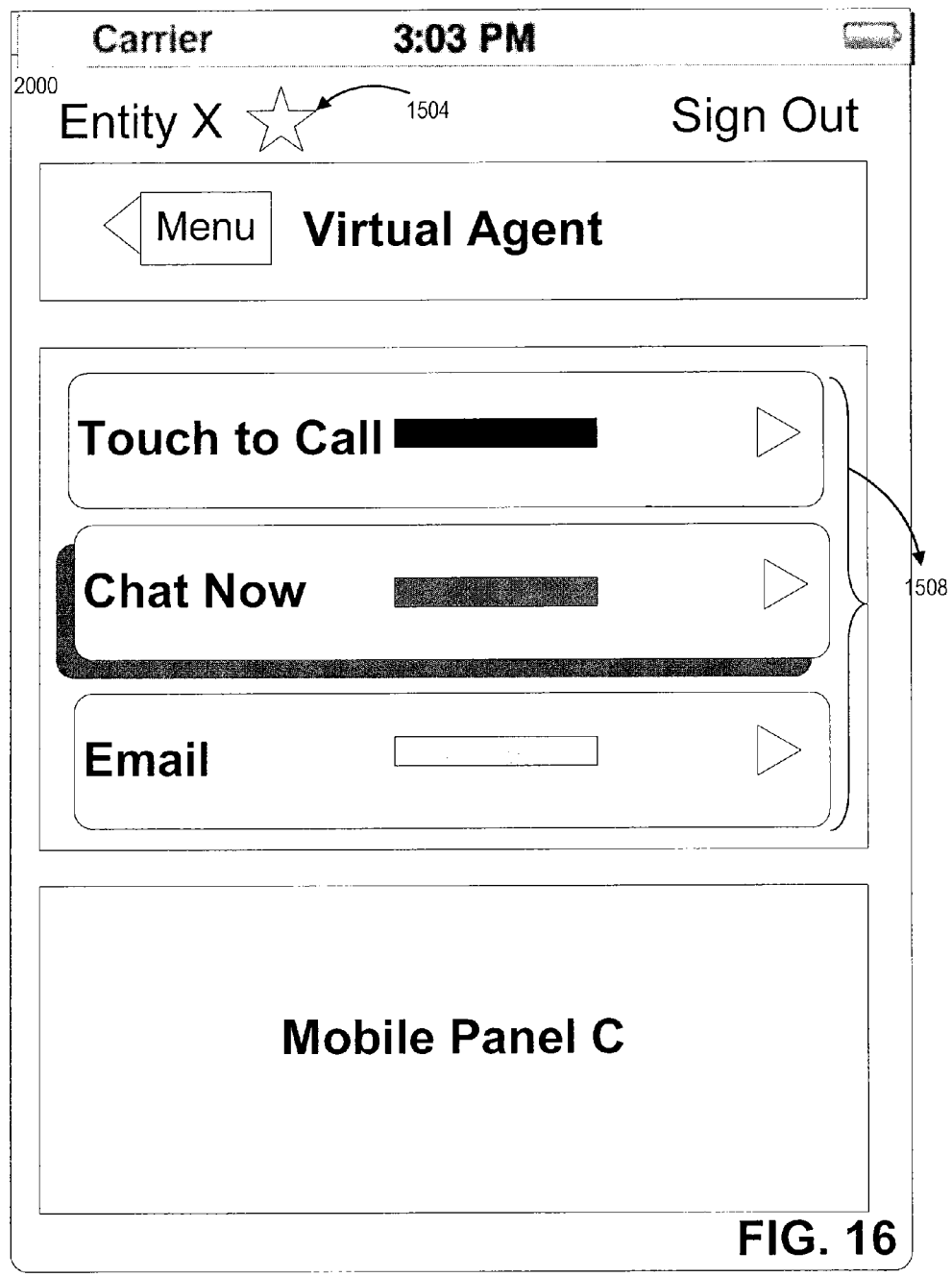

FIGS. 15 and 16 display screenshots 1900 and 2000, respectively, of a mobile interface where the network entity's processing system 600 may generate and present on a new mobile interface page activatable links to a plurality of contact options 1508. As can be seen in FIGS. 15 and 16, the activatable indicium 1504 may still be viewable on the new mobile interface page, so that the user may activate the activatable indicium 1504 without having to return to the first mobile interface page or any previous mobile interface pages.

In one embodiment using a mobile device, the first level of input, as described in the above embodiments, may provide for the user pointing at or hovering on one of the activatable links to a contact option, e.g., "Contact Option 2" in FIG. 15 or "Chat Now" in FIG. 16. This phenomenon is visible on the mobile interface in FIGS. 15 and 16 where the network entity's processing system 600 may project the activatable links associated with "Contact Option 2" and "Chat Now," respectively. In an embodiment using a mobile device 400 with a touch screen, both the first input and second input may provide for a user touching the appropriate activatable link to a contact option on the mobile interface. Therefore, in such an embodiment, the user may have to twice touch an activatable link to a contact option in order to select the contact option.

FIGS. 17 and 18 display screenshots 2100 and 2200, respectively, of an electronic kiosk 2102 interface that displays the features described above with respect to a computing device. The activatable indicium 2104 on the kiosk interface 2100 is presented according to the embodiments described above. In the illustrated example of FIGS. 17 and 18, the activatable indicium 2104 takes the form of an entity's logo, while in other embodiments, the activatable indicium may be identifiable as an entry point for accessing contact information for an entity (e.g., the word "contact" or phrase "contact us") or the activatable indicium may take a form that is not readily identifiable as the entry point for accessing the contact information until the activatable indicium is activated.

FIG. 18 displays a screenshot 2200 of one embodiment of the invention where after the user activates the activatable indicium, the network entity's processing system 600 may generate and present activatable channel links 2206 to the plurality of channels. The activatable links to channels may be presented in at least one call-out panel on the first interface page, without redirecting the user to a second interface page.

As displayed in FIG. 18, after the user selects an activatable link to a channel, the network entity's processing system 600 may generate and present activatable links 2208 to a plurality of contact options associated with the selected channel.

FIG. 18 also displays the estimated waiting time 1808 associated with each contact option.

Single Identifiable Entry Point Environment

In FIG. 1, the user 110 may be a past, current, or future customer or just a person who wishes to ask a question, regardless of whether the question is of a general or specific nature. The computing device 300 or workstation 500 may be any device that employs a processor and memory and can perform computing functions, such as a personal computer. A computing device may also be an electronic kiosk or a banking ATM center.

The user's computing device 300, the agent's workstation 500, the network entity's processing system 600 are each described in greater detail below with reference to FIGS. 20-23. In FIG. 1, the network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 may include a wireless telephone network 152, as seen in FIG. 19.

In FIG. 1, a computing device 300 may be configured to connect with the network 150 to log the user 110 into the network entity's processing system 600. The computing device 300 may be a personal computer, tablet, electronic kiosk, or the like. In one embodiment, the network entity's processing system 600 may be the processing system that hosts the entity's website, mobile website, and the like. In one embodiment, this processing system may be a web server. In one embodiment, the user 110 may access the network entity's processing system 600, regardless of whether the user 110 is authenticated into the network entity's processing system 600. In another embodiment, the network entity's processing system 600 may allow authentication of the user 110 in order to access the user's account on the network entity's processing system 600. For example, the network entity's processing system 600 is a system where a user 110 logs into his/her account such that the user 110 or other entity may access data that is associated with the user 110. For example, in one embodiment of the invention, the network entity's processing system 600 may be a network entity's processing system maintained by a financial institution. In such an embodiment, the user 110 may use the computing device 300 to log into the network entity's processing system 600 to access the user's banking account. Logging into the network entity's processing system 600 generally requires that the user 110 authenticate his/her identity using a user name, a passcode, a cookie, a biometric identifier, a private key, a token, and/or another authentication mechanism that is provided by the user 110 to the network entity's processing system 600 via the computing device 300.

In FIG. 1, the network entity's processing system 600 may be in network communication with other devices, such as other processing systems, a data system that may store various types of data, and a workstation 500 that is configured to communicate with the network 150 to log an agent 120 into the network entity's processing system 600. In one embodiment, the invention may provide an application download server such that software applications that support the network entity's processing system 600 may be downloaded to the user's computing device 300 or mobile device 400.

In some embodiments of the invention, the application download server may be configured to be controlled and managed by one or more third-party data providers over the network 150. In other embodiments, the application download server may be configured to be controlled and managed over the network 150 by the same entity that maintains the processing system 600. In some embodiments of the invention, the data system is configured to be controlled and managed by one or more third-party data providers over the network 150. In other embodiments, the data system may be configured to be controlled and managed over the network 150 by the same entity that maintains the processing system 600.

Referring now to FIG. 19, FIG. 19 is similar to FIG. 1, except the computing device 300 is replaced with a mobile device 400. As used herein, a "mobile device" 400 may be any mobile communication device, such as a cellular telecommunications device (i.e., a cell phone or mobile phone), personal digital assistant (PDA), a mobile Internet accessing device, or other mobile device. In one embodiment, a network entity's mobile processing system, rather than the network entity's processing system 600, may perform the processes associated with the user's mobile device.

Referring now to FIG. 20, the computing device 300 associated with the user 110 may also include various features, such as a network communication interface 310, a processing device 320, a user interface 330, and a memory device 350. The network communication interface 310 may include a device that allows the computing device 300 to communicate over the network 150 (shown in FIG. 1). In one embodiment of the invention, a network browsing application 355 provides for the user to establish network communication with a network entity's processing system 600 (shown in FIG. 1) for the purpose of contacting the network entity.

As used herein, a "processing device," such as the processing device 320, may generally refer to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 330 may generally include a plurality of interface devices and/or software that allows the user 110 to input commands and data to direct the processing device to execute instructions. For example, the user interface 330 presented in FIG. 20 may include a graphical user interface (GUI) or an interface to input computer-executable instructions that direct the processing device 320 to carry out specific functions. The user interface 330 may employ certain input and output devices to input data received from the user 110 or agent 120 or output data to the user 110 or agent 120. These input and output devices may include a display, mouse, keyboard, button, touchpad, touch screen, microphone, speaker, joystick, switch, and/or other user input/output devices for communicating with one or more users or agents.

As used herein, a "memory device" 350 may generally refer to a device or combination of devices that store one or more forms of computer-readable media for storing data and/ or computer-executable program code/instructions. Computer-readable media is defined in greater detail below. For example, in one embodiment, the memory device 350 may include any computer memory that provides an actual or virtual space to temporarily or permanently store data and/or commands provided to the processing device 320 when it carries out its functions described herein.

FIG. 21 provides a block diagram illustrating the mobile device 400 of FIG. 19 in more detail, in accordance with embodiments of the invention. In one embodiment of the invention, the mobile device 400 may be a mobile telephone. However, it should be understood, however, that a mobile telephone is merely illustrative of one type of mobile device 400 that may benefit from, employ, or otherwise be involved with embodiments of the present invention and, therefore, should not be taken to limit the scope of embodiments of the present invention. Other types of mobile devices 400 may include portable digital assistants (PDAs), pagers, mobile televisions, gaming devices, laptop computers, cameras, video recorders, audio/video player, radio, GPS devices, any combination of the aforementioned, or the like.

The mobile device 400 may generally include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, may generally include circuitry for implementing communication and/or logic functions of the mobile device 400. For example, the processor 410 may include a digital signal processor device, a microprocessor device, and various analog to digital converters, digital to analog converters, and/or other support circuits. Control and signal processing functions of the mobile device 400 may be allocated between these devices according to their respective capabilities. The processor 410 thus may also include the functionality to encode and interleave messages and data prior to modulation and transmission. The processor 410 may additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the mobile device 400 to transmit and receive web content, such as, for example, location-based content and/or other web page content, according to a Wireless Application Protocol (WAP), Hypertext Transfer Protocol (HTTP), and/or the like. The processor 410 may also be capable of operating a client application, such as a contact application that is represented by block 421. The contact application 421 may be capable of contacting a channel within an entity or providing contact information for a channel within an entity.

The processor 410 may be configured to use the network interface 460 to communicate with one or more other devices on the network 150. In this regard, the network interface 460 may include an antenna 476 operatively coupled to a transmitter 474 and a receiver 472 (together a "transceiver"). The processor 410 may be configured to provide signals to and receive signals from the transmitter 474 and receiver 472, respectively. The signals may include signaling information in accordance with the air interface standard of the applicable cellular system of the wireless telephone network 152 in FIG. 19. In this regard, the mobile device 400 may be configured to operate with one or more air interface standards, communication protocols, modulation types, and access types. By way of illustration, the mobile device 400 may be configured to operate in accordance with any of a number of first, second, third, and/or fourth-generation communication protocols and/or the like. For example, the mobile device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 400 may also be configured to operate in accordance with non-cellular communication mechanisms, such as via a wireless local area network (WLAN) or other communication/data networks.

The network interface 460 may also include an entry point interface for accessing contact information. This interface is represented by the entry point network interface 471 in FIG. 21. The entry point interface 471 may include software, such as encryption software, and hardware, such as a modem, for communicating information to and/or from one or more devices on a network 150. For example, the mobile device 400 may be configured so that it can be used to contact a channel within a network entity using a contact option configured for the mobile device 400.

As described above, the mobile device 400 may have a user interface that includes user output devices 436 and/or user input devices 440. The user output devices 436 may include a display 430 (e.g., a liquid crystal display (LCD) or the like) and a speaker 432 or other audio device, which are operatively coupled to the processor 410. The user input devices 440, which may allow the mobile device 400 to receive data from a user such as the user 110, may include any of a number of devices allowing the mobile device 400 to receive data from a user, such as a keypad, keyboard, touch-screen, touchpad, microphone, mouse, joystick, other pointer device, button, soft key, and/or other input device(s).

The mobile device 400 may further include a power source 415, such as a battery, for powering various circuits and other devices that are used to operate the mobile device 400. Embodiments of the mobile device 400 may also include a clock or other timer 450 configured to determine and, in some cases, communicate actual or relative time to the processor 410 or one or more other devices.

The mobile device 400 may also include a memory 420 operatively coupled to the processor 410. As used herein, memory may include any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory may additionally or alternatively include an electrically erasable programmable read-only memory (EEPROM), flash memory or the like.

The memory 420 may store any of a number of applications which comprise computer-executable instructions/code executed by the processor 410 to implement the functions of the mobile device 400 described herein. For example, the memory 420 may include such applications as a web browser application 422 and/or a contact application 421. In one embodiment of the invention, the user 110 may interact with the network entity's processing system 600 via the web browser application 422. In another embodiment, the user 110 may additionally interact with the network entity's processing system 600 via a contact application 421. The contact application 421 may be capable of contacting a channel within an entity or providing contact information for a channel within an entity. These applications may also typically provide a graphical user interface (GUI) on the display 430 that may allow the user 110 to communicate with the workstation 500, the network entity's processing system 600, and/or other devices or systems. In one embodiment of the invention, when the user 110 decides to use the contact application provided by an entity, the user 110 may download or otherwise obtain the contact application from the network entity's processing system 600 or from a distinct application server.

The memory 420 may also store any of a number of pieces of information, and data, used by the mobile device 400 and the applications and devices that make up the mobile device 400 or are in communication with the mobile device 400 to implement the functions of the mobile device 400 and/or the other systems described herein. For example, the memory 420 may include such data as user authentication information, contact information for a network entity, etc.

Referring now to FIG. 22, the workstation 500 associated with the agent 120 may also include various features, such as a network communication interface 510, a processing device 520, a user interface 530, and a memory device 550. The network communication interface 510 may include a device that allows the workstation 500 to communicate over the network 150. In one embodiment of the invention, a network browsing application 555 may provide for a user to establish network communication with network entity's processing system 600 for the purpose of initiating contact with the network entity, in accordance with embodiments of the invention.

As used herein, a "processing device," such as the processing device 520, may generally refer to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 530 may generally include a plurality of interface devices and/or software that allow a user to input commands and data to direct the processing device to execute instructions. For example, the user interface 530 presented in FIG. 22 may include a graphical user interface (GUI) or an interface to input computer-executable instructions that direct the processing device 520 to carry out specific functions. The user interface 530 may employ certain input and output devices to input data received from the user 110 or agent 120 or output data to the user 110 or agent 120. These input and output devices may include a display, mouse, keyboard, button, touchpad, touch screen, microphone, speaker, light, joystick, switch, and/or other customer input/output device for communicating with one or more customers.

As used herein, a "memory device" 550 may generally refer to a device or combination of devices that store one or more forms of computer-readable media for storing data and/or computer-executable program code/instructions. Computer-readable media is defined in greater detail below. For example, in one embodiment, the memory device 550 may include any computer memory that provides an actual or virtual space to temporarily or permanently store data and/or commands provided to the processing device 520 when it carries out its functions described herein.

FIG. 23 provides a block diagram illustrating the network entity's processing system 600 in greater detail, in accordance with an embodiment of the invention. As illustrated in FIG. 23, in one embodiment of the invention, the network entity's processing system 600 may include a processing device 620 operatively coupled to a network communication interface 610 and a memory device 650. In certain embodiments, the network entity's processing system 600 may be operated by the network entity, while in other embodiments, the entity's processing system 600 may be operated by an entity other than the network entity.

It should be understood that the memory device 650 may include one or more databases or other data structures/repositories. The memory device 650 may also include computer-executable program code that instructs the processing device 620 to operate the network communication interface 610 to perform certain communication functions of the network entity's processing system 600 described herein. For example, in one embodiment of the network entity's processing system 600, the memory device 650 may include, but may not be limited to, a network server application 670, an authentication application 660, a user account data repository 680 which may include user authentication data 680 and user account information 684, a client application 690, a web server application (not shown in FIG. 23), a mobile web server application (not shown in FIG. 23), one or more other applications 691, and other computer-executable instructions or other data. In one embodiment, a client application 690 may be an entry point or contact application for accessing contact information or initiating contact with a network entity. In one embodiment, for instance, the client application 690 may be an online banking or mobile banking application. The computer-executable program code of the network server application 670, the authentication application 660, the client application 690, or the other applications 691 may instruct the processing device 620 to perform certain logic, data-processing, and data-storing functions of the network entity's processing system 600 described herein, as well as communication functions of the network entity's processing system 600.

In one embodiment, the user account data repository 680 may include user authentication data 682 and user account information 684. The network server application 670, the authentication application 660, the client application 690, and the other applications 691 may be configured to implement user account information 684 and the user authentication data 682, when authenticating the user 110 to the network entity's processing system 600.

As used herein, a "communication interface" may generally include a modem, server, transceiver, and/or other device for communicating with other devices on a network, and/or a user interface for communicating with one or more customers. Referring again to FIG. 23, the network communication interface 610 may be a communication interface having one or more communication devices configured to communicate with one or more other devices on the network 150, such as the mobile device 400, the computing device 300, the network entity's processing system 600, other processing systems, data systems, etc. The processing device 620 may be configured to use the network communication interface 610 to transmit and/or receive data and/or commands to and/or from the other devices connected to the network 150.

In one embodiment of the invention, the network entity's processing system 600 may support mobile devices used by the user 110 or the agent 120. In such an embodiment, the network entity's processing system 600 may support mobile processing functions and may essentially be a mobile processing system. In another embodiment of the invention, a separate mobile processing system may be provided to support mobile devices used by the user 110 or the agent 120.

In one embodiment of the invention, the network entity's processing system 600 may support electronic kiosks or banking ATM center machines used by the user 110 or the agent 120. In such an embodiment, the network entity's processing system 600 may support electronic kiosk or banking ATM center functions and may essentially be an electronic kiosk or banking ATM processing system. In another embodiment of the invention, a separate electronic kiosk or banking ATM processing system may be provided to support electronic kiosks or banking ATM centers used by the user 110 or the agent 120.

In one embodiment of the invention, the network entity's processing system 600 may include local application processing functions as well. Local application processing functions may include the capability to support an application that is accessible by selected agents within an entity. In a further embodiment, the network entity's processing system 600 may be distinct from the network entity's internal processing system that may be accessible by selected agents within an entity.

Contact Management System and Environment

FIG. 24 provides a block diagram illustrating a computer network environment 2300 configured for providing contact information for a first agent initiating contact with a second agent associated with an entity, in accordance with an embodiment of the invention. As illustrated in FIG. 24, the computer network environment 2300 may include a workstation 500 operable by a first agent 2310 and a workstation 500 operable by a second agent 2320. The first agent may be a human agent or a bot (or automated agent) associated with an entity. The second agent may be a human agent or a bot (or automated agent) associated with an entity. Both workstations may be in electronic communication via an internal network 2350, which may be an intranet or the like. Additionally, the computer network environment 2300 may include the entity's internal processing system 2360, configured to enable the first agent to access, via the internal network, the second agent's contact information or to facilitate contact, via the internal network 2350, between the first agent and the second agent. The network entity's internal processing system 2360 is configured to be accessible to selected agents associated with the entity.

In summary, the network entity's internal processing system 2360 may initiate handling of a user's contact request that is transmitted to the entity by assigning the contact request to a first agent 2310 that meets the criteria specified in a user's contact request. In order to assist the first agent 2310 in addressing the user's contact request, the network entity's internal processing system 2360 may initiate the presentation of an activatable indicium on the first agent's interface, so that the first agent may obtain assistance from other agents such as the second agent 2320 in a faster, more efficient, and better informed manner. In one embodiment, the activatable indicium may take the form of an entity's logo, while in other embodiments the activatable indicium may be identifiable as an entry point for accessing contact information for other channels of an entity (e.g., the word "contact" or phrase "contact other agents") or the activatable indicium may take a form that is not readily identifiable as an entry point for accessing the contact information until the activatable indicium is activated.

Contact Management System Process Flow
Involving a First Agent and a Second Agent FIGS. 25, 26, and 27 provide flow charts illustrating a process 2400 for handling or managing a contact request, in accordance with an embodiment of the invention. FIGS. 25, 26, and 27 illustrate the flow charts in terms of "swim lanes" associated with entities which may perform the operations in each respective swim lane. The entities illustrated in the exemplary Figures are 1) a network entity's internal processing system, 2) a first agent using a workstation, 3) a user using a computing device or a mobile device, and 4) a second agent using a workstation. However, it should be noted that other entities could also be involved and some embodiments of the invention may not be limited to the four entities illustrated in FIGS. 25, 26, and 27. Additionally, it should be understood that, in other embodiments of the invention, the entities need not be required to perform the actions illustrated in each respective swim lane. For example, some of the process steps described herein may be performed by the first entity (or other entities) even though the element may be illustrated as in the swim lane of the second entity. Similarly, in some embodiments, some of the process steps may be performed by the second entity (or other entities) even though the element may be illustrated as in the swim lane of the first entity.

The process begins at block 2204 of FIG. 25 where the network entity's internal processing system 2360, in one embodiment, may generate an estimated waiting time to initiate contact with each of a plurality of agents, where each agent from the plurality of agents is associated with at least one channel and is contactable via at least one contact option. In one embodiment, the estimated waiting time may be generated as a real-time estimate, while in another embodiment the estimated waiting time may be generated as a delayed estimate. In further embodiments, the estimated waiting time may be manually input into the network entity's internal processing system 2360 by a managing agent. In one embodiment, the network entity's internal processing system 2360 may generate a standardized preference index for each of the plurality of agents. Both the estimated waiting time and standardized preference index may be generated according to embodiments presented earlier.

In one embodiment, the network entity's internal processing system 2360 may order the plurality of agents based on the estimated waiting time associated with each of the plurality of agents. In another embodiment, the network entity's internal processing system 2360 may order the plurality of agents according to the standardized preference index associated with each of the plurality of agents. In one embodiment, the network entity's internal processing system 2360 may organize the plurality of agents according to one or more parameters. In one embodiment, the network entity's internal processing system 2360 may organize the plurality of agents based on the channel associated with each agent. In another embodiment, the network entity's internal processing system 2360 may organize the plurality of agents based on the contact options that may be used for contacting each of the plurality of agents. In some embodiments, organizing the agents is useful so that a network entity's internal processing system 2360 may easily assign the contact request to an agent from one of these several organized lists. In other embodiments, the network entity's internal processing system 2360 may not organize or order the plurality of agents and in those embodiments, the contact request may be dynamically assigned to an agent that meets the criteria indicated in a contact request. In such embodiments where the contact request is dynamically assigned to an agent, the network entity's internal processing system 2360 may save computing resources utilized in organizing or ordering the plurality of agents.

The process moves to block 2208 of FIG. 25 where, in one embodiment, the network entity's internal processing system 2360 may receive a contact request from a user using a computing device 300 or mobile device 400 that transmits the contact request at block 2212 of FIG. 25.

The process then moves to block 2216 of FIG. 25 where, in one embodiment, the network entity's internal processing system 2360 may determine whether there is at least one agent from the plurality of agents, wherein the at least one agent meets the criteria indicated in the contact request. In one embodiment, the criteria may require that the agent is associated with the channel selected by the user and that the agent is contactable via the contact option selected by the user.

If the network entity's internal processing system 2360 determines at block 2216 of FIG. 25 that there is no agent that meets the criteria in the user's contact request, the network entity's internal processing system 2360 may, at block 2220 of FIG. 25, generate and present a status message to the user. The status message may indicate the reason why the user's contact request cannot be processed by the network entity's internal processing system 2360. The status message may indicate that there are no agents that meet the criteria specified in the user's contact request. The status message may prompt the user to modify the criteria specified in the user's contact request. The status message may also indicate that either the channel specified in the contact request is currently unavailable or that the contact option specified in the contact request is currently unavailable. If agents associated with the channel specified in the contact request, or agents contactable by the contact option specified in the contact request, are only available at specific times during a day or a week, the status message may indicate this information.

If the network entity's internal processing system 2360 determines at block 2216 of FIG. 25 that there is at least one agent that meets the criteria in the user's contact request, then the process moves to block 2224 of FIG. 25 where, in one embodiment, the network entity's internal processing system 2360 may determine an agent that has the lowest estimated waiting time or the highest standardized preference index from among the agents that meet the criteria specified in the user's contact request. In one embodiment, the network entity's internal processing system 2360 may just select the agent with the lowest estimated waiting time or the highest standardized preference index from the previously organized lists of agents. In one embodiment, the network entity's internal processing system 2360 may determine the agent with the lowest estimated waiting time or the highest standardized preference index based on delayed information regarding the agents. However, in other embodiments, the network entity's internal processing system 2360 may dynamically determine in real-time the agent that has the lowest estimated waiting time or the highest standardized preference index from among the agents that meet the criteria specified in the user's contact request.

The process then moves to block 2228 of FIG. 25 where, in one embodiment, the network entity's internal processing system 2360 may assign the contact request to a first agent at a workstation. In one embodiment, at block 2232 of FIG. 25, the first agent using a workstation may receive the contact request from the network entity's internal processing system 2360.

The process then moves to block 2236 of FIG. 25 where the network entity's internal processing system 2360 may determine whether at least one data integration event needs to be generated. A data integration event may represent activity associated with a user's activation of a user's activatable indicium on a computing device 300 or mobile device 400. For instance, if a user was on an interface page for making a money transfer to another account, and activated the activatable indicium on that interface page, then the integration event may note that the user was on the money transfer interface page prior to or at the instant of activating the activatable indicium. A network entity's internal processing system 2360 may transmit a data integration event to the first agent so that the first agent may understand the user's reasons for contacting the channel. This may enable the first agent to better assist the user. In one embodiment, the user may prevent the network entity's internal processing system 2360 from transmitting a data integration event to the agent. In such an embodiment, the network entity's internal processing system 2360 may present to the user an option of whether the user wants to permit the network entity's internal processing system 2360 to transmit a data integration event to the first agent. In one embodiment, the network entity's internal processing system 2360 may automatically transmit a data integration event when the user is authenticated into an account associated with the user. In one embodiment, the network entity's internal processing system 2360 may not transmit a data integration event when a user is not authenticated into an account associated with the user.

If the network entity's internal processing system 2360 determines at block 2236 of FIG. 25 that a data integration event needs to be generated, then the process moves to block 2240 of FIG. 25 where the network entity's internal processing system 2360 may generate and transmit a data integration event to the first agent at a workstation associated with the network entity.

The process moves to block 2244 of FIG. 25 where, in one embodiment, the first agent at a workstation may receive the data integration event transmitted from the network entity's internal processing system 2360.

The process then moves to block 2248 of FIG. 25 where, in one embodiment, the network entity's internal processing system 2360 may facilitate contact via the selected contact option between the user and the first agent associated with the channel selected by the user. At block 2248, the network entity's internal processing system 2360 may determine whether the first agent should initiate contact with the user or whether the user should initiate contact with the first agent. If the network entity's internal processing system 2360 determines that the user should initiate contact with the first agent, then the network entity's internal processing system 2360 may prompt the user to contact the first agent via the selected contact option. If the network entity's internal processing system 2360 determines that the first agent should initiate contact with the user, then the network entity's internal processing system 2360 may prompt the first agent to contact the user via the selected contact option.

The process then moves to block 2252 of FIG. 25 where, in one embodiment, the first agent may determine that the contact request or the user may need to be transferred to a second agent. In one embodiment, the first agent may determine that the contact request or user may need to be transferred if, after establishing contact with the user, the first agent determines that the first agent does not have the capability or expertise to resolve the user's question or concern. In one embodiment, the first agent may determine that the user needs to be transferred if after establishing contact with the user via phone or chat, the first agent determines that the first agent does not have the capability or expertise to resolve's the user's question or concern. In one embodiment, the first agent may determine that the contact request needs to be transferred if after receiving the user's email or mail, the first agent determines that the first agent does not have the capability or expertise to resolve the user's question or concern.

If the network entity's internal processing system 2360 determines at block 2252 of FIG. 25 that the user or the contact request needs to be transferred to another agent, in one embodiment, the first agent may, at block 2256 of FIG. 25, transmit or submit a transfer request to the network entity's internal processing system 2360. In one embodiment, the first agent may directly transfer the user or contact request to a second agent without submitting a transfer request to the network entity's internal processing system 2360. In one embodiment, the second agent may be a specialist who has expertise associated with the question or concern posed by the user.

If the network entity's internal processing system 2360 determines at block 2252 of FIG. 25 that the user or the contact request need not be transferred to another agent, in one embodiment, the first agent may, at block 2260 of FIG. 25, activate an activatable indicium for channel availability and selection on the first agent's interface page at a workstation. By activating an activatable indicium for channel availability and selection on an interface page at a workstation, the first agent may contact a second agent without transferring the user or the contact request to the second agent. In one embodiment, the second agent may be a specialist who may have expertise associated with the question or concern posed by the user.

The process moves to block 2266 of FIG. 25 where, in one embodiment, the network entity's internal processing system 2360 may receive a transfer request from the first agent. In one embodiment, the transfer request may include any information that was included in the contact request received by the first agent at block 2232. In another embodiment, the transfer request may just include an identifier for the contact request that was received by the first agent at block 2232. The network entity's internal processing system 2360 may use this identifier to obtain a copy of the contact request. In another embodiment, the transfer request may include information added by the first agent in addition to the information specified in the contact request.

The process then moves to block 2268 of FIG. 25 where, in one embodiment, the network entity's internal processing system 2360 may determine whether there is at least one agent from a plurality of agents, excluding the first agent, wherein the at least one agent meets the criteria indicated in the contact request. In one embodiment, the criteria may require that the agent is associated with the channel selected by the user and that the agent is contactable via the contact option selected by the user.

If the network entity's internal processing system 2360 determines at block 2268 of FIG. 25 that there is no agent, excluding the first agent, that meets the criteria in the user's contact request that was received at block 2208 of FIG. 25 or in the first agent's transfer request if the details are specified in the transfer request that was received at block 2266 of FIG. 25, the network entity's internal processing system 2360 may generate and present a status message at block 2269 of FIG. 25 to the user. The status message may indicate the reason why the user's contact request cannot be processed by the network entity's internal processing system 2360. The status message may indicate that there are no agents that meet the criteria specified in the user's contact request. The status message may prompt the user to modify the criteria specified in the user's contact request. The status message may also indicate that either the channel specified in the contact request is currently unavailable or that the contact option specified in the contact request is currently unavailable. If agents associated with the channel specified in the contact request, or agents contactable by the contact option specified in the contact request, are only available at specific times during a day or a week, the status message may indicate this information.

If the network entity's internal processing system 2360 determines at block 2268 of FIG. 25 that there is at least one agent, excluding the first agent, that meets the criteria in the user's contact request that was received at block 2208 of FIG. 25 or in the first agent's transfer request if the details are specified in the transfer request that was received at block 2266 of FIG. 25, then the process moves to block 2270 of FIG. 25 where, in one embodiment, the network entity's internal processing system 2360 may determine a second agent, excluding the first agent, that has the lowest estimated waiting time or the highest standardized preference index from among the agents that meet the criteria specified in the user's contact request or the first agent's transfer request if the details are specified in the transfer request. In one embodiment, the network entity's internal processing system 2360 may just select the agent with the lowest estimated waiting time or the highest standardized preference index from previously organized lists that have been described earlier. In one embodiment, the network entity's internal processing system 2360 may determine an agent with the lowest estimated waiting time or the highest standardized preference index based on delayed information regarding the agents. However, in other embodiments, the network entity's internal processing system 2360 may dynamically determine in real-time an agent that has the lowest estimated waiting time or the highest standardized preference index.

The process then moves to block 2274 of FIG. 25 where, in one embodiment, the network entity's internal processing system 2360 may assign the contact request to a second agent at a workstation.

The process then moves to block 2278 of FIG. 25 where, in one embodiment, the second agent using a workstation associated with the network entity may receive the contact request from the network entity's internal processing system 2360.

If the network entity's internal processing system 2360 determines that the first agent activated, at block 2260 of FIG. 25, the activatable indicium at the first agent's workstation, the process moves to block 2406 of FIG. 26 where the network entity's internal processing system 2360 may generate and present a plurality of channels to the first agent.

The process moves to block 2402 of FIG. 26 where a network entity's internal processing system 2360 may present an activatable indicium configured as an entry point for accessing contact information via a computing device processor.

The process then moves to block 2404 of FIG. 26 where the first agent 2310 using a workstation may activate the activatable indicium. In one embodiment, a first agent may activate the activatable indicium on the first interface page by mouse-over, touch, button, click, keyboard input, voice command, or the like. As stated earlier, the type of input that activates the activatable indicium is not limited to this list.

The process then moves to block 2406 of FIG. 26 where in one embodiment, when a first agent activates the activatable indicium, the network entity's internal processing system 2360 may generate and present to the first agent activatable links to a plurality of channels associated with the contact information-providing entity. In one embodiment, these channels may represent the various departments, tenants, lines of operation, lines of business, or the like into which an entity is divided. For instance, if the entity is a financial institution, a first channel may be "Card" and a second channel may be "HL&I" and so on.

In one embodiment, the network entity's internal processing system 2360 may only generate and present activatable links to a plurality of channels that are related to the other information presented on the interface page. For instance, if the first agent is on a page related to "Debit Cards" at the instant when the activatable indicium is activated, then the network entity's internal processing system 2360 may present activatable links to channels such as "Account Transactions" and "Overdraft Service," and may not present activatable links to channels such as "Mortgages" and "Credit Cards." The network entity's internal processing system 2360 may also generate and present an "Other" option among the activatable links to a plurality of channels so that the first agent may access channels not related to the interface page on which or at the instant when the activated indicium is activated.

In one embodiment, the network entity's internal processing system 2360 may generate and present activatable links to a plurality of channels regardless of whether they are related to the interface page on which or at the instant when the activatable indicium is activated.

In one embodiment, the network entity's internal processing system 2360 may generate and present activatable links to a plurality of channels with which the first agent, or a particular workstation in the possession of the first agent, or even a particular computing location, e.g., Internet Protocol (IP) address, has previously established contact. In one embodiment, the network entity's internal processing system 2360 may generate and present activatable links to a plurality of channels with which the first agent has most recently established contact within a predefined period of time, e.g., the plurality of channels with which the first agent established contact in the preceding three months or the like. In one embodiment, the network entity's internal processing system 2360 may generate and present activatable links to a plurality of channels with which a first agent has established contact most often. Therefore, in some embodiments, the network entity's internal processing system 2360 may store the contact history associated with the first agent, or a particular workstation, or even a particular computing location, e.g., IP address. Thus, in some embodiments, a learning method may drive the network entity's internal processing system 2360 so that the network entity's internal processing system 2360 learns a first agent's contact habits and customizes the channels that it generates and presents to the first agent.

In one embodiment, the network entity's internal processing system 2360 may require two levels of input in order to activate the activatable indicium. When the first agent inputs the first level of input, the network entity's internal processing system 2360 may acknowledge this first level of input by magnifying the pictorial representation of the activatable indicium. Alternatively, the network entity's internal processing system 2360 may present a highlighted box around the activatable indicium or some other means of acknowledging the first level of input. When the first agent inputs the second level of input, the network entity's internal processing system 2360 may present activatable channel links to the plurality of channels. There is an advantage to prompting the first agent for two levels of input. Sometimes, the first agent may accidently activate the activatable indicium by accidently hovering over or clicking the activatable indicium. In such a situation, the network entity's processing system may generate and present activatable links to a plurality of channels in a panel that obstructs the first agent's view of the interface page. In order to prevent such a situation, the network entity's internal processing system 2360 may require two levels of input in order to activate the activatable indicium.

The process then moves to block 2408 of FIG. 26 where in one embodiment, the first agent may select an activatable link to a channel from the plurality of channels presented in block 2406 of FIG. 26. In another embodiment, a first agent may select multiple activatable links to channels. The first agent may select an activatable link to a channel using previously-described input such as mouse-over, touch, button, click, keyboard input, or the like.

The process then moves to block 2412 of FIG. 26 where the network entity's internal processing system 2360 may determine whether the first agent selected an undefined activatable channel link, such as an activatable channel link unrelated to the interface page on which the activatable indicium is activated or at the instant when the activatable indicium is activated. In one embodiment, the first agent may select the activatable link to the plurality of channels unrelated to the interface page by selecting the "Other" option from the list of activatable links to channels presented to the first agent in block 2406 of FIG. 26.

If, at block 2412 of FIG. 26, the network entity's internal processing system 2360 determines that the first agent selected the activatable link to the plurality of channels unrelated to the interface page on which or at the instant when the activatable indicium is activated, i.e., the "Other" option, then the process moves to block 2420 of FIG. 26. Here, the network entity's internal processing system 2360 may generate and present activatable links to a plurality of channels unrelated to the interface page on which or at the instant when the activatable indicium is activated. In one embodiment, the activatable links to the unrelated channels may be presented on a new interface page to which the first agent is redirected. In another embodiment, the activatable links to the unrelated channels may be presented as a pop-up or call-out panel on the same interface page on which or at the instant when the activatable indicium is activated.

If, at block 2412, the network entity's internal processing system 2360 determines that the first agent selected an activatable link to a channel other than an undefined, i.e., "other" channel, the process moves to block 2424.

Subsequently, at block 2424 of FIG. 26, the network entity's internal processing system 2360 may generate and present activatable links to a plurality of contact options associated with the selected channel. Possible contact options may include voice, phone, text (Short Message Service or "SMS"), chat, mail, web, email, or the like. The possible contact options may not be limited to this list and may include any contact option by which the first agent may initiate contact with the second agent.

In one embodiment, the network entity's internal processing system 2360 may present only those contact options that are configured for the type of computing platform and the type of electronic interface on which the activatable indicium is activated. Furthermore, in another embodiment, the network entity's internal processing system 2360 may present only those contact options that are currently available to initiate contact with the selected channel.

In one embodiment, the network entity's internal processing system 2360 may generate and present activatable links to a plurality of contact options that a first agent, or a particular workstation, or even a particular computing location, e.g., IP address, has previously used. In one embodiment, the network entity's internal processing system 2360 may generate and present activatable links to a plurality of contact options previously used by the first agent within a predefined period of time, e.g., the plurality of contact options that the first agent has used in the preceding three months or the like. In one embodiment, the network entity's internal processing system 2360 may generate and present activatable links to a plurality of contact options that the first agent has used most frequently. Therefore, in some embodiments, the network entity's internal processing system 2360 may store the contact option history associated with the first agent, or a particular workstation, or even a particular computing location, e.g., IP address. Therefore, in some embodiments, a learning method may drive the network entity's internal processing system 2360 so that the network entity's internal processing system 2360 learns the first agent's contact option habits and customizes the contact options that it generates and presents to the first agent.

In one embodiment, the network entity's internal processing system 2360 may only generate and present activatable links for those contact options that are configured for the computing platform and the electronic interface on which the activatable indicium is activated. As an example, on a workstation, the network entity's internal processing system 2360 may not present an automated call-in option if the workstation is not equipped with the capability to place phone calls directly from the first agent's workstation. However, on a workstation, the network entity's internal processing system 2360 may still present a call-back option whereby the network entity's internal processing system 2360 may present an input widget into which the first agent may enter a phone number that a second agent associated the entity may call to initiate contact with the first agent. The network entity's internal processing system 2360 may also present a mail-in contact option, wherein selecting the mail-in option would present a mailing address to which the first agent's question or concern may be directed.

The process then moves to block 2426 of FIG. 26 where the network entity's internal processing system 2360 may generate and present an estimated waiting time for each of the plurality of contact options associated with the selected channel. The estimated waiting time may represent the time that would elapse before establishing contact with the selected channel. In one embodiment, the estimated waiting time may represent the time that would elapse before establishing contact with a second agent at or associated with the selected channel.

In one embodiment, the estimated waiting time may be generated by a manually controlled administrative function. In such an embodiment, a managing agent or other personnel at an entity may manually input an estimated waiting time for one or more contact options into the network entity's internal processing system 2360. In such an embodiment, the managing agent or personnel may also manually adjust or control the estimated waiting time based, at least in part, on one or more factors considered by the managing agent or personnel. Such factors may include the number of agents attempting to establish contact with other agents, the number and capacity of other agents at the entity to respond to these contact attempts, or the like. The variety of factors may include other factors that have not been described here.

In one embodiment, the network entity's internal processing system 2360 may periodically re-generate and re-present an estimated waiting time for each of the plurality of contact options associated with the selected channel. In one embodiment, the estimated waiting time may be generated in real-time using real-time data.

In another embodiment, this estimated waiting time may be generated using a statistical algorithm as a delayed estimate using historical data. In one embodiment, the first agent may choose the interval of historical data or other parameters for generating the estimated waiting time. In another embodiment, network entity's internal processing system 2360 may automatically choose a pre-determined interval of historical data or other parameters for generating the estimated waiting time.

In one embodiment, the network entity's internal processing system 2360 may visually present the estimated waiting time for each of the plurality of contact options to the first agent so that the first agent may easily understand how the estimated waiting time for a contact option compares with the estimated waiting times for other contact options. The visual presentation may be in the form of a bar graph. In one embodiment, the network entity's internal processing system 2360 may choose a baseline contact option that is associated with the minimum estimated waiting time, and then may generate a pictorial presentation (e.g., a bar graph that is not shaded) for the baseline contact option. The network entity's internal processing system 2360 may subsequently generate the visual presentations of the remaining contact options according to an algorithm that compares the estimated waiting time of the baseline contact option with the estimated waiting times for the remaining contact options. In one embodiment, the bar graph of a contact option that has an estimated waiting time that is fifty percent greater than the estimated waiting time of the baseline contact option may be shaded fifty percent darker or otherwise configured to represent a fifty percent increase when compared to the bar graph for the baseline contact option.

The network entity's internal processing system 2360 at block 2426 may generate and present in place of, or in addition to, the estimated waiting time for each of the plurality of contact options associated with the selected channel, a standardized preference index for each of the plurality of contact options associated with the selected channel. In this embodiment, the network entity's internal processing system 2360 may generate a preference index for each of the plurality of contact options based on at least one parameter. The parameters may include, but are not limited to, the estimated waiting time, the cost incurred by the entity and/or the user, the manpower, the technological resources, and the like associated with the plurality of contact options. In one embodiment, the cost parameter may be the cost associated with the first agent having to initiate contact with the second agent, or it may be the cost associated with the second agent having to initiate contact with the first agent. In one embodiment, the process for generating the preference index may be based on a predetermined algorithm.

Subsequently, the network entity's internal processing system 2360 may take the contact option that generates the best preference index and standardize the other contact options' preference indexes so that a first agent may easily compare how less favorable the other contact options' preference indexes are compared to the contact option with the best preference index. In one embodiment, the standardizing process may be based on a predetermined algorithm.

The network entity's internal processing system 2360 may present, either pictorially or non-pictorially, the standardized preference index for each of the plurality of contact options. In one embodiment, the network entity's internal processing system 2360 may choose a baseline contact option that is associated with the highest standardized preference index, and then generate a visual presentation (e.g., a bar graph) for the baseline contact option. The network entity's internal processing system 2360 may subsequently generate the visual presentations for the remaining contact options according to an algorithm that compares the standardized preference index of the baseline contact option with the standardized preference indexes of the remaining contact options. In one embodiment, the bar graph of a contact option that has a standardized preference index that is fifty percent lesser than the standardized preference index of the baseline contact option may be shaded fifty percent darker or otherwise configured to represent a fifty percent decrease when compared to the bar graph for the baseline contact option.

In one embodiment, the network entity's internal processing system 2360 may periodically re-generate and re-present the standardized preference index for each of the plurality of contact options associated with the selected channel so that the first agent can view the updated standardized preference index information.

In one embodiment, the network entity's internal processing system 2360 may present as unavailable or may not even present, at all, any contact option that has a preference index that is below a certain threshold index. The network entity's internal processing system 2360 may present the unavailability of a particular contact option by visually presenting the activatable link to the unavailable contact option as unavailable. Alternatively, the network entity's internal processing system 2360 may present the unavailability of a particular contact option by deactivating the activatable link to the unavailable contact option such that the deactivated link is viewable but not activatable.

The process then moves to block 2428 of FIG. 26 where, in one embodiment, the first agent may select an activatable link to a contact option from the activatable links to a plurality of contact options presented to the first agent.

The process then moves to block 2430 of FIG. 26 where the network entity's internal processing system 2360 may determine whether the contact option selected by the first agent is available for establishing contact with the channel selected in block 2408 of FIG. 26.

If the network entity's internal processing system 2360 determines that the contact option selected by the first agent in block 2428 is unavailable, then the process moves to block 2432 of FIG. 26 where the network entity's internal processing system 2360 may generate and present a status message for the unavailable contact option. In one embodiment, the network entity's internal processing system 2360 may present in the status message the hours of operation for the unavailable contact option. The network entity's internal processing system 2360 may present the hours of operation along with other information regarding the contact option. The network entity's internal processing system 2360 may present the status message on the same interface page, either as a call-out panel on the same interface page or as a pop-up panel on the same interface page.

If the network entity's internal processing system 2360 determines that the contact option selected by the first agent in block 2428 of FIG. 26 is available, then the process moves to block 2504 of FIG. 27 where the network entity's internal processing system 2360 may determine whether the at least one data integration event needs to be re-generated. Whether a data integration event may need to be re-generated depends on whether the data integration event was previously generated at block 2236 of the process 2400 in FIG. 25, and whether the data integration event may be available to be transmitted to the second agent. In one embodiment, if the data integration event was previously generated at block 2236 of the process 2400 in FIG. 25, but is now unavailable to be transmitted to the second agent, then the data integration event may need to be re-generated at block 2504 of FIG. 27 by the network entity's internal processing system 2360.

In an embodiment, if the network entity's internal processing system 2360 determines at block 2504 of FIG. 27 that at least one data integration event needs to be re-generated, then the network entity's internal processing system 2360 may re-generate and transmit a data integration event to the second agent at a workstation. If the network entity's internal processing system 2360 determines at block 2506 of FIG. 27 that a data integration event was previously generated and is available to be transmitted, then the network entity's internal processing system 2360 may just transmit the data integration to the second agent at a workstation, without re-generating the data integration event. If the network entity's internal processing system 2360 determines that a data integration event was not previously generated at block 2236 in FIG. 25, then, in an embodiment, the process moves to block 2516 of FIG. 27.

In one embodiment, the data integration event may note what the user was doing on an interface or within an application at the instant when or prior to the instant when the user activated an activatable indicium on the user's computing device. In another embodiment, the data integration event may note what the first agent was doing on an interface or within an application prior to or at the instant when the first agent activates an activatable indicium or entry point on the first agent's workstation.

In one embodiment, a data integration event may be a computer-telephone integration ("CTI") data integration event. In one embodiment, CTI may refer to the integration of data transmission and a plurality of multi-media contact options such as voice, text (SMS), chat, email, mail correspondence, or the like. In another embodiment, CTI may refer to the integration of a plurality of contact options with a workstation or the network entity's internal processing system 2360.

In one embodiment, the first agent may prevent the network entity's internal processing system 2360 from transmitting a data integration event to the second agent. In such an embodiment, the network entity's internal processing system 2360 may present to the first agent an option of whether the first agent wants to permit the network entity's internal processing system 2360 to transmit a data integration event to the second agent.

In one embodiment, the network entity's internal processing system 2360 may automatically transmit a data integration event when the first agent is authenticated into an account associated with the user or the first agent. Alternatively, in another embodiment, the network entity's internal processing system 2360 may not transmit a data integration event when a first agent is not authenticated into an account associated with the user or the first agent. In one embodiment, the ability of the network entity's internal processing system 2360 to re-generate and transmit a data integration event may be part of the back-end intelligence of the network entity's internal processing system 2360 because the second agent may more effectively understand the first agent's question by analyzing the one or more data integration events.

The process moves to block 2512 of FIG. 27 where the second agent at a workstation may receive the data integration event transmitted from the network entity's internal processing system 2360.

The process then moves to block 2516 of FIG. 27 where the network entity's internal processing system 2360 may determine whether the first agent needs to enter an additional input in order to initiate the selected contact option.

If the network entity's internal processing system 2360 determines at block 2516 of FIG. 27 that an additional input is necessary, then the process moves to block 2520 of FIG. 27 where the network entity's internal processing system 2360 may generate and present an input field or widget to the first agent. In one embodiment, this additional input field may be presented when the first agent chooses call-back as the selected contact option. If the first agent chooses call-back as the selected contact option, the network entity's internal processing system 2360 may present a text input field or widget in which the first agent enters the phone number on which the first agent may be contacted by the second agent. The network entity's internal processing system 2360 may also present a field or a widget in which the first agent enters the date and time at which the first agent would like to be contacted by the second agent via the selected contact option. In one embodiment, if the first agent chooses mail-back as the selected contact option, the network entity's internal processing system 2360 may present text input widgets or fields where the first agent enters a question and a mailing address so that the first agent can receive a response from the second agent via postal mail.

If the network entity's internal processing system 2360 presents an additional input widget at block 2520 of FIG. 27, the first agent may enter the additional input at block 2524 of FIG. 27.

The process moves to block 2528 of FIG. 27 where the network entity's internal processing system 2360 may initiate the selected contact option.

The process then moves to block 2532 of FIG. 27 where the network entity's internal processing system 2360 may determine whether to present an interface for the selected contact option.

If the network entity's internal processing system 2360 determines at block 2532 of FIG. 27 that an interface needs to be generated and presented for the selected contact option, then the process moves to block 2536 of FIG. 27 where the network entity's internal processing system 2360 may present the selected contact option's interface. In an embodiment, the network entity's internal processing system 2360 may present an interface for chat or email.

In one embodiment where email is the selected contact option, the network entity's internal processing system 2360 may initiate and present an email application associated with the network entity's internal processing system 2360 where the second agent's email address has been prefilled so that the first agent may compose a message and email the second agent.

In an embodiment, the network entity's internal processing system 2360 may also present an interface for voice, i.e., call-in, if a call is initiated from the first agent's workstation to the second agent. The interface may present the name of the second agent, the time elapsed during the call, the quality of the voice connection, etc. In an embodiment, the network entity's internal processing system 2360 may not present an interface if phone, i.e. call-back, is the selected contact option as the second agent just calls the first agent using the phone number entered in block 2524 of FIG. 27.

In an embodiment, the network entity's internal processing system 2360 may not present an interface if mail-in or mail-back is the selected contact option. However, in another embodiment for the mail-in option, the network entity's internal processing system 2360 may present the second agent's mailing address at block 2536 of FIG. 27, wherein the first agent's question should be directed to the presented mailing address. In another embodiment where a first agent selects a mail-back option, the network entity's internal processing system 2360 may present at block 2536 of FIG. 27 a message indicating that the first agent's question (entered in block 2524 of FIG. 27) has been received, and that an answer will be mailed to the first agent (or the user) in an estimated period of time.

The process then moves to block 2540 where the network entity's internal processing system 2360 may determine whether to grant access to first agent's interface. In this step, the network entity's internal processing system 2360 may determine whether a second agent, who might be associated with a selected channel, may access the local application interface as presented to the first agent. This may enable the second agent to better assist the first agent in resolving any question pertaining to the user that established contact with the first agent.

The process then moves to block 2548 of FIG. 27 where the network entity's internal processing system 2360 may determine whether the second agent should initiate contact with the first agent or whether the first agent should initiate contact with the second agent.

If the network entity's internal processing system 2360 determines at block 2548 of FIG. 27 that the first agent should initiate contact with the second agent, then the process moves to block 2552 of FIG. 27 where the network entity's internal processing system 2360 may prompt the first agent to initiate contact with the second agent via the selected contact option.

The process then moves to block 2556 of FIG. 27 where the first agent may initiate contact with the second agent via the selected contact option.

If the network entity's internal processing system 2360 determines at block 2548 of FIG. 27 that the second agent should initiate contact with the first agent, then the process moves to block 2560 of FIG. 27 where the network entity's internal processing system 2360 may prompt the second agent to initiate contact with the first agent via the selected contact option.

The process then moves to block 2564 of FIG. 27 where the second agent may initiate contact with the first agent via the selected contact option.

Automated Embodiments of Contact Management Process Flow

As used herein, the act of selecting a channel refers to the act of selecting an activatable link to a channel. Also, the act of selecting a contact option refers to the act of selecting an activatable link to a contact option.

In one embodiment, the network entity's internal processing system 2360 may be capable of supporting an automated contact process where the network entity's internal processing system 2360 may allow the first agent to select a channel, and subsequently the network entity's internal processing system 2360 may automatically select a contact option rather than allowing the first agent to select a contact option. In this embodiment, this process may jump from block 2408 of FIG. 26 to block 2504 of FIG. 27. In one embodiment, when the first agent selects a channel in block 2408 of FIG. 26, the network entity's internal processing system 2360 may generate, but may not present, a plurality of contact options associated with the channel. In one embodiment, the network entity's internal processing system 2360 may only generate, but may not present, those contact options that are configured for a computing platform and an electronic interface on which the activatable indicium is activated. The network entity's internal processing system 2360 may generate, but may not present, either an estimated waiting time or a standardized preference index according to the embodiments described earlier. Rather than presenting activatable links to these contact options as described in an earlier embodiment, the network entity's internal processing system 2360 may automatically select a contact option from the plurality of contact options that the network entity's internal processing system 2360 had generated earlier. In one embodiment the network entity's internal processing system 2360 may automatically select a contact option with the lowest estimated waiting time. In another embodiment, the network entity's internal processing system 2360 may automatically select a contact option with the highest standardized preference index. In such an embodiment, the first agent may not have to expend any time in choosing a desired contact option to initiate contact with a second agent associated with the network entity.

In one embodiment, the network entity's internal processing system 2360 may be capable of supporting an automated contact process where the network entity's internal processing system 2360 may automatically select a channel, and subsequently the network entity's internal processing system 2360 may allow the first agent to select a contact option. In this embodiment, the process in FIG. 26 may jump from block 2404 of FIG. 26 to block 2424 of FIG. 26. In such an embodiment, the network entity's internal processing system 2360 may automatically select the channel that is most related to or most specifically related to the interface page on which or at the instant when the activatable indicium is activated. In such an embodiment, the first agent may not have to expend any time in choosing a desired channel that can answer a question that the first agent may have.

In another embodiment, the network entity's internal processing system 2360 may support a "one-click" contact process, where the network entity's internal processing system 2360 may automatically select both a channel and a contact option to facilitate contact with a second agent associated with the entity. In this embodiment, the process in FIG. 26 may jump from block 2404 of FIG. 26 to block 2504 of FIG. 27. In such an embodiment, the network entity's internal processing system 2360 may automatically select the channel that is most related to or most specifically related to the interface page on which or at the instant when the activatable indicium is activated. Additionally, the network entity's internal processing system 2360 may automatically select the contact option with the lowest estimated waiting time or the highest standardized preference index. In such an embodiment, the first agent may not have to expend any time in choosing a channel that can answer a question or concern that the first agent may have or a contact option to initiate contact with a second agent.

Additionally, in the automated embodiments described above, the network entity's internal processing system 2360 may sometimes automatically initiate the selected contact option without determining whether additional input is required from the first agent.

Contact Management System Interface

Figure 28:
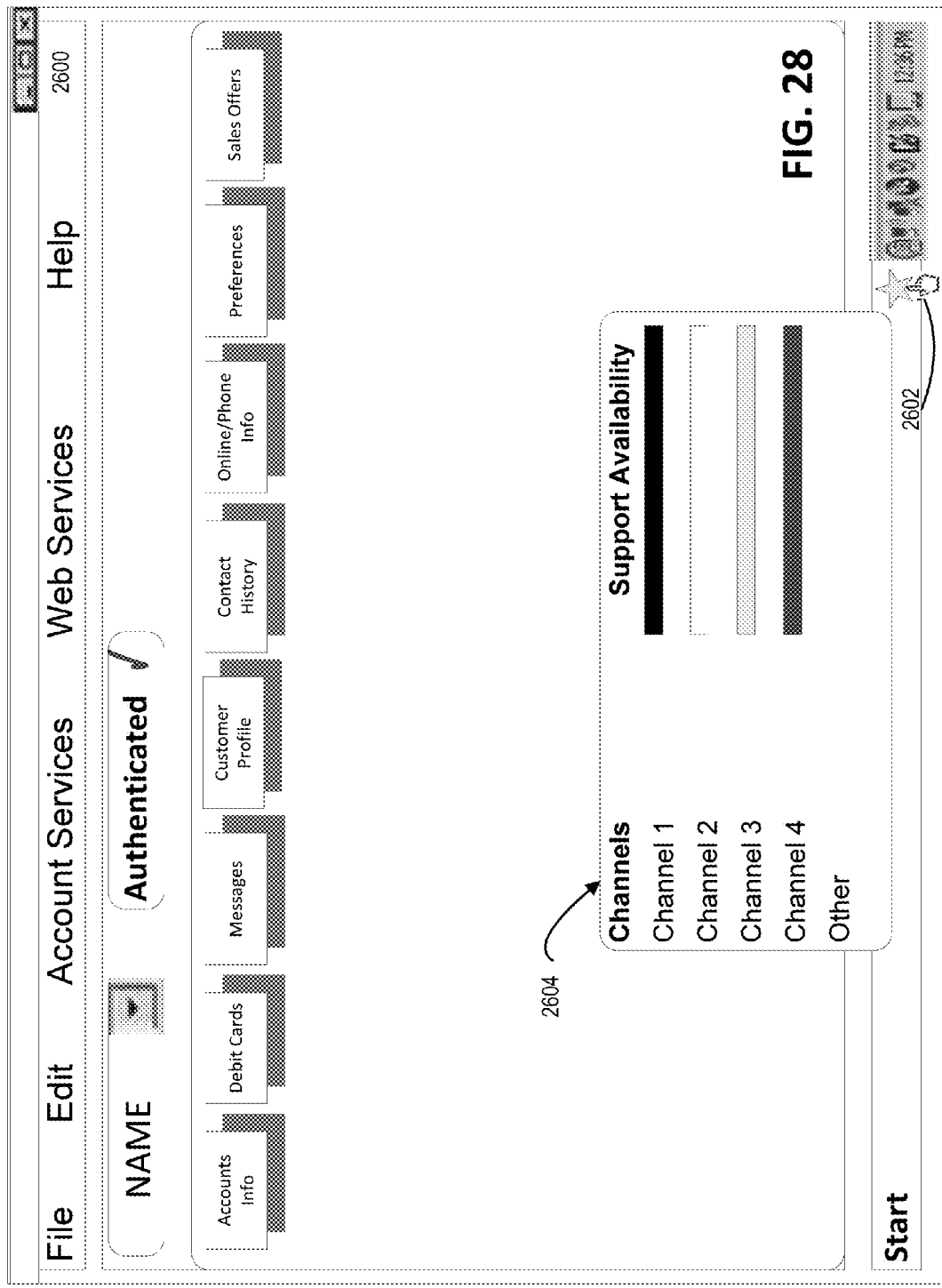

FIG. 28 displays a screenshot of a local application interface page that may be accessible on a network entity's internal processing system 2360 and that may be accessible by selected agents associated with an entity. For instance, in FIG. 28, the network entity's internal processing system 2360 may generate and present the local application interface page 2600 after the first agent entered authentication credentials that may have been received from a user, wherein the user transmits a contact request to the network entity. In one embodiment, as shown in FIG. 28, the network entity's internal processing system 2360 may indicate that the first agent has been authenticated to view information associated with the user. As shown in FIG. 28, information associated with the user may include information regarding the user's accounts, contact history, contact information, preferences, profile information, etc. In the embodiment shown in FIG. 28, the activatable indicium 2602 may be presented in the taskbar of the first agent's workstation interface. However, the activatable indicium may also be presented on the first agent's local application interface page. In an embodiment, an activatable physical button at or near the workstation may replace the activatable indicium on the interface.

Figure 29:
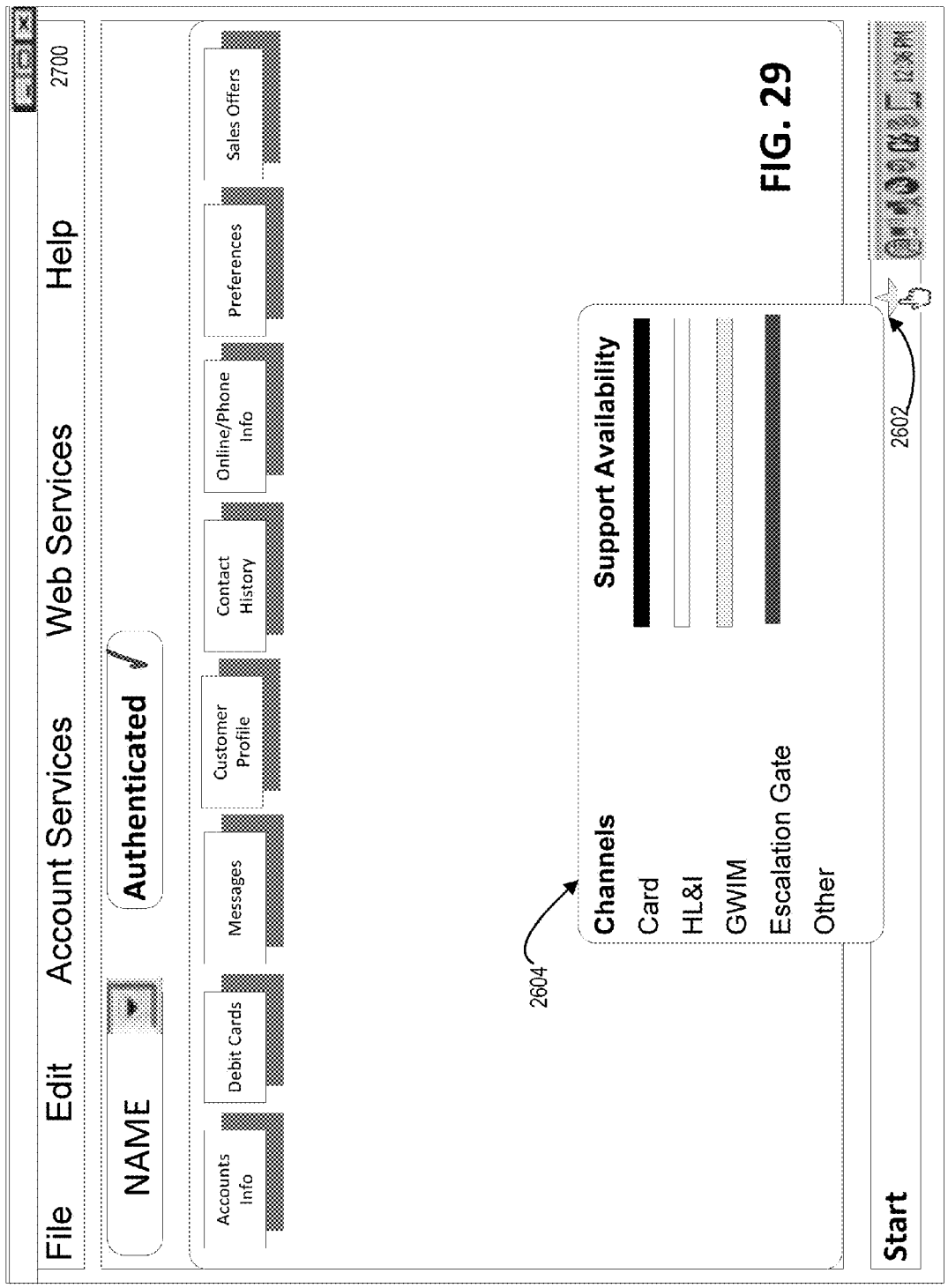

FIG. 29 displays a screenshot of the activatable links to a plurality of channels 2604 generated and presented by the network entity's internal processing system 2360 in response to the first agent activating the activatable indicium 2602. For instance, the channels available as shown in FIG. 29 are "Card," "HL&I," "GWIM," "Escalation Gate," and "Other." As described with respect to previous embodiments, the network entity's internal processing system 2360 may have generated these channels as they are related to the first local application interface page that the first agent was on when the first agent activated the activatable indicium. In one embodiment, the channel is a department, tenant, line of operation, or the like within an entity that may be able to answer a question that was posed to a first agent by a user, but which the first agent was unable to resolve.

Figure 30:
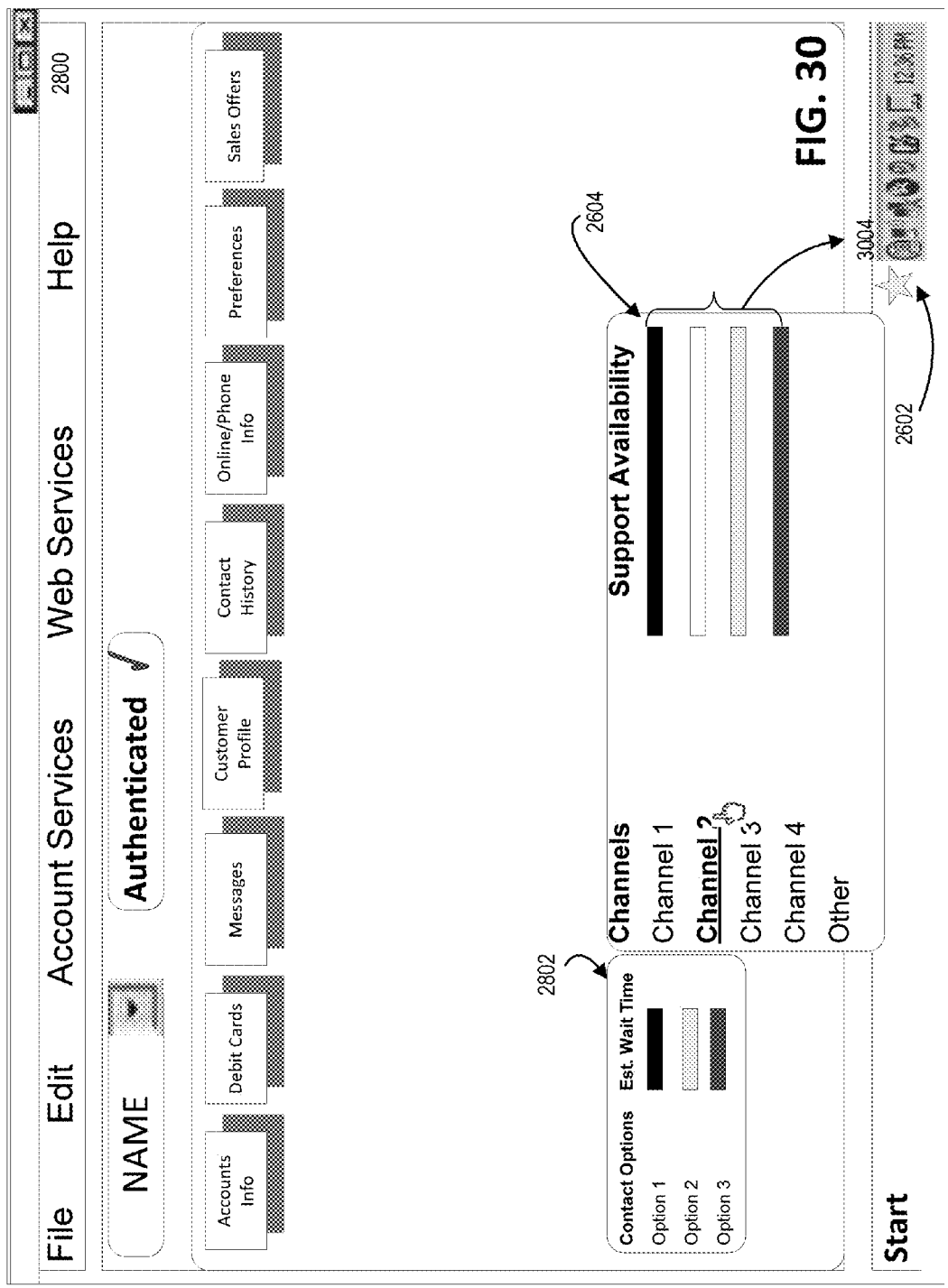
Figure 31:
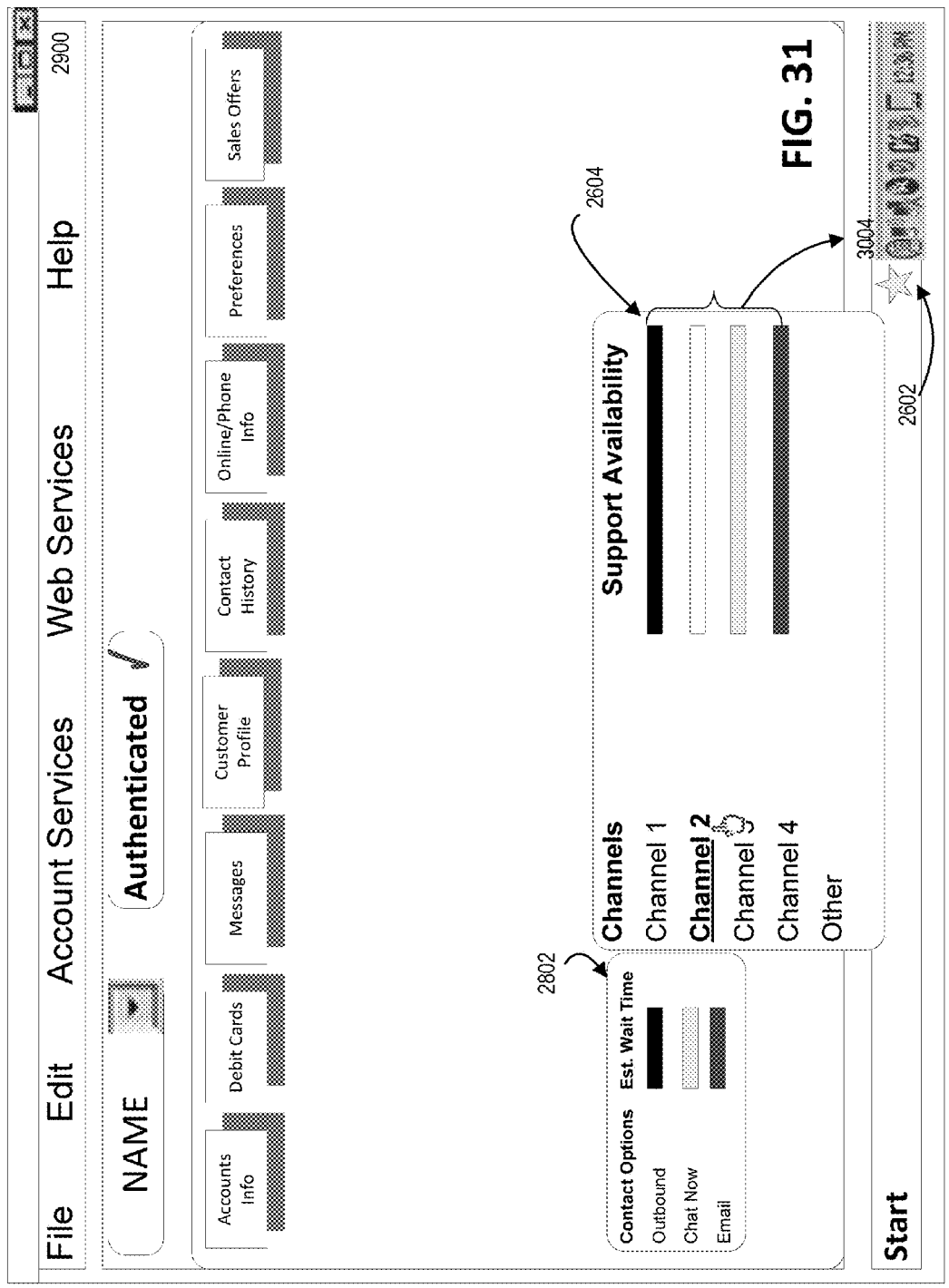

FIGS. 30 and 31 display screenshots of the activatable links to a plurality of contact options 2802 presented by the network entity's internal processing system 2360 in response to the first agent selecting a channel from the activatable links to a plurality of channels 2604. FIGS. 30 and 31 also display the support availability 3004 associated with each channel. In one embodiment, the support availability may be the estimated waiting time associated with each channel. In another embodiment, the support availability may be the standardized preference index associated with each channel. FIGS. 30 and 31 also display the estimated waiting time 2802 associated with contact option for a selected channel. In one embodiment, the estimated waiting time for each contact option may be replaced with a standardized preference index for each contact option.

Figure 32:
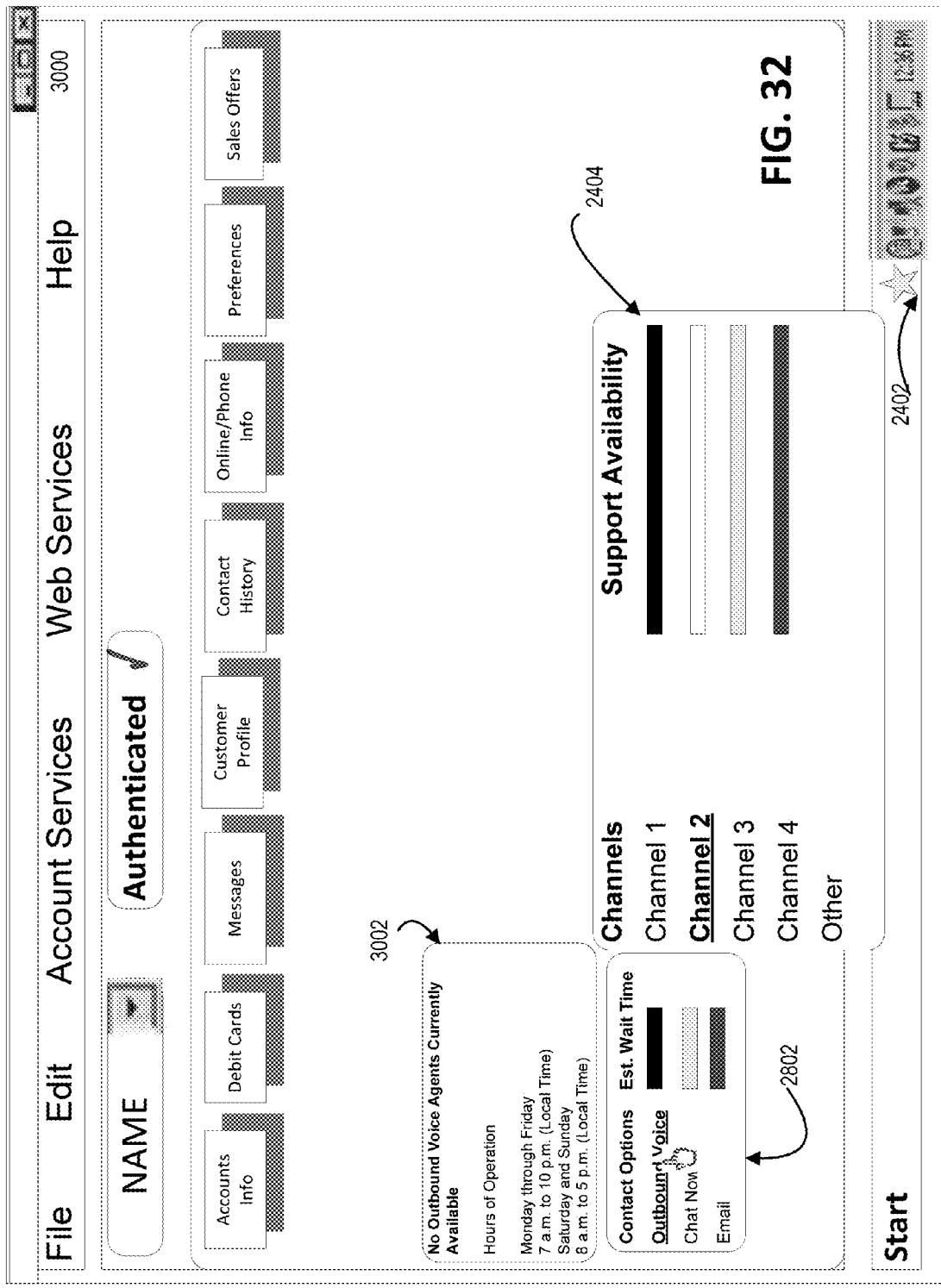

FIG. 32 displays a screenshot of information regarding an unavailable contact option presented by the network entity's internal processing system 2360 in response to the first agent selecting an unavailable contact option. This screenshot shows that the first agent selected the "Outbound Voice" option on the first local interface page, and since this contact option is unavailable, the network entity's internal processing system 2360 may present the hours of operation in a pop-up panel 3002.

Figure 33:
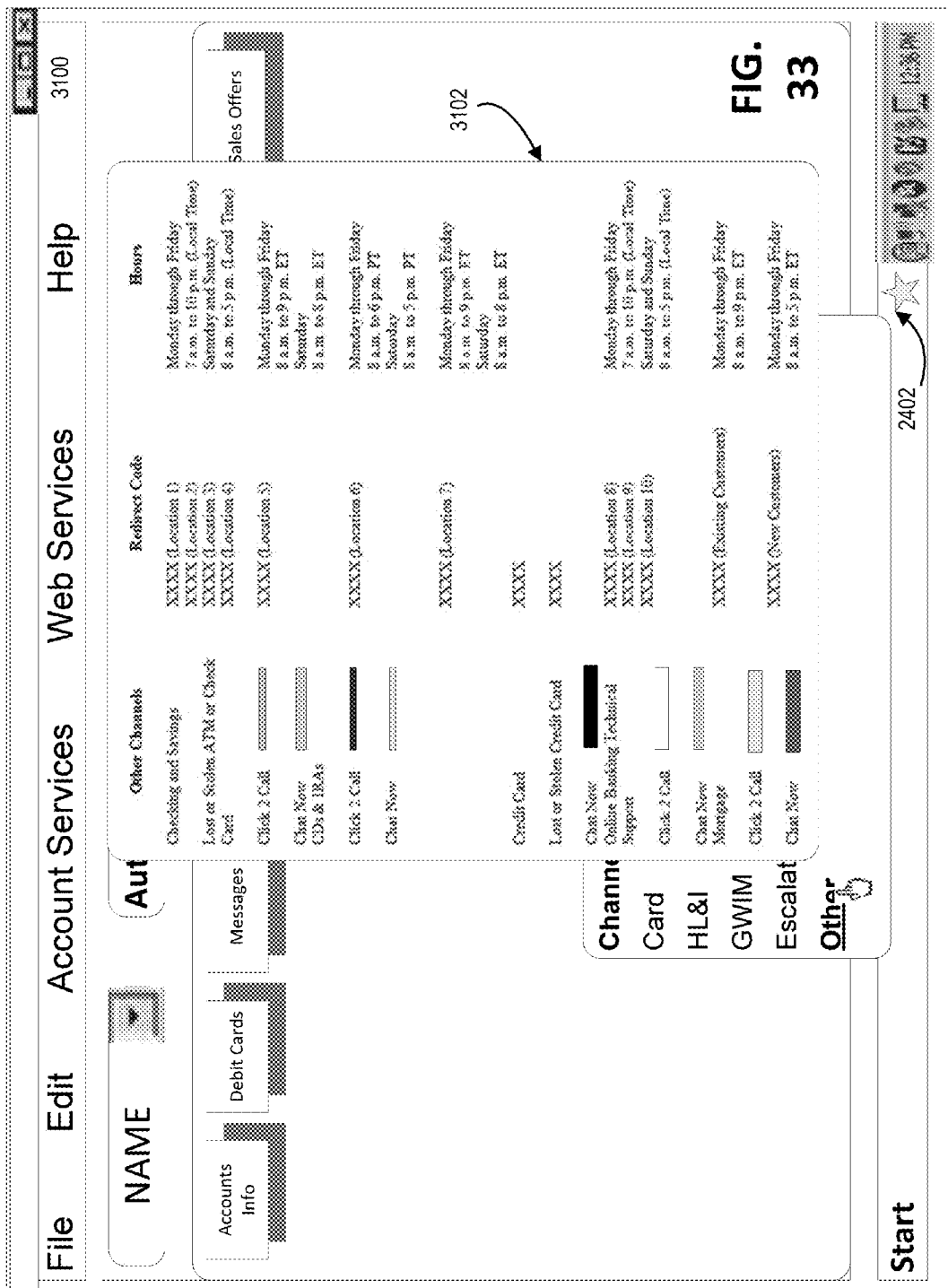

FIG. 33 displays a screenshot of the network entity's internal processing system's 2360 response to the first agent selecting the "Other" option from the list of activatable links to a plurality of channels. The network entity's internal processing system 2360 may generate and present on a new interface page 3102, activatable links to a plurality of channels unrelated to the interface page at the instant when the activatable indicium 2402 is activated, activatable links to a plurality contact options associated with each of the plurality of channels, information regarding each of the plurality of contact options, and estimated waiting times or standardized preference indexes associated with each of the plurality of contact options. Alternatively, the network entity's processing system 600 may present all of this information in a call-out panel or pop-up panel on the first interface page, or in a separate pop-up window.

Thus, present embodiments disclosed in detail above provide for electronically providing contact information via a computer network, responding to activation of an activatable indicium configured as an entry point for accessing contact information, and managing a contact request within an entity.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present invention may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing a user with a contact to an entity, the method comprising:
   presenting, via a computing device processor, a contact entry point on an interface page;
   receiving, via a computing device processor, a first input that selects the contact entry point;
   in response to receiving the first input, presenting on the interface page, via a computing device processor, one or more channels associated with the entity;
   receiving, via a computing device processor, a second input that selects one of the one or more channels;
   in response to receiving the second input, presenting, via a computing device processor, one or more contact options on the interface page, wherein the one or more contact options are associated with the selected channel;
   presenting, via a computing device processor, an estimated waiting time for each of the one or more contact options, wherein the estimated waiting time is presented on the interface page in conjunction with the presentation of the one or more contact options;
   receiving, via a computing device processor, a third input that selects one of the one or more contact options; and
   in response to receiving the third input, providing, via a computing device processor, access to the selected contact option.

2. The method of claim 1, wherein presenting the one or more contact options further comprises presenting, via the computing device processor, the one or more contact options, including one or more of a voice option, a telephone option, a text option, a chat option, a postal mail option, a network option, or an electronic mail option.

3. The method of claim 1, wherein the estimated waiting time is a manual estimate.

4. The method of claim 1, wherein the estimated waiting time is generated as a real-time estimate.

5. The method of claim 1, wherein the estimated waiting time is generated as a delayed estimate.

6. The method of claim 1, further comprising automatically selecting, via a computing device processor, a contact option with a lowest estimated waiting time from the one or more contact options, in lieu of presenting the one or more contact options and receiving the third input.

7. The method of claim 1, further comprising:
   automatically selecting, via a computing device processor, a channel most related to information provided on the interface page from the one or more channels, in lieu of presenting the one or more channels and receiving the second input; and
   automatically selecting, via a computing device processor, a contact option with a lowest estimated waiting time from the one or more contact options, in lieu of presenting the one or more contact options and receiving the third input.

8. The method of claim 1, further comprising presenting, via a computing device processor, a standardized preference index for each of the one or more contact options, wherein the standardized preference index is based on the estimated waiting time and a cost associated with the corresponding contact option.

9. The method of claim 8, further comprising automatically selecting, via a computing device processor, a contact option with a highest standardized preference index from the one or more contact options, in lieu of presenting the one or more contact options and receiving the third input.

10. The method of claim 8, further comprising:
    automatically selecting, via a computing device processor, a channel most related to information provided on the interface page from the one or more channels, in lieu of presenting the one or more channels and receiving the second input; and
    automatically selecting, via a computing device processor, a contact option with a highest standardized preference index from the one or more contact options, in lieu of presenting the one or more contact options and receiving the third input.

11. The method of claim 1, wherein presenting the one or more contact options further comprises presenting, via the computing device processor, the one or more contact options, wherein at least one of the contact options is presented as currently unavailable.

12. The method of claim 1 further comprising:
    in response to receiving the third input, determining, via a computing device processor, whether at least one data integration event needs to be generated, wherein the at least one data integration event is related to user activity on the interface page prior to receiving the first input.

13. The method of claim 12 further comprising:
    in response to determining that the at least one data integration event needs to be generated, generating, via a computing device processor, the at least one data integration event.

14. The method of claim 13 further comprising:
    in response to determining that the at least one data integration event is generated, transmitting, via a computing device processor, the at least one data integration event.

15. The method of claim 1 further comprising:
    in response to receiving the third input, determining, via a computing device processor, whether additional user input is needed; and
    in response to determining the additional user input is needed, presenting, via a computing device processor, a request for the additional user input.

16. The method of claim 1, wherein providing access to the selected contact option further comprises presenting, via a computing device processor, contact information associated with the selected contact option.

17. The method of claim 1, wherein providing access to the selected contact option further comprises prompting, via a computing device processor, an agent to contact the user via the selected contact option.

18. The method of claim 1, wherein providing access to the selected contact option further comprises presenting, via a computing device processor, a prompt for the user to contact an agent via the selected contact option.

19. The method of claim 1, wherein presenting one or more channels further comprises presenting, via the computing device processor, the one or more channels wherein each channel presented is related to information provided on the interface page.

20. The method of claim 1, wherein presenting one or more channels further comprises presenting, via the computing device processor, an option for other channels, wherein the other channels are unrelated to information provided on the interface page.

21. The method of claim 1, further comprising automatically selecting, via a computing device processor, a channel most related to information provided on the interface page from the one or more channels, in lieu of presenting the one or more channels and receiving the second input.

22. An apparatus for providing a user with a contact to an entity, the apparatus comprising:
- a computing platform including at least one processor and a memory; and
- a module stored in the memory, executable by the processor, and configured to:
- present, via a computing device processor, a contact entry point on an interface page;
- receive, via a computing device processor, a first input that selects the contact entry point;
- in response to receiving the first input, present on the interface page, via a computing device processor, one or more channels associated with the entity;
- present, via a computing device processor, an estimated waiting time for each of the one or more contact options, wherein the estimated waiting time is presented on the interface page in conjunction with the presentation of the one or more contact options;
- receive, via a computing device processor, a second input that selects one of the one or more channels;
- in response to receiving the second input, present, via a computing device processor, one or more contact options on the interface page, wherein the one or more contact options are associated with the selected channel;
- receive, via a computing device processor, a third input that selects one of the one or more contact options; and
- in response to receiving the third input, provide, via a computing device processor, access to the selected contact option.

23. The apparatus of claim 22, wherein the module configured to present the one or more contact options further comprises the module configured to present, via the computing device processor, the one or more contact options, including one or more of a voice option, a telephone option, a text option, a chat option, a postal mail option, a network option, or an electronic mail option.

24. The apparatus of claim 22, wherein the module is further configured to allow a manual input for the estimated waiting time.

25. The apparatus of claim 22, wherein the module is further configured to generate the estimated waiting time as a real-time estimate.

26. The apparatus of claim 22, wherein the module is further configured to generate the estimated waiting time as a delayed estimate.

27. The apparatus of claim 22, wherein the module is further configured to automatically select, via a computing device processor, a contact option with a lowest estimated waiting time from the one or more contact options, in lieu of the module configured to present the one or more contact options and receive the third input.

28. The apparatus of claim 22, wherein the module is further configured to:
- automatically select, via a computing device processor, a channel most related to information provided on the interface page from the one or more channels, in lieu of the module configured to present the one or more channels and receive the second input; and
- automatically select, via a computing device processor, a contact option with a lowest estimated waiting time from the one or more contact options, in lieu of the module configured to present the one or more contact options and receive the third input.

29. The apparatus of claim 22, wherein the module is further configured to present, via a computing device processor, a standardized preference index for each of the one or more contact options, wherein the standardized preference index is based on the estimated waiting time and a cost associated with the corresponding contact option.

30. The apparatus of claim 29, wherein the module is further configured to automatically select, via a computing device processor, a contact option with a highest standardized preference index from the one or more contact options, in lieu of the module configured to present the one or more contact options and receive the third input.

31. The apparatus of claim 29, wherein the module is further configured to:
- automatically select, via a computing device processor, a channel most related to information provided on the interface page from the one or more channels, in lieu of the module configured to present the one or more channels and receive the second input; and
- automatically select, via a computing device processor, a contact option with a highest standardized preference index from the one or more contact options, in lieu of the module configured to present the one or more contact options and receive the third input.

32. The apparatus of claim 22, wherein the module configured to present the one or more contact options further comprises the module configured to present, via the computing device processor, the one or more contact options, wherein at least one of the contact options is presented as currently unavailable.

33. The apparatus of claim 22, wherein the module is further configured to:
- in response to receiving the third input, determine, via a computing device processor, whether at least one data integration event needs to be generated, wherein the at least one data integration event is related to user activity on the interface page prior to receiving the first input.

34. The apparatus of claim 33, wherein the module is further configured to:
- in response to determining that the at least one data integration event needs to be generated, generate, via a computing device processor, the at least one data integration event.

35. The apparatus of claim 34, wherein the module is further configured to:
- in response to determining that the at least one data integration event is generated, transmit, via a computing device processor, the at least one data integration event.

36. The apparatus of claim 22, wherein the module is further configured to:
- in response to receiving the third input, determine, via a computing device processor, whether additional user input is needed; and
- in response to determining the additional user input is needed, present, via a computing device processor, a request for the additional user input.

37. The apparatus of claim 22, wherein the module configured to provide access to the selected contact option further comprises the module configured to present, via a computing device processor, contact information associated with the selected contact option.

38. The apparatus of claim 22, wherein the module configured to provide access to the selected contact option further comprises the module configured to prompt, via a computing device processor, an agent to contact the user via the selected contact option.

39. The apparatus of claim 22, wherein the module configured to provide access to the selected contact option further comprises the module configured to present, via a computing device processor, a prompt for the user to contact an agent via the selected contact option.

40. The apparatus of claim 22, wherein the module configured to present one or more channels further comprises the module configured to present, via the computing device processor, the one or more channels wherein each channel presented is related to information provided on the interface page.

41. The apparatus of claim 22, wherein the module configured to present one or more channels further comprises the module configured to present, via the computing device processor, an option for other channels, wherein the other channels are unrelated to information provided on the interface page.

42. The apparatus of claim 22, wherein the module is further configured to automatically select, via a computing device processor, a channel most related to information provided on the interface page from the one or more channels, in lieu of the module configured to present the one or more channels and receive the second input.

43. A computer program product for providing a user with a contact to an entity, the computer program product comprising:
  a non-transitory computer-readable medium comprising:
  a set of codes for causing a computer to:
    present, via a computing device processor, a contact entry point on an interface page;
    receive, via a computing device processor, a first input that selects the contact entry point;
    in response to receiving the first input, present on the interface page, via a computing device processor, one or more channels associated with the entity;
    present, via a computing device processor, an estimated waiting time for each of the one or more contact options, wherein the estimated waiting time is presented on the interface page in conjunction with the presentation of the one or more contact options;
    receive, via a computing device processor, a second input that selects one of the one or more channels;
    in response to receiving the second input, present, via a computing device processor, one or more contact options on the interface page, wherein the one or more contact options are associated with the selected channel;
    receive, via a computing device processor, a third input that selects one of the one or more contact options; and
    in response to receiving the third input, provide, via a computing device processor, access to the selected contact option.

44. The computer program product of claim 43, wherein the set of codes causing a computer to present the one or more contact options further comprises the set of codes causing a computer to present, via the computing device processor, the one or more contact options, including one or more of a voice option, a telephone option, a text option, a chat option, a postal mail option, a network option, or an electronic mail option.

45. The computer program product of claim 43, wherein the set of codes further causes a computer to allow a manual input for the estimated waiting time.

46. The computer program product of claim 43, wherein the set of codes further causes a computer to generate the estimated waiting time as a real-time estimate.

47. The computer program product of claim 43, wherein the set of codes further causes a computer to generate the estimated waiting time as a delayed estimate.

48. The computer program product of claim 43, wherein the set of codes further causes a computer to automatically select, via a computing device processor, a contact option with a lowest estimated waiting time from the one or more contact options, in lieu of the set of codes causing a computer to present the one or more contact options and receive the third input.

49. The computer program product of claim 43, wherein the set of codes further causes a computer to:
  automatically select, via a computing device processor, a channel most related to information provided on the interface page from the one or more channels, in lieu of the set of codes causing a computer to present the one or more channels and receive the second input; and
  automatically select, via a computing device processor, a contact option with a lowest estimated waiting time from the one or more contact options, in lieu of the set of codes causing a computer to present the one or more contact options and receive the third input.

50. The computer program product of claim 43, wherein the set of codes further causes a computer to present, via a computing device processor, a standardized preference index for each of the one or more contact options, wherein the standardized preference index is based on the estimated waiting time and a cost associated with the corresponding contact option.

51. The computer program product of claim 50, wherein the set of codes further causes a computer to automatically select, via a computing device processor, a contact option with a highest standardized preference index from the one or more contact options, in lieu of the set of codes causing a computer to present the one or more contact options and receive the third input.

52. The computer program product of claim 50, wherein the set of codes further causes a computer to:
  automatically select, via a computing device processor, a channel most related to information provided on the interface page from the one or more channels, in lieu of the set of codes causing a computer to present the one or more channels and receive the second input; and
  automatically select, via a computing device processor, a contact option with a highest standardized preference index from the one or more contact options, in lieu of the set of codes causing a computer to present the one or more contact options and receive the third input.

53. The computer program product of claim 43, wherein the set of codes causing a computer to present the one or more contact options further comprises the set of codes causing a computer to present, via the computing device processor, the one or more contact options, wherein at least one of the contact options is presented as currently unavailable.

54. The computer program product of claim 43, wherein the set of codes further causes a computer to:
  in response to receiving the third input, determine, via a computing device processor, whether at least one data integration event needs to be generated, wherein the at least one data integration event is related to user activity on the interface page prior to receiving the first input.

55. The computer program product of claim 54, wherein the set of codes further causes a computer to:
  in response to determining that the at least one data integration event needs to be generated, generate, via a computing device processor, the at least one data integration event.

56. The computer program product of claim 55, wherein the set of codes further causes a computer to:
  in response to determining that the at least one data integration event is generated, transmit, via a computing device processor, the at least one data integration event.

57. The computer program product of claim 43, wherein the set of codes further causes a computer to:
- in response to receiving the third input, determine, via a computing device processor, whether additional user input is needed; and
- in response to determining the additional user input is needed, present, via a computing device processor, a request for the additional user input.

58. The computer program product of claim 43, wherein the set of codes causing a computer to provide access to the selected contact option further comprises the set of codes causing a computer to present, via a computing device processor, contact information associated with the selected contact option.

59. The computer program product of claim 43, wherein the set of codes causing a computer to provide access to the selected contact option further comprises the set of codes causing a computer to prompt, via a computing device processor, an agent to contact the user via the selected contact option.

60. The computer program product of claim 43, wherein the set of codes causing a computer to provide access to the selected contact option further comprises the set of codes causing a computer to present, via a computing device processor, a prompt for the user to contact an agent via the selected contact option.

61. The computer program product of claim 43, wherein the set of codes causing a computer to present one or more channels further comprises the set of codes causing a computer to present, via the computing device processor, the one or more channels wherein each channel presented is related to information provided on the interface page.

62. The computer program product of claim 43, wherein the set of codes causing a computer to present one or more channels further comprises the set of codes causing a computer to present, via the computing device processor, an option for other channels, wherein the other channels are unrelated to information provided on the interface page.

63. The computer program product of claim 43, wherein the set of codes further causes a computer to automatically select, via a computing device processor, a channel most related to information provided on the interface page from the one or more channels, in lieu of the set of codes causing a computer to present the one or more channels and receive the second input.

* * * * *